US011556657B2

United States Patent
Toyoshima et al.

(10) Patent No.: US 11,556,657 B2
(45) Date of Patent: Jan. 17, 2023

(54) SOLID-STATE IMAGING DEVICE AND INFORMATION PROCESSING METHOD OF SOLID-STATE IMAGING DEVICE

(71) Applicant: SONY SEMICONDUCTOR SOLUTIONS CORPORATION, Kanagawa (JP)

(72) Inventors: Marie Toyoshima, Kanagawa (JP); Taishin Yoshida, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 206 days.

(21) Appl. No.: 16/962,172

(22) PCT Filed: Dec. 10, 2018

(86) PCT No.: PCT/JP2018/045251
§ 371 (c)(1),
(2) Date: Jul. 14, 2020

(87) PCT Pub. No.: WO2019/142540
PCT Pub. Date: Jul. 25, 2019

(65) Prior Publication Data
US 2020/0342122 A1 Oct. 29, 2020

(30) Foreign Application Priority Data
Jan. 19, 2018 (JP) .............................. JP2018-007438

(51) Int. Cl.
*G06F 21/60* (2013.01)
*H04N 5/369* (2011.01)
(Continued)

(52) U.S. Cl.
CPC .......... *G06F 21/602* (2013.01); *H04L 9/3278* (2013.01); *H04N 5/341* (2013.01); *H04N 5/379* (2018.08); *H04N 5/3745* (2013.01)

(58) Field of Classification Search
CPC ... G06F 21/602; H04L 9/3278; H04L 9/0866; H04L 9/3231; H04N 5/341;
(Continued)

(56) References Cited

U.S. PATENT DOCUMENTS

2017/0104949 A1* 4/2017 Kim ..................... G06F 17/16
2017/0345116 A1   11/2017 Katoh
2018/0115723 A1    4/2018 Takayanagi et al.

FOREIGN PATENT DOCUMENTS

CN    107852471 A    3/2018
JP    2004-173154 A   6/2004
(Continued)

OTHER PUBLICATIONS

International Search Report and Written Opinion of PCT Application No. PCT/JP2018/045251, dated Feb. 12, 2019, 08 pages of ISRWO.

(Continued)

*Primary Examiner* — Tony Ko
(74) *Attorney, Agent, or Firm* — Chip Law Group

(57) ABSTRACT

A solid-state imaging device capable of performing encryption processing with enhanced security by quite extremely safely generating unique information and performing encryption processing based on the generated unique information. There is provided a solid-state imaging device including a unique information generation unit that generates predetermined analog information, a unique value generation unit that generates a predetermined unique value based on the predetermined analog information, and an encryption processing unit that performs encryption pro- (Continued)

cessing using the predetermined unique value, in which the unique value generation unit includes a detection unit that converts the predetermined analog information into digital information, and a unique value calculation unit that calculates the predetermined unique value using the digital information, in which the solid-state imaging device further includes a high-pass filter that passes a high-frequency signal for at least one of the analog information or the digital information.

13 Claims, 41 Drawing Sheets

(51) Int. Cl.
  H04L 9/32 (2006.01)
  H04N 5/341 (2011.01)
  H04N 5/3745 (2011.01)
(58) Field of Classification Search
  CPC .... H04N 5/3745; H04N 5/379; H04N 17/002; H04N 5/335; H04N 5/232; H04N 5/374; H01L 27/14609; H01L 27/14621; H01L 27/14636; H01L 27/14641
  See application file for complete search history.

(56) References Cited

FOREIGN PATENT DOCUMENTS

| JP | 2009-049870 A | 3/2009 |
| JP | 2017-118229 A | 6/2017 |
| JP | 2017-216679 A | 12/2017 |
| JP | 6606659 B2 | 11/2019 |
| KR | 10-2017-0043050 A | 4/2017 |
| WO | 2016/167076 A1 | 10/2016 |
| WO | 2017/110483 A1 | 6/2017 |

OTHER PUBLICATIONS

Extended European Search Report of EP Application No. 18901464.0, dated Oct. 12, 2020, 11 pages.
Valsesia, et al., "User Authentication via PRNU-Based Physical Unclonable Functions", IEEE, Transactions on Information Forensics and Security, vol. 12, No. 8, Aug. 2017, pp. 1941-1956.
Cao, et al., "CMOS Image Sensor Based Physical Unclonable Function for Coherent Sensor-Level Authentication", IEEE, Transactions on Circuits and Systems I: Regular Papers, vol. 62, No. 11, Nov. 2015, pp. 2629-2640.

* cited by examiner

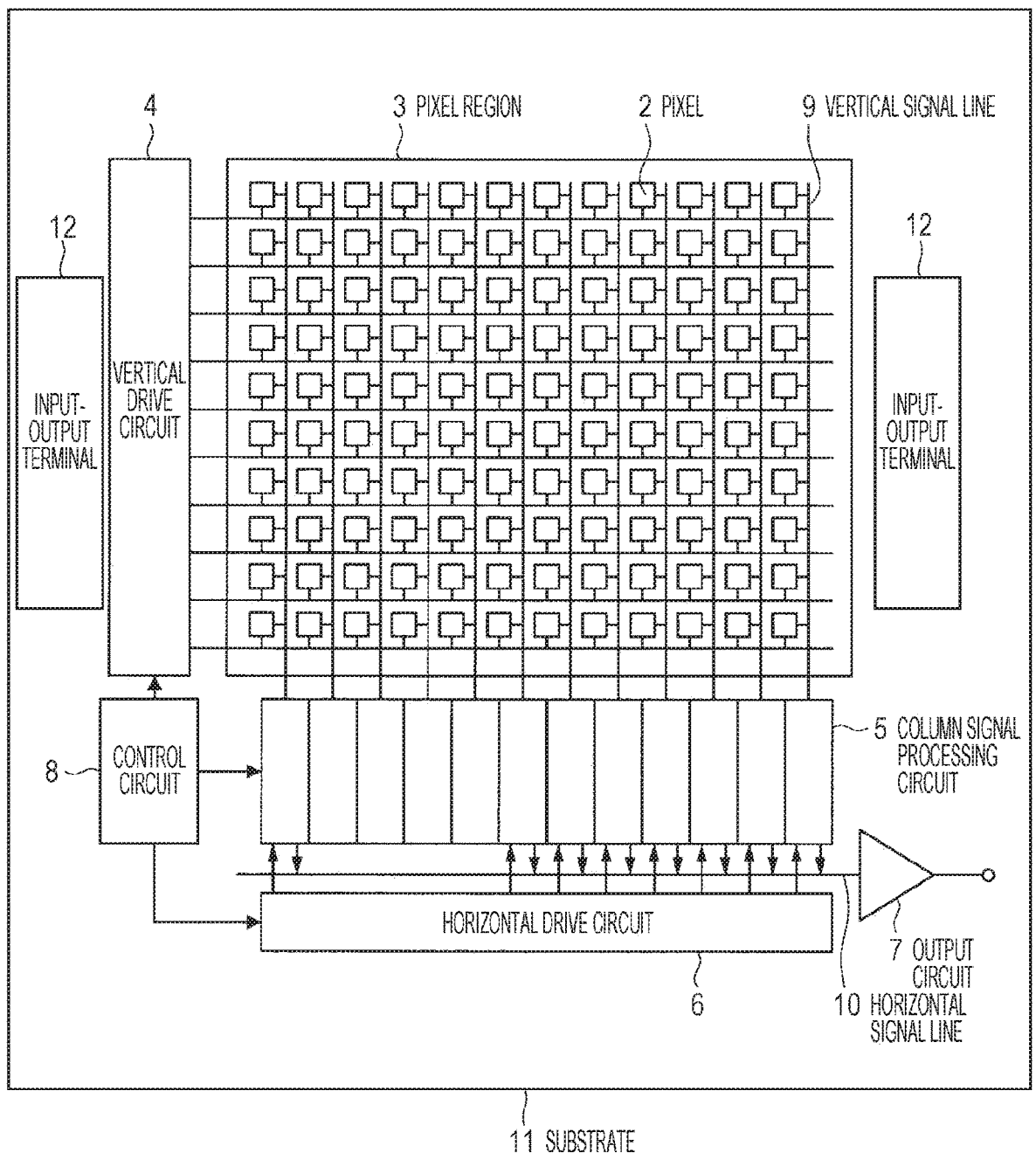

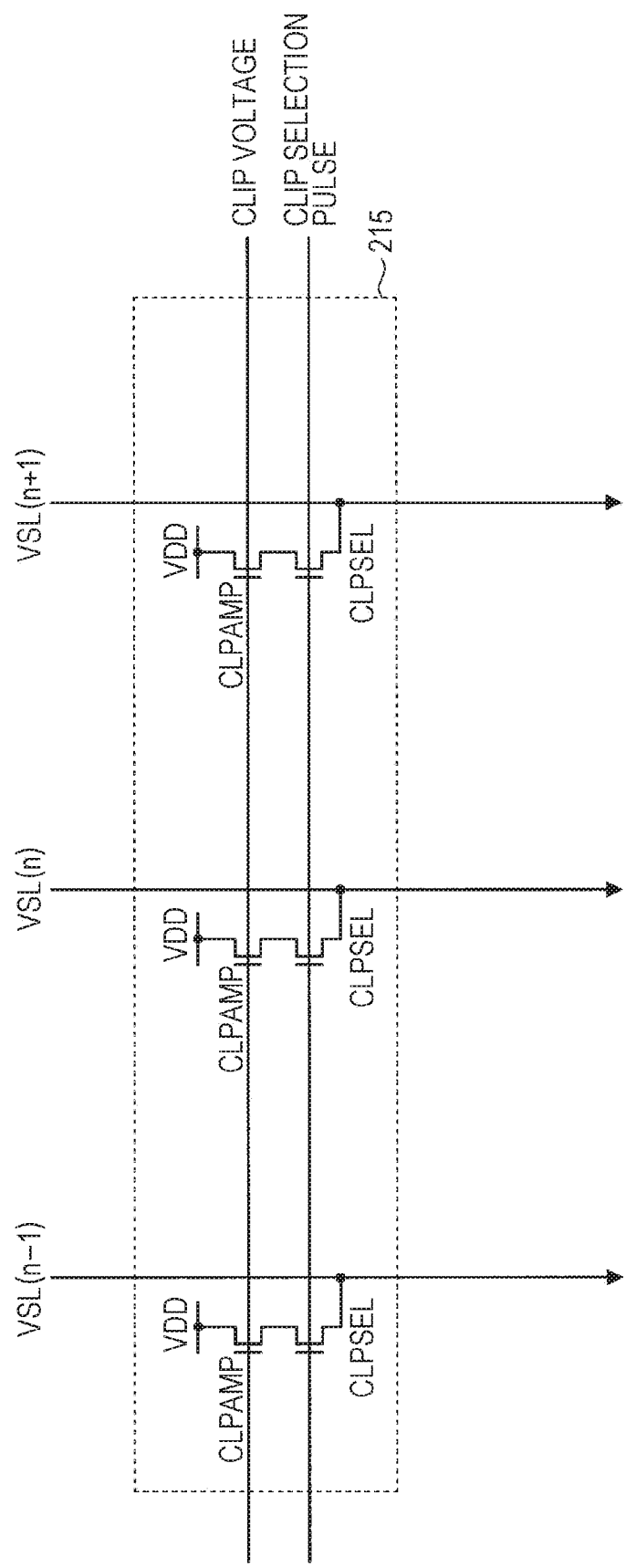

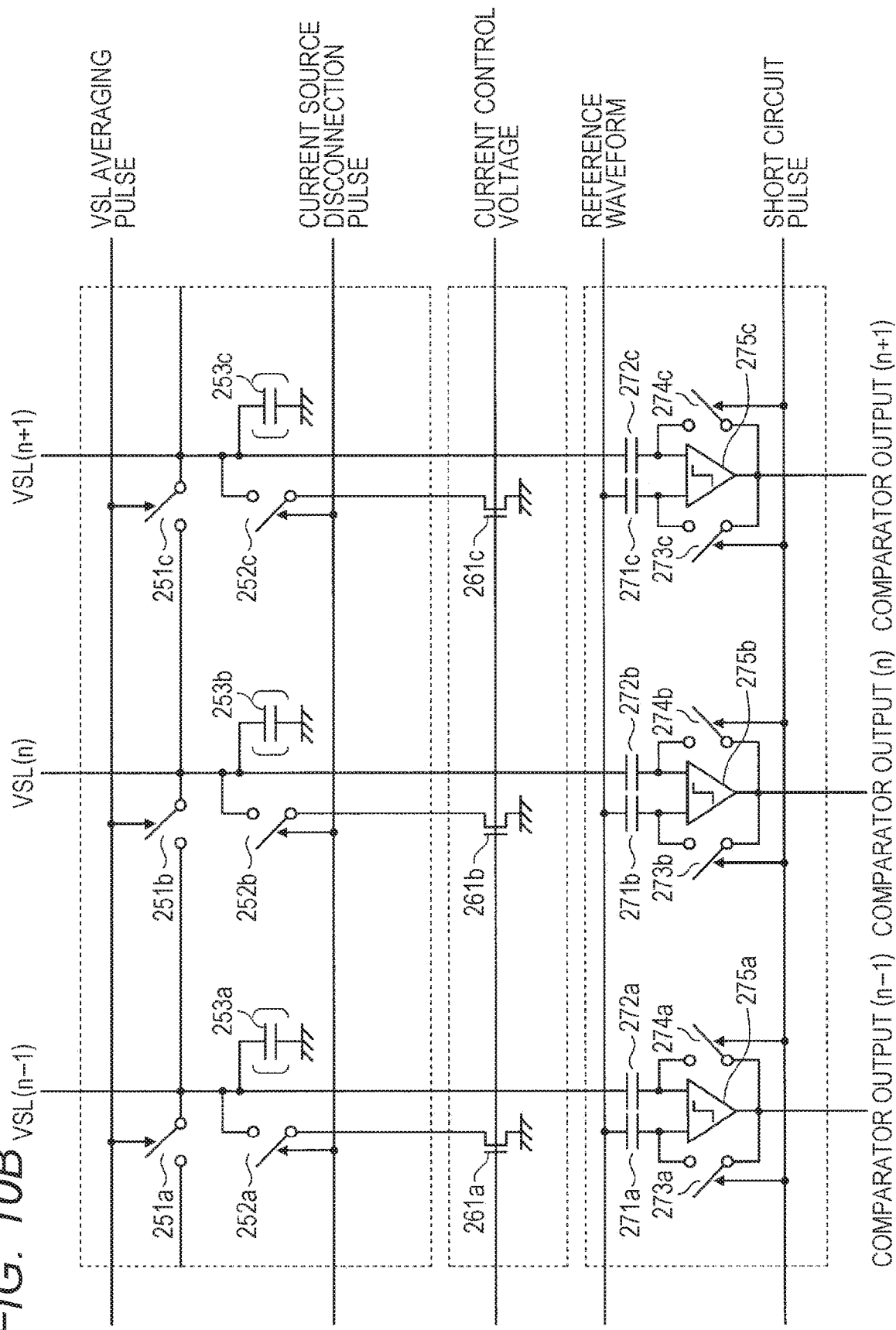

FIG. 16
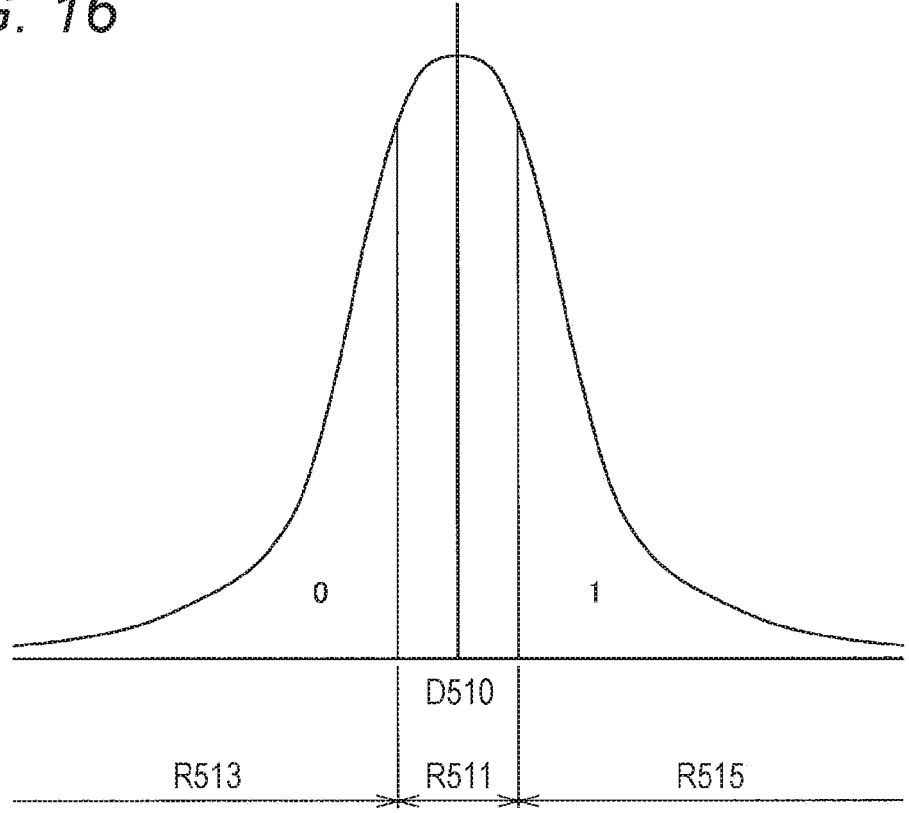
FIG. 17
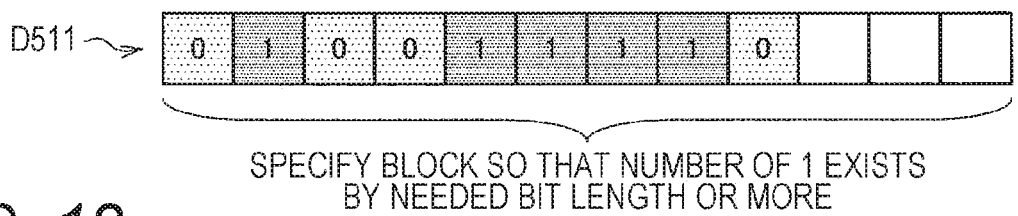
SPECIFY BLOCK SO THAT NUMBER OF 1 EXISTS
BY NEEDED BIT LENGTH OR MORE
FIG. 18
 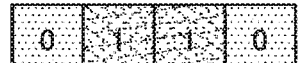
CONCATENATE TO GENERATE PUF VALUE

FIG. 22

PHYSICAL PIXEL ARRANGEMENT

| | |
|---|---|
| R1(1) | Gr1(1) |
| Gb1(1) | B1(1) |
| R2(1) | Gr2(1) |
| Gb2(1) | B2(1) | ← REFERENCE ACCESS ROW
| R1(2) | Gr1(2) |
| Gb1(2) | B1(2) |
| R2(2) | Gr2(2) |
| Gb2(2) | B2(2) |
| R1(3) | Gr1(3) |
| Gb1(3) | B1(3) |
| R2(3) | Gr2(3) |
| Gb2(3) | B2(3) | ← ALSO ACCESS NEXT FD FOR OBTAINING DIFFERENCE
| R1(4) | Gr1(4) |
| Gb1(4) | B1(4) |
| R2(4) | Gr2(4) |
| Gb2(4) | B2(4) |

VSL1, VSL0

FIG. 23

AD CONVERSION
(DIFFERENCE PROCESS)

| NUMBER OF TIMES OF AD ↓ | VSL0 | VSL1 |
|---|---|---|
| 1 | R1(1) − R1(3) | R1(2) − R1(4) |
| 2 | Gr1(1) − Gr1(3) | Gr1(2) − Gr1(4) |
| 3 | Gb1(1) − Gb1(3) | Gb1(2) − Gb1(4) |
| 4 | B1(1) − B1(3) | B1(2) − B1(4) |
| 5 | R2(1) − R2(3) | R2(2) − R2(4) |
| 6 | Gr2(1) − Gr2(3) | Gr2(2) − Gr2(4) |
| 7 | Gb2(1) − Gb2(3) | Gb2(2) − Gb2(4) |
| 8 | B2(1) − B2(3) | B2(2) − B2(4) |

SOLID-STATE IMAGING DEVICE AND INFORMATION PROCESSING METHOD OF SOLID-STATE IMAGING DEVICE

CROSS REFERENCE TO RELATED APPLICATIONS

This application is a U.S. National Phase of International Patent Application No. PCT/JP2018/045251 filed on Dec. 10, 2018, which claims priority benefit of Japanese Patent Application No. JP 2018-007438 filed in the Japan Patent Office on Jan. 19, 2018. Each of the above-referenced applications is hereby incorporated herein by reference in its entirety.

TECHNICAL FIELD

The present disclosure relates to a solid-state imaging device and an information processing method of the solid-state imaging device.

BACKGROUND ART

As a solid-state imaging device, an amplification type solid-state imaging device represented by a MOS image sensor such as a complementary metal oxide semiconductor (CMOS) is known. Furthermore, a charge transfer type solid-state imaging device represented by a charge coupled device (CCD) image sensor is known. These solid-state imaging devices are widely used in digital still cameras, digital video cameras, and the like. In recent years, as the solid-state imaging devices mounted in mobile devices such as camera-equipped mobile phones and personal digital assistants (PDAs), MOS image sensors are often used in view of power consumption and the like because of their low power supply voltage. For example, Patent Document 1 discloses an example of a digital camera to which such a solid-state imaging device is applied.

A MOS solid-state imaging device has a pixel array (pixel region) and a peripheral circuit region, the pixel array including unit pixels each formed including a photodiode to be a photoelectric conversion unit and a plurality of pixel transistors, the plurality of unit pixels being arranged in a two-dimensional array. The plurality of pixel transistors is formed using MOS transistors, and includes three transistors of a transfer transistor, a reset transistor, and an amplification transistor, or four transistors with a selection transistor being added.

CITATION LIST

Patent Document

Patent Document 1: Japanese Patent Application Laid-Open No. 2004-173154

SUMMARY OF THE INVENTION

Problems to be Solved by the Invention

In Patent Document 1 described above, an encryption key is created in a block different from an image sensor by using unique information of the image sensor. However, in this technique, the unique information of the image sensor may leak out by monitoring of a signal output from the image sensor.

Accordingly, the present disclosure proposes a new and improved solid-state imaging device and information processing method of the solid-state imaging device that are capable of performing encryption processing with enhanced security by extremely safely generating unique information and performing encryption processing based on the generated unique information.

Solutions to Problems

According to the present disclosure, there is provided a solid-state imaging device including a unique information generation unit that generates predetermined analog information, a unique value generation unit that generates a predetermined unique value based on the predetermined analog information, and an encryption processing unit that performs encryption processing using the predetermined unique value, in which the unique value generation unit includes a detection unit that converts the predetermined analog information into digital information, and a unique value calculation unit that calculates the predetermined unique value using the digital information, in which the solid-state imaging device further includes a high-pass filter that passes a high-frequency signal for at least one of the analog information or the digital information.

Furthermore, according to the present disclosure, there is provided a unique value generation method of a solid-state imaging device, including generating predetermined analog information from a unique information generation unit, generating by a unique value generation unit a predetermined unique value based on the predetermined analog information, and performing by an encryption processing unit encryption processing using the predetermined unique value, in which the generating of the unique value includes converting the predetermined analog information into digital information, and calculating the predetermined unique value using the digital information, in which the unique value generation method further includes passing a high-frequency signal for at least one of the analog information or the digital information.

Effects of the Invention

Accordingly, according to the present disclosure, it is possible to provide a new and improved solid-state imaging device and information processing method of the solid-state imaging device that are capable of performing encryption processing with enhanced security by extremely safely generating unique information and performing encryption processing based on the generated unique information.

Note that the above effect is not necessarily limited, and any of the effects illustrated in the present description or other effects that can be grasped from the present description may be exhibited together with or in place of the above effect.

BRIEF DESCRIPTION OF DRAWINGS

FIG. 1 is a schematic configuration diagram illustrating an example of a configuration of a solid-state imaging device according to one embodiment of the present disclosure.

FIG. 10A is an explanatory diagram illustrating a circuit configuration example of a clip circuit according to the same embodiment.

FIG. 10B is an explanatory diagram illustrating a circuit configuration example of a reference signal generation unit, a current source, and a comparator according to the same embodiment.

FIG. 16 is an explanatory diagram for describing an example of a technique related to generation of the PUF value according to the same embodiment.

FIG. 17 is an explanatory diagram for describing an example of a method of generating the PUF value according to the same embodiment.

FIG. 18 is an explanatory diagram for describing an example of the method of generating the PUF value according to the same embodiment.

FIG. 22 is an explanatory diagram for describing an outline of operation of a solid-state imaging device according to a third embodiment of the present disclosure.

FIG. 23 is an explanatory diagram for describing the outline of the operation of the solid-state imaging device according to the same embodiment.

MODE FOR CARRYING OUT THE INVENTION

Figure 2A:
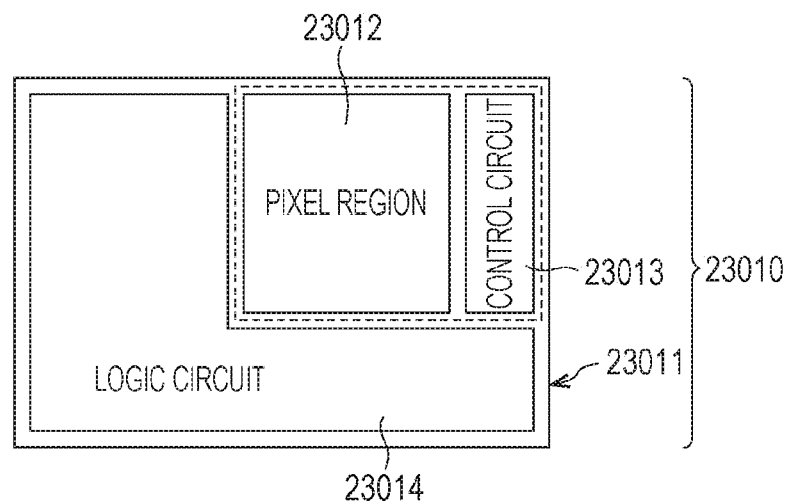
FIGS. 2A, 2B, and 2C are diagrams illustrating an outline of a configuration example of a solid-state imaging device of stacked type to which technology according to the present disclosure can be applied.

Hereinafter, preferred embodiments of the present disclosure will be described in detail with reference to the accompanying drawings. Note that in the present description and drawings, components having substantially the same functional configurations are given the same reference signs, and duplicated descriptions are omitted.

Note that the description will be made in the following order.

1. Configuration example of solid-state imaging device
1.1. Schematic configuration
1.2. Functional configuration
1.3. Circuit configuration of unit pixel
2. Outline of PUF
3. First Embodiment
3.1. Configuration example
3.2. Operation example
4. Second Embodiment
4.1. Basic idea
4.2. Method of generating PUF value
4.3. Functional configuration
4.4. Processing
4.5. Evaluation
5. Third Embodiment
5.1. Outline
5.2. Driving example
6. Application example
6.1. Application example to biometric authentication
6.2. Application example to biometric authentication system
6.3. Application example to mobile object
7. Conclusion

1. Configuration Example of Solid-State Imaging Device

A configuration example of a solid-state imaging device according to the present embodiment will be described below.

1.1. Schematic Configuration

FIG. 1 illustrates a schematic configuration of a CMOS solid-state imaging device as an example of a configuration of a solid-state imaging device according to one embodiment of the present disclosure. This CMOS solid-state imaging device is applied to the solid-state imaging device of each embodiment. As illustrated in FIG. 1, the solid-state imaging device 1 of this example has a pixel array (what is called pixel region) 3 in which pixels 2 including a plurality of photoelectric conversion units are regularly arranged in a two-dimensional array on a semiconductor substrate 11, for example, a silicon substrate, and a peripheral circuit portion. A pixel 2 includes, for example, a photodiode to be a photoelectric conversion unit and a plurality of pixel transistors (what is called MOS transistors). The plurality of pixel transistors can include three transistors, for example, a transfer transistor, a reset transistor, and an amplification transistor. In addition, it can be configured by four transistors by adding a selection transistor. Note that an example of an equivalent circuit of a unit pixel will be described later separately. The pixel 2 can be configured as one unit pixel. Furthermore, the pixel 2 can have a shared pixel structure. The shared pixel structure includes a plurality of photodiodes, a plurality of transfer transistors, one shared floating diffusion, and one each of other shared pixel transistors. That is, in the shared pixels, the photodiodes and the transfer transistors that constitute a plurality of unit pixels share one each of the other pixel transistors.

The peripheral circuit portion includes a vertical drive circuit 4, a column signal processing circuit 5, a horizontal drive circuit 6, an output circuit 7, a control circuit 8, and the like.

The control circuit 8 receives an input clock and data giving an instruction on an operating mode and the like, and outputs data such as internal information of the solid-state imaging device. That is, the control circuit 8 generates a clock signal and a control signal, which are references for operations of the vertical drive circuit 4, the column signal processing circuit 5, the horizontal drive circuit 6, and the like on the basis of a vertical synchronization signal, a horizontal synchronization signal, and a master clock. Then, these signals are input to the vertical drive circuit 4, the column signal processing circuit 5, the horizontal drive circuit 6, and the like.

The vertical drive circuit 4 includes, for example, a shift register, selects a pixel drive wiring, and supplies pulses for driving pixels to a selected pixel drive wiring, so as to drive pixels in row units. That is, the vertical drive circuit 4 selectively scans each pixel 2 of the pixel array 3 in a vertical direction sequentially in row units, and supplies a pixel signal based on a signal charge generated according to an amount of light received in, for example, the photodiode to be the photoelectric conversion unit of each pixel 2 through a vertical signal line 9 to the column signal processing circuit 5.

The column signal processing circuit 5 is arranged, for example, on every column of the pixels 2 and performs signal processing, such as noise removal on signals output from the pixels 2 of one row, for every pixel column. That is, the column signal processing circuit 5 performs signal processing such as CDS for removing fixed pattern noise unique to a pixel 2, signal amplification, and AD conversion. A horizontal selection switch (not illustrated) is provided at an output stage of the column signal processing circuit 5 so as to be connected with a horizontal signal line 10.

The horizontal drive circuit 6 includes, for example, a shift register, sequentially selects the column signal processing circuits 5 by sequentially outputting horizontal scanning pulses, and outputs a pixel signal from each of the column signal processing circuits 5 to the horizontal signal line 10.

The output circuit 7 performs signal processing on signals sequentially supplied from each of the column signal processing circuits 5 through the horizontal signal line 10 and outputs processed signals. For example, only buffering may be performed, or black level adjustment, column variation correction, various digital signal processing, and the like may be performed. An input-output terminal 12 exchanges signals with the outside.

Figure 2B:
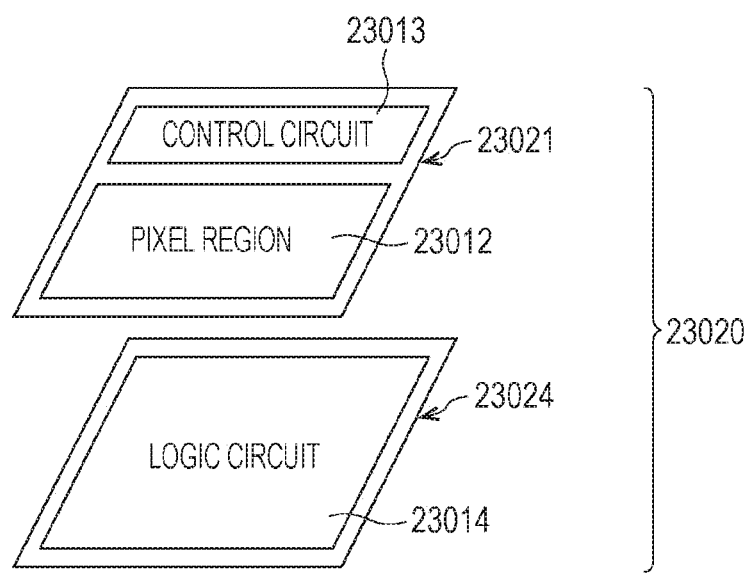
Figure 2C:
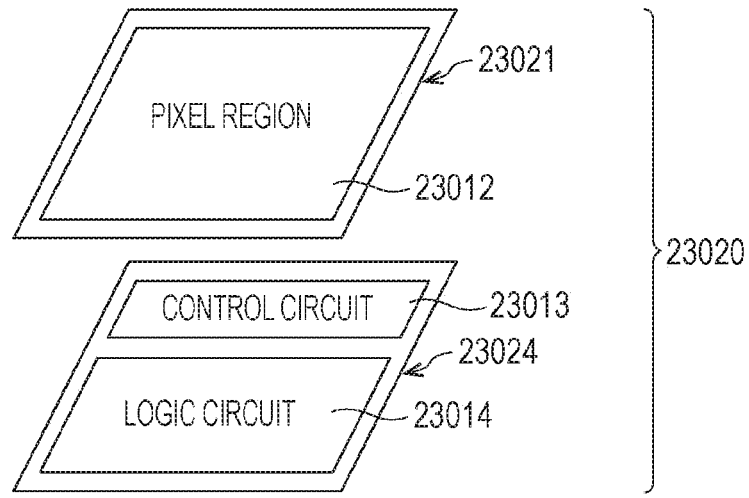

Furthermore, FIGS. 2A, 2B, and 2C are diagrams illustrating an outline of a configuration example of a solid-state imaging device of stacked type to which technology according to the present disclosure can be applied.

FIG. 2A illustrates a schematic configuration example of a solid-state imaging device of non-stacked type. A solid-state imaging device 23010 has one die (semiconductor substrate) 23011 as illustrated at FIG. 2A. The die 23011 is provided with a pixel region 23012 in which pixels are arranged in an array, a control circuit 23013 that performs various controls of driving pixels and others, and a logic circuit 23014 for signal processing.

FIGS. 2B and 2C illustrate schematic configuration examples of the solid-state imaging device of stacked type. As illustrated at FIGS. 2B and 2C, the solid-state imaging device 23020 includes two dies, a sensor die 23021 and a logic die 23024, which are stacked and electrically connected and are configured as one semiconductor chip.

At FIG. 2B, a pixel region 23012 and a control circuit 23013 are mounted on the sensor die 23021, and a logic circuit 23014 including a signal processing circuit for performing signal processing is mounted on the logic die 23024.

At FIG. 2C, a pixel region 23012 is mounted on the sensor die 23021, and a control circuit 23013 and a logic circuit 23014 are mounted on the logic die 23024.

Figure 3:
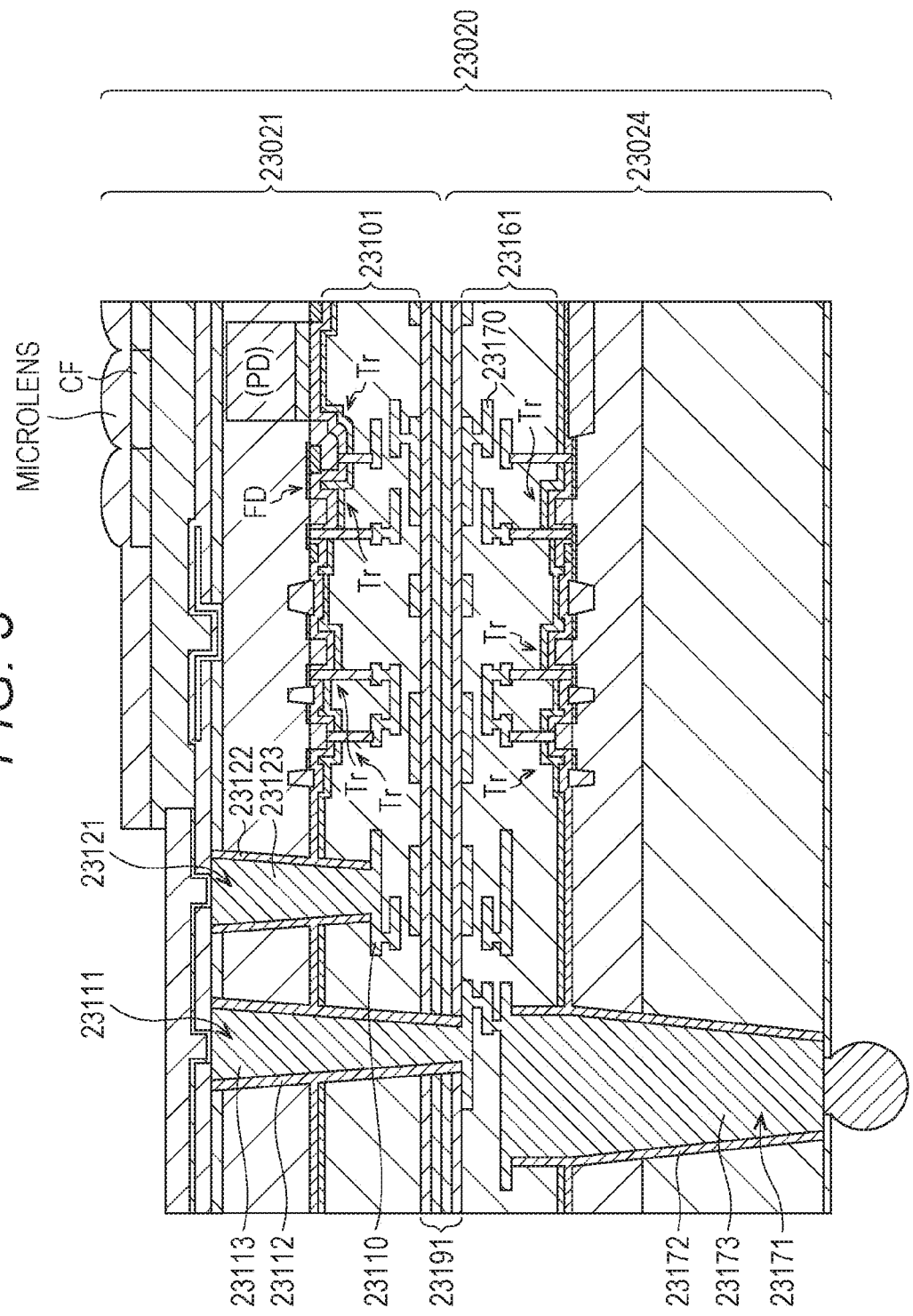
FIG. 3 is a cross-sectional view illustrating a first configuration example of a solid-state imaging device 23020 of stacked type.

FIG. 3 is a cross-sectional view illustrating a first configuration example of the solid-state imaging device 23020 of stacked type.

On the sensor die 23021, a photodiode (PD), a floating diffusion (FD), and a Tr (MOS FET) that constitute a pixel to be in a pixel region 23012, a Tr to be a control circuit 23013, and the like are formed. Moreover, a wiring layer 23101 having a plurality of layers, three layers in this example, of wiring 23110, is formed on the sensor die 23021. Note that (the Tr to be) the control circuit 23013 can be configured in the logic die 23024 instead of the sensor die 23021.

On the logic die 23024, the Tr constituting the logic circuit 23014 is formed. Moreover, a wiring layer 23161 having a plurality of layers, three layers in this example, of wiring 23170, is formed on the logic die 23024. Furthermore, in the logic die 23024, a connection hole 23171 having an insulating film 23172 formed on an inner wall surface is formed, and a connection conductor 23173 connected to the wiring 23170 and the like is embedded in a connection hole 23171.

The sensor die 23021 and the logic die 23024 are attached to each other so that the wiring layers 23101 and 23161 face each other, thereby forming a solid-state imaging device 23020 of stacked type in which the sensor die 23021 and the logic die 23024 are stacked. A film 23191 such as a protective film is formed on a surface where the sensor die 23021 and the logic die 23024 are attached to each other.

In the sensor die 23021, a connection hole 23111 is formed that penetrates the sensor die 23021 from a back surface side (the side where light enters the PD) (upper side) of the sensor die 23021 and reaches the uppermost layer of the wiring 23170 of the logic die 23024. Moreover, a connection hole 23121 is formed near the connection hole 23111 in the sensor die 23021 so as to reach the first layer of the wiring 23110 from the back surface side of the sensor die 23021. An insulating film 23112 is formed on an inner wall surface of the connection hole 23111, and an insulating film 23122 is formed on an inner wall surface of the connection hole 23121. Then, connection conductors 23113 and 23123 are embedded in the connection holes 23111 and 23121, respectively. The connection conductor 23113 and the connection conductor 23123 are electrically connected on the back surface side of the sensor die 23021, thereby electrically connecting the sensor die 23021 and the logic die 23024 via the wiring layer 23101, the connection hole 23121, the connection hole 23111, and the wiring layer 23161.

Figure 4:
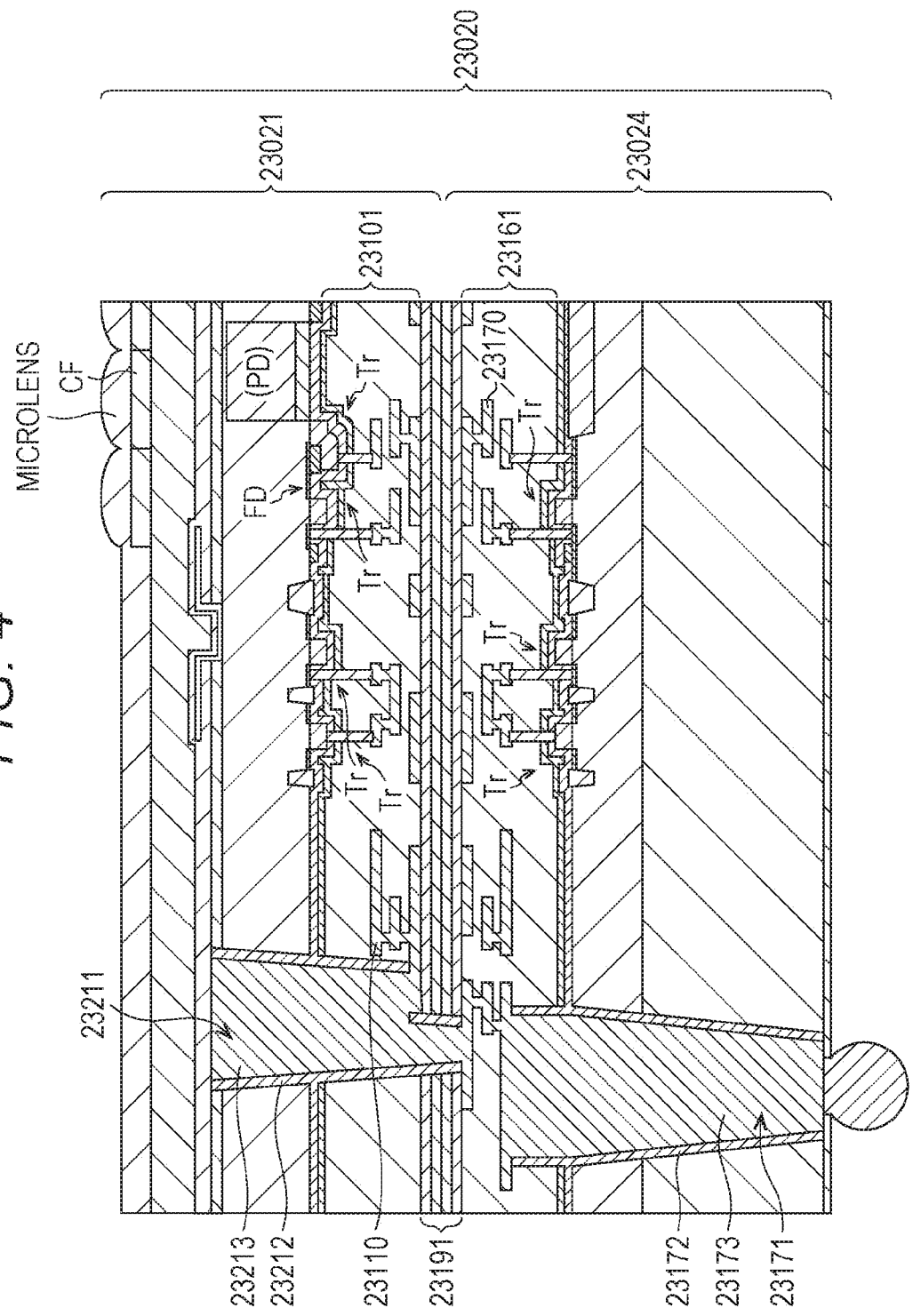
FIG. 4 is a cross-sectional view illustrating a second configuration example of the solid-state imaging device 23020 of stacked type.

FIG. 4 is a cross-sectional view illustrating a second configuration example of the solid-state imaging device 23020 of stacked type.

In the second configuration example of the solid-state imaging device 23020, the sensor die 23021 ((the wiring 23110 of) the wiring layer 23101 thereof) and the logic die 23024 ((the wiring 23170 of) the wiring layer 23161 thereof) are electrically connected by one connection hole 23211 formed in the sensor die 23021.

That is, in FIG. 4, the connection hole 23211 is formed so as to penetrate the sensor die 23021 from the back surface side of the sensor die 23021, reach the uppermost layer of the wiring 23170 of the logic die 23024, and reach the uppermost layer of the wiring 23110 of the sensor die 23021. An insulating film 23212 is formed on an inner wall surface of the connection hole 23211, and a connection conductor 23213 is embedded in the connection hole 23211. In FIG. 3 described above, the sensor die 23021 and the logic die 23024 are electrically connected by two connection holes 23111 and 23121, but in FIG. 4, the sensor die 23021 and the logic die 23024 are electrically connected by one connection hole 23211.

Figure 5:
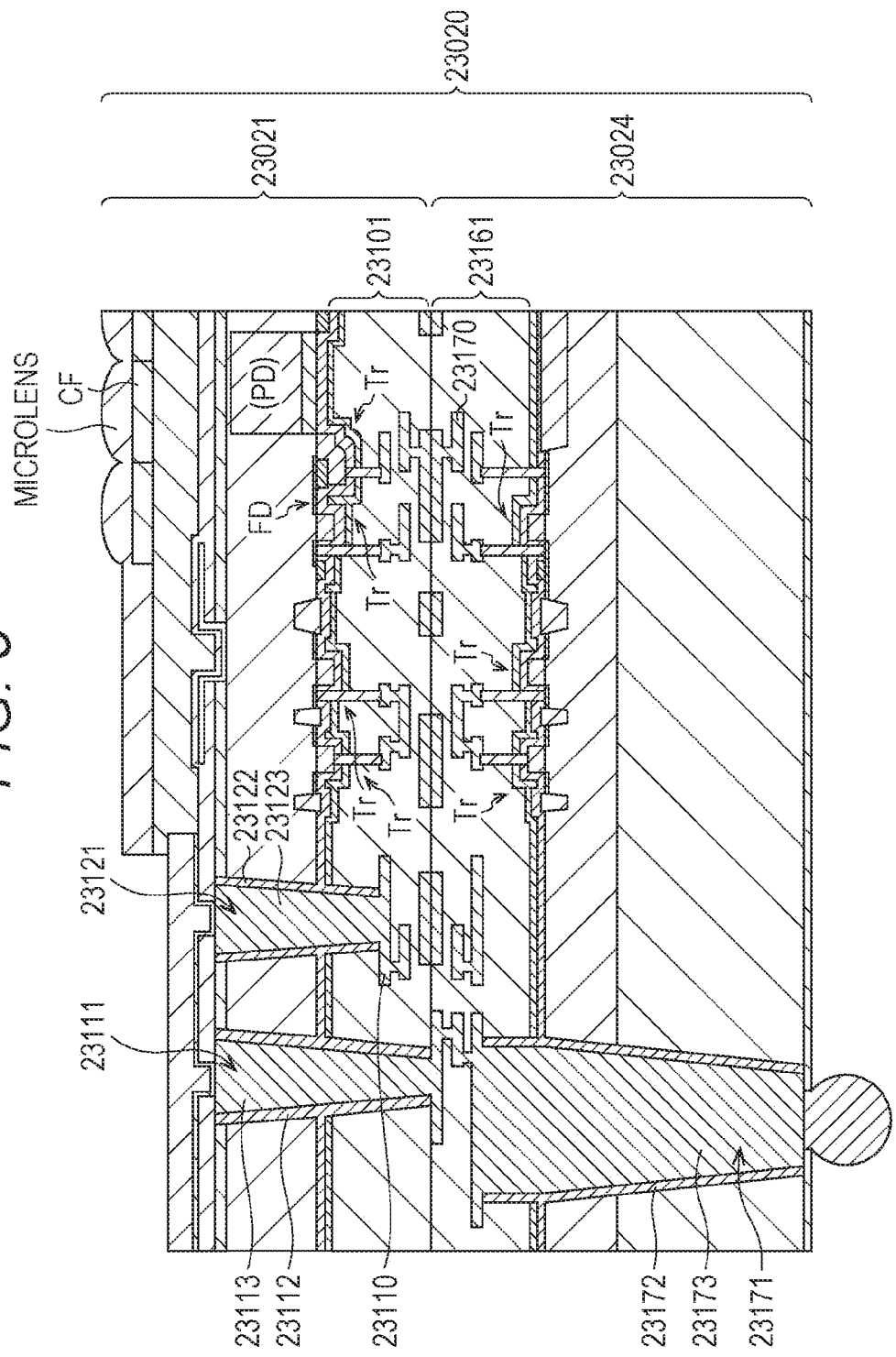
FIG. 5 is a cross-sectional view illustrating a third configuration example of the solid-state imaging device 23020 of stacked type.

FIG. 5 is a cross-sectional view illustrating a third configuration example of the solid-state imaging device 23020 of stacked type.

The solid-state imaging device 23020 in FIG. 5 is different from the case of FIG. 3, in which the film 23191 such as a protective film is formed on the surface where the sensor die 23021 and the logic die 23024 are attached to each other, in that the film 23191 such as a protective film is not formed on the surface where the sensor die 23021 and the logic die 23024 are attached to each other.

The solid-state imaging device 23020 of FIG. 5 is configured such that the sensor die 23021 and the logic die 23024 are stacked so that the wirings 23110 and 23170 are in direct contact, and heated while applying a required load, to thereby directly join the wirings 23110 and 23170.

Figure 6:
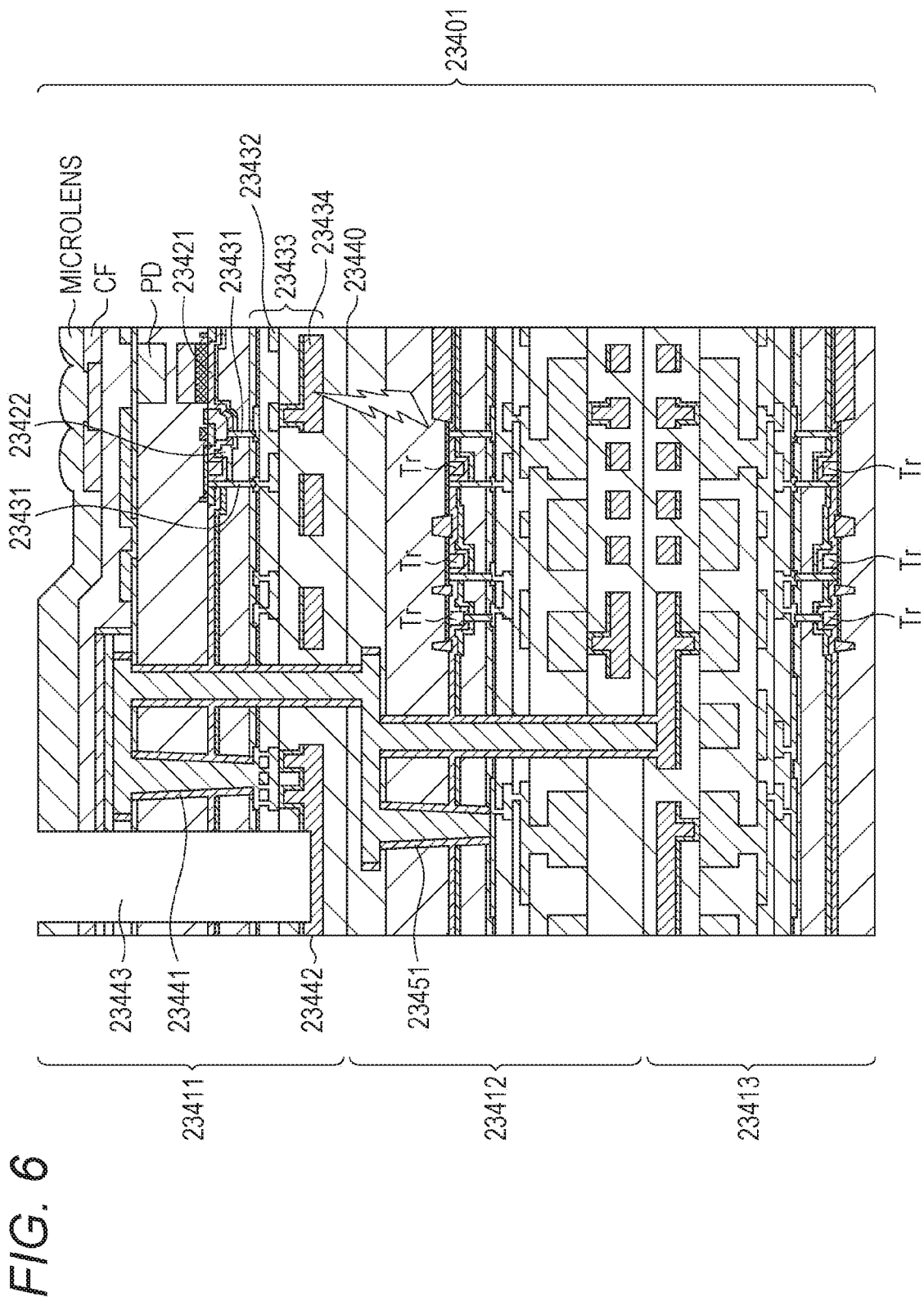
FIG. 6 is a view illustrating another configuration example of a solid-state imaging device of stacked type to which the technology according to the present disclosure can be applied.

FIG. 6 is a cross-sectional view illustrating another configuration example of a solid-state imaging device of stacked type to which the technology according to the present disclosure can be applied.

In FIG. 6, the solid-state imaging device 23401 has a three-layer stacked structure in which three dies, a sensor die 23411, a logic die 23412, and a memory die 23413 are stacked.

The memory die 23413 has, for example, a memory circuit that stores data temporarily needed in signal processing performed by the logic die 23412.

In FIG. 6, the logic die 23412 and the memory die 23413 are stacked in this order under the sensor die 23411, but the logic die 23412 and the memory die 23413 can be stacked in reverse order, that is, in order of the memory die 23413 and the logic die 23412 under the sensor die 23411.

Note that in FIG. 6, a PD to be a photoelectric conversion unit of the pixel and a source-drain region of a pixel Tr are formed in the sensor die 23411.

A gate electrode is formed around the PD with a gate insulating film interposed therebetween, and a pixel Tr 23421 and a pixel Tr 23422 are formed by the gate electrode and a pair of source-drain regions.

The pixel Tr 23421 adjacent to the PD is a transfer Tr, and one of the pair of source-drain regions constituting the pixel Tr 23421 is an FD.

Furthermore, an interlayer insulating film is formed in the sensor die 23411, and a connection hole is formed in the interlayer insulating film. In the connection hole, a connection conductor 23431 connected to the pixel Tr 23421 and the pixel Tr 23422 is formed.

Moreover, a wiring layer 23433 having a plurality of layers of wiring 23432 connected to each connection conductor 23431 is formed in the sensor die 23411.

Furthermore, an aluminum pad 23434 to be an electrode for external connection is formed on the lowermost layer of the wiring layer 23433 of the sensor die 23411. That is, in the sensor die 23411, the aluminum pad 23434 is formed at a position closer to a bonding surface 23440 with the logic die 23412 than the wiring 23432. The aluminum pad 23434 is used as one end of a wiring related to input and output of a signal from and to the outside.

Moreover, a contact 23441 used for electrical connection with the logic die 23412 is formed in the sensor die 23411. The contact 23441 is connected to a contact 23451 of the logic die 23412 and also to an aluminum pad 23442 of the sensor die 23411.

Then, a pad hole 23443 is formed in the sensor die 23411 so as to reach the aluminum pad 23442 from a back surface side (upper side) of the sensor die 23411.

The technology according to the present disclosure can be applied to the solid-state imaging devices as described above.

Note that in the example described with reference to FIGS. 3 to 6, for example, copper (Cu) wiring is used for the various wirings. Furthermore, hereinafter, a configuration in which wirings (for example, the wirings 23110 and 23170 illustrated in FIG. 5) are directly bonded between the sensor dies stacked together as illustrated in FIG. 5 will be also referred to as "Cu—Cu bonding".

1.2. Functional Configuration

Figure 7:
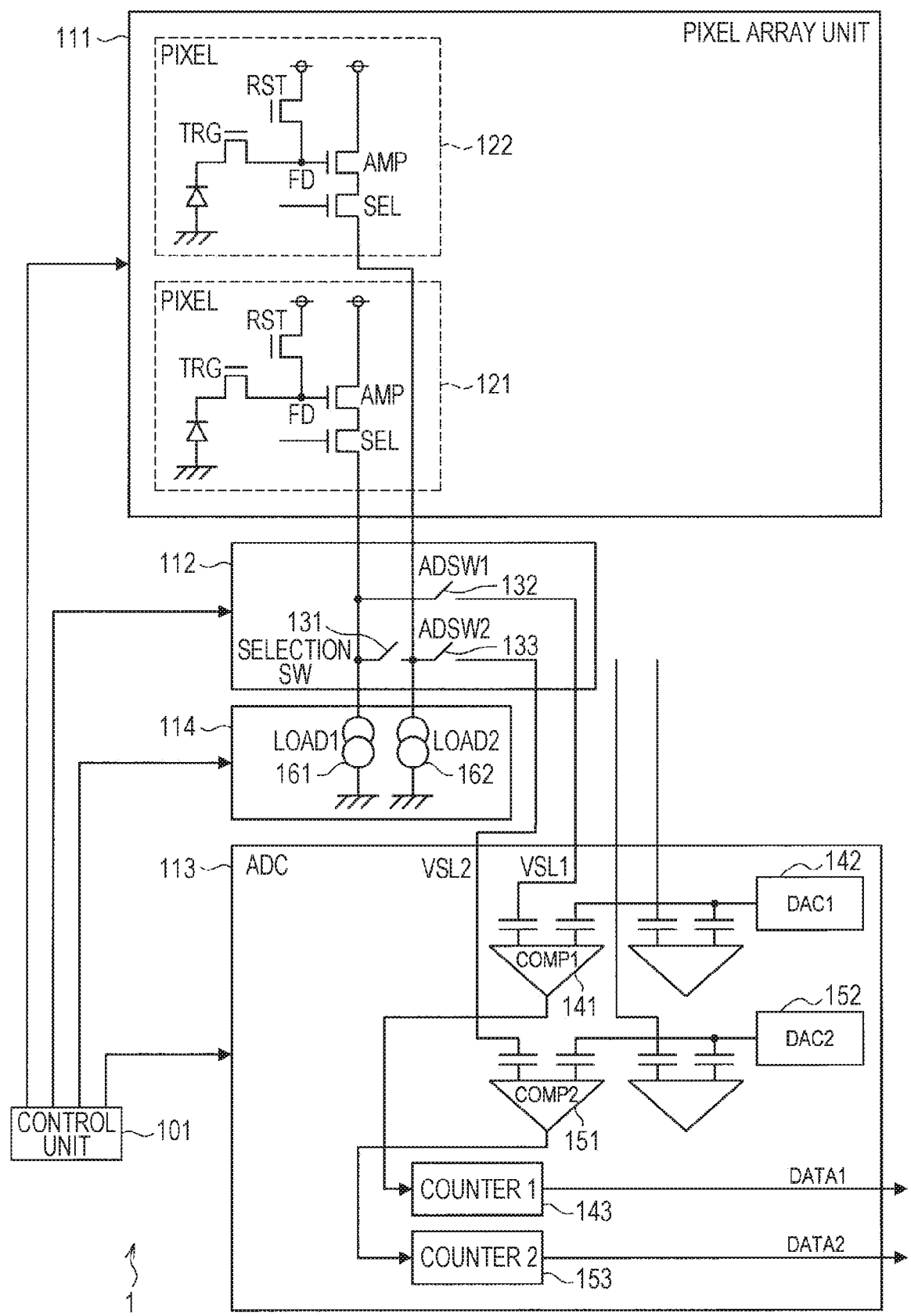
FIG. 7 is a block diagram illustrating an example of a functional configuration of a part of the solid-state imaging device according to one embodiment of the present disclosure.

Next, an example of a functional configuration of a solid-state imaging device according to one embodiment of the present disclosure will be described with reference to FIG. 7. FIG. 7 is a block diagram illustrating an example of a functional configuration of a part of the solid-state imaging device according to one embodiment of the present disclosure. The solid-state imaging device 1 illustrated in FIG. 7 is an image sensor, for example, a complementary metal oxide semiconductor (CMOS) image sensor, a charge coupled device (CCD) image sensor, or the like that captures an image of a subject and obtains digital data of the captured image.

As illustrated in FIG. 7, the solid-state imaging device 1 has a control unit 101, a pixel array unit 111, a selection unit 112, an A/D conversion unit (analog digital converter (ADC)) 113, and a constant current circuit unit 114.

The control unit 101 controls each unit of the solid-state imaging device 1 to execute processing related to reading of image data (pixel signal) and the like.

The pixel array unit 111 is a pixel region in which a pixel configuration having photoelectric conversion elements such as photodiodes are arranged in a matrix (array). The pixel array unit 111 is controlled by the control unit 101, receives light of a subject at respective pixels, photoelectrically converts the incident light to accumulate electric charges, and outputs the electric charges accumulated at the respective pixels as a pixel signal at a predetermined timing.

A pixel 121 and a pixel 122 represent two vertically adjacent pixels in a pixel group arranged in the pixel array unit 111. The pixel 121 and the pixel 122 are pixels in consecutive rows in the same column (column). In the case of the example in FIG. 7, as illustrated in the pixels 121 and 122, a circuit of each pixel uses a photoelectric conversion element and four transistors. Note that the configuration of the circuit of each pixel is arbitrary, and may be other than that of the example illustrated in FIG. 7.

In a general pixel array, an output line for a pixel signal is provided for each column. In the case of the pixel array unit 111, two (two systems of) output lines are provided for every column. The circuits of the pixels of one column are alternately connected to these two output lines by every other row. For example, the circuits of the pixels in odd-numbered rows from the top are connected to one output line, and the circuits of the pixels in even-numbered rows are connected to the other output line. In the case of the example of FIG. 7, the circuit of the pixel 121 is connected to a first output line (VSL1), and the circuit of the pixel 122 is connected to a second output line (VSL2).

Note that FIG. 7 illustrates only the output lines of one column for convenience of description, but in practice, two output lines are similarly provided for each column. To each output line, the circuits of the pixels in that column are connected every other row.

The selection unit 112 has switches for connecting respective output lines of the pixel array unit 111 to inputs of the ADC 113, and is controlled by the control unit 101 to control connection between the pixel array unit 111 and the ADC 113. That is, a pixel signal read from the pixel array unit 111 is supplied to the ADC 113 via the selection unit 112.

The selection unit 112 has a switch 131, a switch 132, and a switch 133. The switch 131 (selection SW) controls connection of two output lines corresponding to the same column. For example, when the switch 131 is turned on (ON), the first output line (VSL1) and the second output line (VSL2) are connected, and when the switch 131 is turned off (OFF), they are disconnected.

Although details will be described later, in the solid-state imaging device 1, one ADC is provided for each output line (column ADC). Therefore, assuming that both the switch 132 and the switch 133 are on, if the switch 131 is turned on, the two output lines of the same column are connected, and the circuit of one pixel is connected to two ADCs. Conversely, when the switch 131 is turned off, the two output lines of the same column are disconnected, and the circuit of one pixel is connected to one ADC. That is, the switch 131 selects the number of ADCs (column ADCs) as output destinations of the signal of one pixel.

Although details will be described later, by controlling the number of ADCs as output destinations of the pixel signals by the switch 131 as described above, the solid-state imaging device 1 can output more various pixel signals according to the number of the ADCs. That is, the solid-state imaging device 1 can achieve more various data outputs.

The switch 132 controls connection between the first output line (VSL1) corresponding to the pixel 121 and the ADC corresponding to the output line. When the switch 132 is turned on (ON), the first output line is connected to one input of a comparator of the corresponding ADC. Furthermore, when it is turned off (OFF), they are disconnected.

The switch 133 controls connection between the second output line (VSL2) corresponding to the pixel 122 and the ADC corresponding to the output line. When the switch 133 is turned on (ON), the second output line is connected to one input of the comparator of the corresponding ADC. Furthermore, when it is turned off (OFF), they are disconnected.

The selection unit 112 can control the number of ADCs (column ADCs) as output destinations of the signal of one pixel by switching the states of such switches 131 to 133 according to control of the control unit 101.

Note that the switch 132 and the switch 133 (either one or both) may be omitted, and each output line may be constantly connected to the ADC corresponding to the output line. However, by allowing these switches to control connection and disconnection thereof, the range of selection of the number of ADCs (column ADCs) as output destinations of the signal of one pixel is expanded. That is, by providing these switches, the solid-state imaging device 1 can output more various pixel signals.

Note that FIG. 7 illustrates only the configuration with respect to one column of output lines, but in practice, the selection unit 112 has a configuration similar to that illustrated in FIG. 7 (the switch 131 to the switch 133) for every column. That is, the selection unit 112 performs connection control similar to that described above for each column according to control of the control unit 101.

The ADC 113 A-D converts each of pixel signals supplied from the pixel array unit 111 via each output line, and outputs it as digital data. The ADC 113 has an ADC (column ADC) for every output line from the pixel array unit 111. That is, the ADC 113 has a plurality of column ADCs. The column ADC corresponding to one output line is a single-slope ADC having a comparator, a D/A converter (DAC), and a counter.

The comparator compares a DAC output thereof with the signal value of a pixel signal. The counter increments a count value (digital value) until the pixel signal and the DAC output become equal. The comparator stops the counter when the DAC output reaches the signal value. Thereafter, the signals digitized by the counters 1 and 2 are output to the outside of the solid-state imaging device 1 from DATA1 and DATA2.

After outputting data for the next A/D conversion, the counter returns the count value to an initial value (for example, 0).

The ADC 113 has two systems of column ADCs for each column. For example, a comparator 141 (COMP1), a DAC 142 (DAC1), and a counter 143 (counter 1) are provided for the first output line (VSL1), and a comparator 151 (COMP2), a DAC 152 (DAC2), and a counter 153 (counter 2) are provided for the second output line (VSL2). Although not illustrated, the ADC 113 has a similar configuration for output lines of other columns.

However, among these configurations, the DAC can be shared. Sharing of DAC is performed for every system. That is, the DAC of the same system in each column is shared. In the case of the example of FIG. 7, the DAC corresponding to the first output line (VSL1) of each column is shared as the DAC 142, and the DAC corresponding to the second output line (VSL2) of each column is shared as the DAC 152. Note that the comparator and the counter are provided for every system of the output lines.

The constant current circuit unit 114 is a constant current circuit connected to each output line, and is driven by being controlled by the control unit 101. The circuit of the constant current circuit unit 114 is configured by, for example, a metal oxide semiconductor (MOS) transistor or the like. Although this circuit configuration is arbitrary, in FIG. 7, for convenience of explanation, a MOS transistor 161 (LOAD1) is provided for the first output line (VSL1), and a MOS transistor 162 (LOAD2) is provided for the second output line (VSL2).

Upon receiving a request from the outside such as a user, the control unit 101 selects a read mode, controls the selection unit 112, and controls connection to the output lines, for example. Furthermore, the control unit 101 controls driving of the column ADC according to the selected read mode. Moreover, the control unit 101 controls driving of the constant current circuit unit 114 as necessary besides the column ADC, and controls driving, such as reading rate and timing for example, of the pixel array unit 111.

That is, the control unit 101 can not only control the selection unit 112 but also operate each unit other than the selection unit 112 in more various modes. Therefore, the solid-state imaging device 1 can output more various pixel signals.

Note that the number of each unit illustrated in FIG. 7 is arbitrary as long as it is sufficient. For example, three or more systems of output lines may be provided for each column. Furthermore, the number of pixel signals output in parallel to the outside may be increased by increasing the number of parallel pixel signals output from the ADC 132 or the number of ADCs 132 itself illustrated in FIG. 7.

The example of the functional configuration of the solid-state imaging device according to one embodiment of the present disclosure has been described above with reference to FIG. 7.

1.3. Circuit Configuration of Unit Pixel

Figure 8:
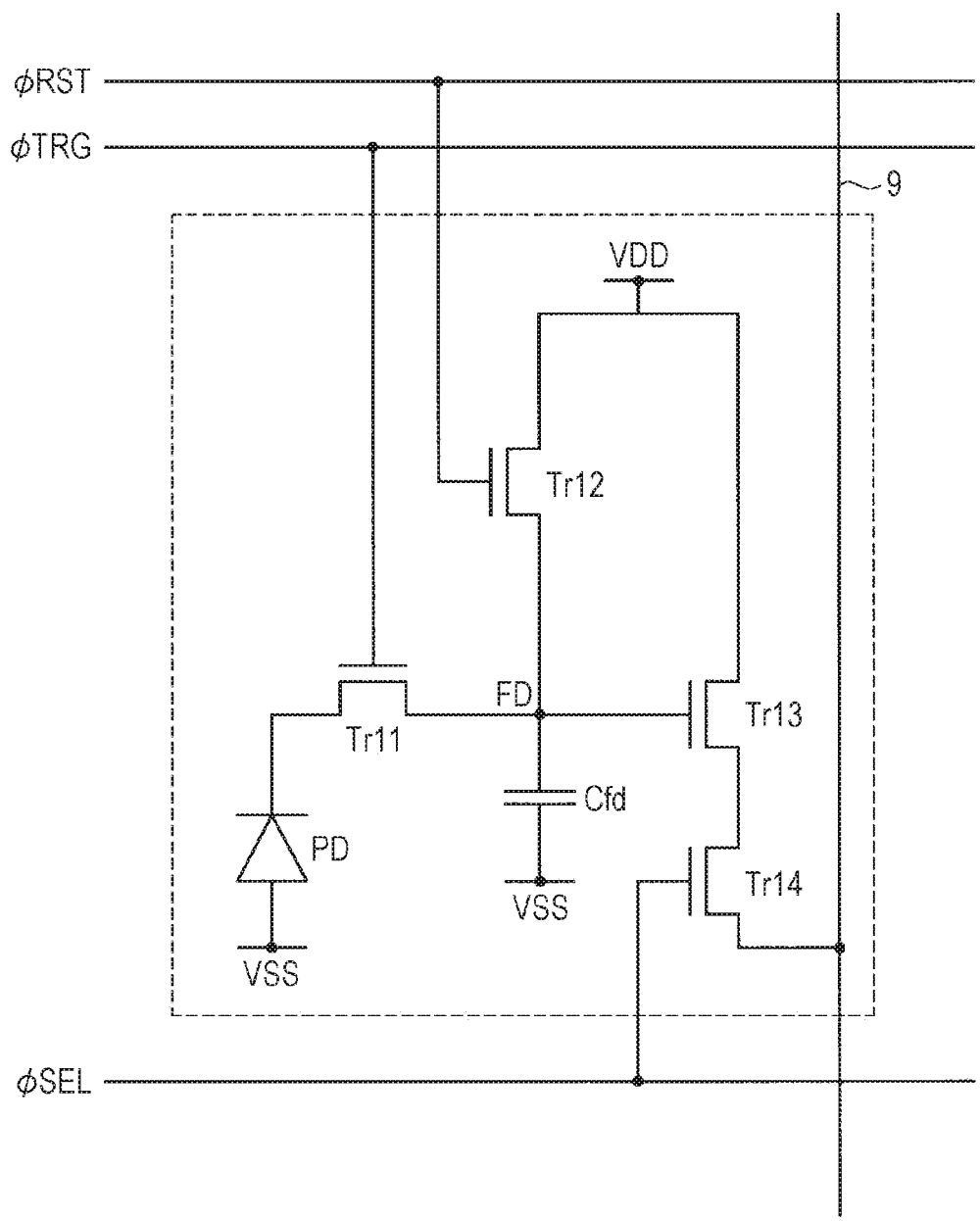
FIG. 8 is a diagram illustrating an example of a circuit configuration of a unit pixel according to one embodiment of the present disclosure.

Next, an example of a circuit configuration of the unit pixel will be described with reference to FIG. 8. FIG. 8 is a diagram illustrating an example of a circuit configuration of a unit pixel according to one embodiment of the present disclosure. As illustrated in FIG. 8, the unit pixel 121 according to one embodiment of the present disclosure includes a photoelectric conversion unit, for example, a photodiode PD, and four pixel transistors. The four pixel transistors are, for example, a transfer transistor Tr11, a reset transistor Tr12, an amplification transistor Tr13, and a selection transistor Tr14. These pixel transistors can be formed by, for example, n-channel MOS transistors.

The transfer transistor Tr11 is connected between a cathode of the photodiode PD and a floating diffusion part FD. Signal charges (here, electrons) that have been photoelectrically converted by the photodiode PD and accumulated therein are transferred to the floating diffusion part FD by applying a transfer pulse φTRG to a gate. Note that reference sign Cfd schematically indicates parasitic capacitance of the floating diffusion part FD.

The reset transistor Tr12 has a drain connected to a power supply VDD and a source connected to the floating diffusion part FD. Then, prior to transfer of the signal charges from the photodiode PD to the floating diffusion part FD, a reset pulse φRST is applied to a gate to reset a potential of the floating diffusion part FD.

The amplification transistor Tr13 has a gate connected to the floating diffusion part FD, a drain connected to the power supply VDD, and a source connected to a drain of the selection transistor Tr14. The amplification transistor Tr13 outputs the potential of the floating diffusion part FD after being reset by the reset transistor Tr12 as a reset level to the selection transistor Tr14. Moreover, the amplification transistor Tr13 outputs the potential of the floating diffusion part FD after the signal charges are transferred by the transfer transistor Tr11, as a signal level to the selection transistor Tr14.

The selection transistor Tr14 has, for example, a drain connected to the source of the amplification transistor Tr13 and a source connected to the vertical signal line 9. Then, by applying a selection pulse φSEL to a gate of the selection transistor Tr14, the selection transistor Tr14 is turned on and outputs the signal output from the amplification transistor Tr13 to the vertical signal line 9. Note that for the selection transistor Tr14, a configuration that it is connected between the power supply VDD and the drain of the amplification transistor Tr13 may be employed.

Note that in a case where the solid-state imaging device 1 according to the present embodiment is configured as a solid-state imaging device of stacked type, for example, elements such as a photodiode and a plurality of MOS transistors are formed in the sensor die 23021 at FIG. 2B or 2C. Further, the transfer pulse, the reset pulse, the selection pulse, and the power supply voltage are supplied from the logic die 23024 at FIG. 2B or 2C. Furthermore, an element at a stage subsequent to the vertical signal line 9 connected to the drain of the selection transistor is configured by the logic circuit 23014 and formed in the logic die 23024.

The example of the circuit configuration of the unit pixel has been described above with reference to FIG. 8.

2. Outline of PUF

Next, an outline of physically unclonable function (PUF) will be explained. The PUF is a function that outputs a value unique to a device by using physical characteristics that are difficult to copy. Examples of the PUF include Arbiter PUF, SRAM PUB, Glitch PUF, and the like.

For example, the Arbiter PUF is a technology that uses a delay difference between signals that arrive at a circuit called Arbiter through two routes, so as to output a value unique to the device. Furthermore, the SRAM PUF is a technology that uses a difference in an initial value immediately after an SRAM (Static Random Access Memory) is powered on, so as to output a value unique to the device. Furthermore, the Glitch PUF is a technology that uses a phenomenon called a glitch that occurs due to a delay relationship between input and output signals of each gate constituting a logic circuit, so as to output a value unique to the device.

The value unique to a device generated by using such a PUF is, because of its characteristic of being difficult to copy, it is expected to be used for example as an identifier (ID) for identifying an individual device or as what is called key information (for example, a key for encryption).

The outline of the PUF has been explained above. Note that in the following description, a device-specific value generated using the above PUF will also be referred to as a "PUF value".

3. First Embodiment

As a first embodiment, a solid-state image sensor that internally completes an encryption processing will be described. Conventionally, there has been a technique of generating an encryption key inside an imaging device on the basis of unique information unique to a solid-state image sensor. However, if the unique information is output from the solid-state image sensor and encrypted by a functional block different from the solid-state image sensor, the unique information used for encryption may leak.

Accordingly, in the first embodiment, a solid-state image sensor that internally completes encryption processing using unique information without outputting the unique information to the outside will be described.

3.1. Configuration Example

Figure 9:
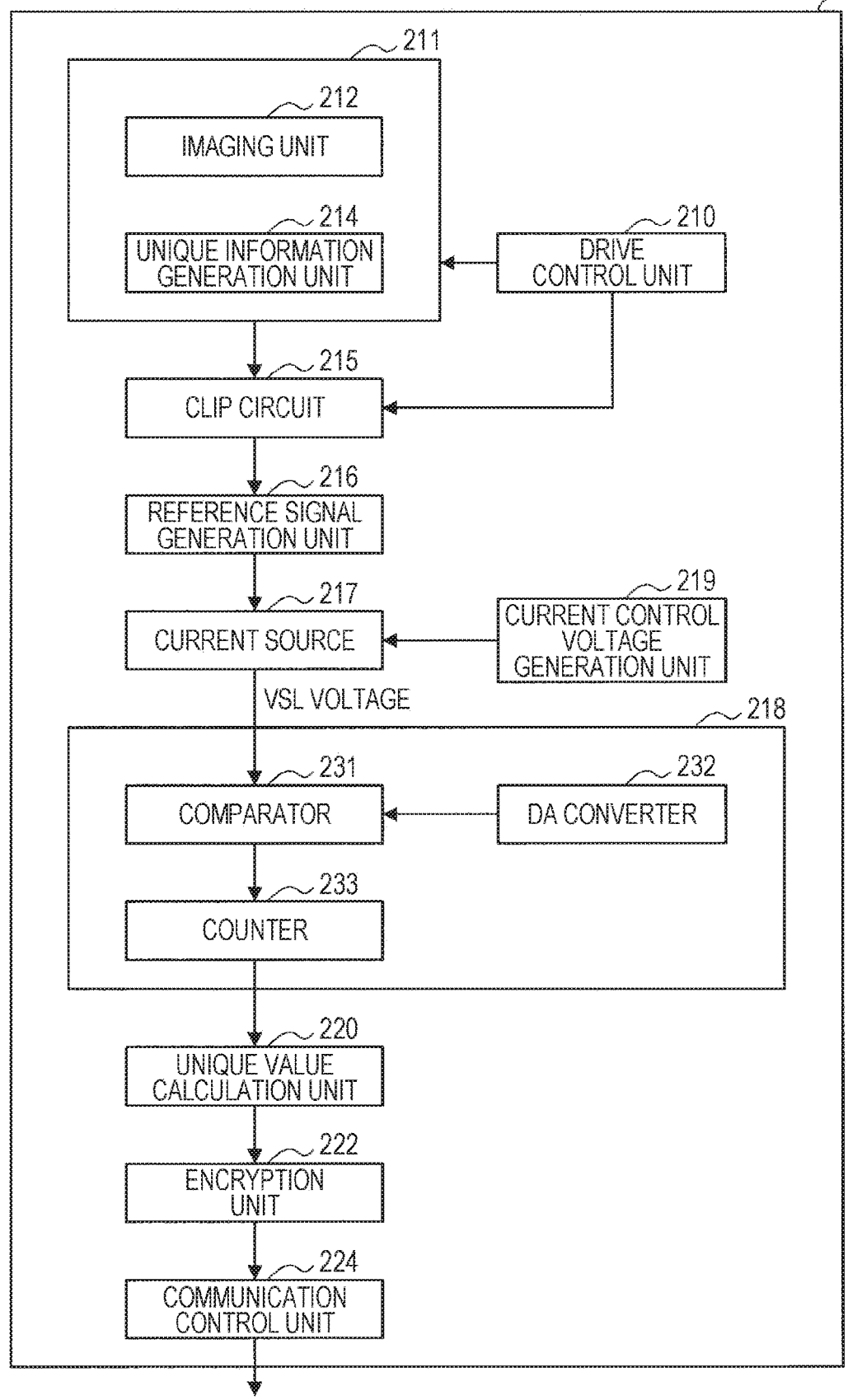
FIG. 9 is an explanatory diagram illustrating a functional configuration example of a solid-state image sensor according to a first embodiment of the present disclosure.

FIG. 9 is an explanatory diagram illustrating a functional configuration example of the solid-state image sensor according to the first embodiment of the present disclosure. FIG. 9 illustrates a functional configuration example of a solid-state imaging device 1 that internally completes encryption processing using unique information. Hereinafter, the functional configuration example of the solid-state image sensor according to the first embodiment of the present disclosure will be described using FIG. 9.

As illustrated in FIG. 9, the solid-state imaging device 1 according to the first embodiment of the present disclosure includes a drive control unit 210, a pixel array unit 211 that includes an imaging unit 212 and a unique information generation unit 214 and includes predetermined rows and columns, a clip circuit 215, a reference signal generation unit 216, a current source 217, a detection unit 218, a unique value calculation unit 220, an encryption unit 222, and a communication control unit 224.

The drive control unit 210 generates a signal for driving the imaging unit 212 and the unique information generation unit 214 described later on the basis of a predetermined input clock and data, and drives the imaging unit 212 and the unique information generation unit 214. The drive control unit 210 can include, for example, the control circuit 8, the vertical drive circuit 4, and the horizontal drive circuit 6 in the configuration of the solid-state imaging device 1 described with reference to FIG. 1. Furthermore, the drive control unit 210 can be provided in the control circuit 23013 illustrated in FIGS. 2A and 2B.

The drive control unit 210 may have a function to switch between driving the imaging unit 212 and driving the unique information generation unit 214 when driving the pixel array unit 211. By the drive control unit 210 having the function to switch between driving the imaging unit 212 and driving the unique information generation unit 214, it is possible to share a circuit between the imaging unit 212 and the unique information generation unit 214. Furthermore, by the drive control unit 210 having the function to switch between driving the imaging unit 212 and driving the unique information generation unit 214, a special element for generating unique information is not required, and the unique value is difficult to analyze.

Furthermore, the drive control unit 210 may have a function to separate an element in the pixel array unit 211 that is driven when an image is output and an element that is driven to detect element unique information. Since the drive control unit 210 has the function to divide an element to be driven when outputting an image and an element to be driven to detect element unique information, the element unique information is prevented from being leaked.

Furthermore, the drive control unit 210 may perform control so as to drive with a bias current different from that for driving when outputting an image, when driving for detecting element unique information. When driving for detecting element unique information, by the drive control unit 210 performing control to drive with a bias current different from that for driving when outputting an image, it is possible to suitably drive for stably obtaining a unique value. Specifically, for example, driving of the MOS transistor 161 (LOAD1) and the MOS transistor 162 (LOAD2) in the circuit illustrated in FIG. 7 is changed between when driving for detecting element unique information and when driving for outputting an image. By changing the driving of the MOS transistor 161 (LOAD1) and the MOS transistor 162 (LOAD2), characteristics appearing in the amplification transistor AMP can be changed. By the drive control unit 210 performing control to drive for detecting element unique information with the bias current according to the temperature, driving suitable for more stably obtaining a unique value is possible.

The drive control unit 210 may perform control to drive with a bias current according to a chip temperature of the solid-state imaging device 1 when driving for detecting element unique information with a bias current different from that for driving when outputting an image.

The pixel array unit 211 has unit pixels arranged in predetermined rows and columns, and is configured to output data by a source follower circuit.

The imaging unit 212 has a pixel array in which pixels including a plurality of photoelectric conversion units are arranged in a two-dimensional array, and is driven by the drive control unit 210 to output an analog signal. The circuit configuration of each pixel in the imaging unit 212 is, for example, that illustrated in FIG. 8.

In the unique information generation unit 214, for example, circuits having the same configuration as the pixels provided in the imaging unit 212 are arranged one-dimensionally, and are driven by the drive control unit 210 to output an analog signal. A circuit formed as the unique information generation unit 214 may be manufactured in substantially the same manufacturing process as that for the pixels provided in the imaging unit 212. Furthermore, the drive control unit 210 may switch between driving of the imaging unit 212 and driving of the unique information generation unit 214.

The unique information generation unit 214 may be a pixel provided in an optical black (OPB) region in the pixel array. Each element in a circuit configured as the unique information generation unit 214 has physical variations at the time of manufacturing. In the solid-state imaging device 1 according to the first embodiment of the present disclosure, the analog signal output by this unique information generation unit 214 is used as the basis of unique non-copyable information (element unique information).

An example of a generation source of the analog signal output by the unique information generation unit 214 will be given. In the following description, it is assumed that the unique information generation unit 214 has a configuration similar to that of the pixel 121 illustrated in FIGS. 7 and 8.

(Photodiode PD)

A photodiode PD has a noise component due to a crystal defect at the time of manufacturing. The crystal defect causes variations in dark current. The crystal defect appears as fixed pattern noise.

(Selection Transistor SEL)

A selection transistor SEL has a noise component due to variations in threshold voltage Vth. The variations in the threshold voltage Vth are due to structural factors such as an oxide film, a channel width, a channel length, and impurities. The variations in the threshold voltage Vth appear as fixed pattern noise.

(Reset Transistor RST)

A reset transistor RST also has a noise component due to variations in the threshold voltage Vth. The variations in the threshold voltage Vth are due to structural factors such as an oxide film, a channel width, a channel length, and impurities. The variations in the threshold voltage Vth appear as fixed pattern noise.

(Floating Diffusion Part FD)

A floating diffusion part FD has a noise component due to a crystal defect at the time of manufacturing. The crystal defect causes variations in dark current. The crystal defect appears as fixed pattern noise. When the reset transistor RST switches from on to off, kTC noise (reset noise) appears in the floating diffusion part FD. This kTC noise occurs temporarily. When the reset transistor RST switches from on to off, a feedthrough appears in the floating diffusion part FD. This feedthrough is caused by variations in parasitic capacitance and a threshold value, and appears as fixed pattern noise.

(Amplification Transistor AMP)

An amplification transistor AMP also has a noise component due to variations in the threshold voltage Vth. The variations in the threshold voltage Vth are due to structural factors such as an oxide film, a channel width, a channel length, and impurities. The variations in the threshold voltage Vth appear as fixed pattern noise. Furthermore, the amplification transistor AMP has a noise component caused by overdrive voltage, a noise component caused by thermal noise, a noise component caused by 1/f noise, and a noise component caused by random telegraph noise (RTN). The RTN is considered to be caused by charge trapping and detrapping due to defects in an oxide film. The presence or absence of defects in the oxide film is inherent variations, but what is observed is a binary or multi-valued temporal signal level fluctuation.

These noise components are transmitted to the detection unit 218 in the subsequent stage via a signal line (VSL). During normal driving, among these noise components, a noise component that does not change before and after transfer of a signal is removed by CDS processing. In the present embodiment, when generating a unique value, the solid-state imaging device 1 does not remove these noise components but uses them as element unique information to be the basis of the unique value. By using the noise components included in the analog signal output from the unique information generation unit 214 as the basis of the unique value, the solid-state imaging device 1 can generate a unique value that is difficult to analyze.

The unique information generation unit 214 can be provided, for example, at a position where light from the outside does not reach (shielded position). Providing the unique information generation unit 214 at a light-shielded position enables the solid-state imaging device 1 to stably generate unique information without being affected by external light. Further, the unique information generation unit 214 may have one or more rows of circuits as many as the number of columns of the pixel array of the imaging unit 212. Furthermore, the unique information generation unit 214 may be provided with a row selection switch that operates by a control signal from the drive control unit 210.

The clip circuit 215 is a circuit arranged in n columns in the same number of columns as the number of columns of the pixel array unit 211, and is a source follower circuit connected in parallel with the source follower circuit of the pixel array unit 211. The clip circuit 215 has a function of clipping the voltages (VSL voltages) of the output lines for every column to make it fall within a predetermined range.

FIG. 10A is an explanatory diagram illustrating a circuit configuration example of the clip circuit 215. The clip circuit 215 is a source follower circuit capable of selecting a row and connected to the output lines VSL in parallel with the pixel. The clip circuit 215 includes transistors CLPSEL and CLPAMP corresponding to the respective output lines VSL. The transistor CLPSEL is a transistor that operates linearly, and performs control to connect a source of the transistor CLPAMP and the output line VSL. The control is performed by a clip selection pulse. The transistor CLPAMP is a transistor that operates in saturation, and outputs a signal according to an input when a bias current is supplied by a current source, similarly to the amplification transistor AMP of the pixel. The input is given as a clipping voltage, which is usually an intermediate potential of about 1 V to 2 V.

In a selected state, when an output voltage of the source follower (pixels in the selected row) connected to the output line VSL becomes lower than the voltage output according to the clipping voltage, the bias current preferentially flows in the clip circuit 215. Consequently, the source follower output of the pixel on the selected row no longer functions, and the voltage of the output line VSL is clipped to the output level according to the clipping voltage. As the clipping voltage, a common DC voltage is supplied to a unit clip circuit for every column, but at this time, similarly to the pixel source follower, the threshold value variations and the overdrive voltage vary individually.

The reference signal generation unit 216 averages the VSL voltages output by the clip circuit 215 for every column and outputs the averaged VSL voltage. The current source 217 is a circuit for supplying the constant current and outputting the VSL voltage, and is driven by a current control voltage generation unit 219. The current source 217 is arranged in n columns and forms a source follower circuit with an amplification transistor in the unit pixel. The current control voltage generation unit 219 uses a bandgap reference circuit to generate a current control voltage so that the current value of the current source 217 does not depend on temperature.

The detection unit 218 performs signal processing for converting the analog signal output by the unique information generation unit 214 into a digital signal. The detection unit 218 includes a comparator 231, a DA converter 232, and a counter 233. The comparator 231 compares the VSL voltage output by the current source 217 with a reference waveform output by the DA converter 232 to convert the voltage into time. The comparator 231 includes an input capacitor provided on an input side and a switch that short-circuits input and output of the comparator 231. The DA converter 232 generates a reference waveform supplied to the comparator 231. The counter 233 has a function of counting until an output of the comparator 231 is inverted and converting time into a count number.

The detection unit 218 outputs the converted digital signal to the unique value calculation unit 220. The detection unit 218 can have, in addition to the function to convert an analog signal into a digital signal, a function to perform a difference process on two input signals, and a function to remove variations generated in the detection unit 218 itself. By providing the function to remove variations generated in the detection unit 218 itself, no extra variations are added to the signal from the unique information generation unit 214, and thus it is possible to improve quality of the signal that is the basis of the unique value. Furthermore, the detection unit 218 may perform a column parallel process or a pixel parallel process on the analog signal output by the unique information generation unit 214.

The detection unit 218 may include a capacitor that clamps the potential of a signal line and a switch that sets one end of the capacitor to a reference potential. Specifically, the ADC 113 illustrated in FIG. 7 may include a switch that connects one end of a capacitor element provided on the input side of the comparators 141 and 151 to the output side of the comparators 141 and 151. By connecting one end of the capacitor element to the output side of the comparators 141 and 151 by the switch, a diode-connected transistor is generated among the transistors included in the comparators 141 and 151. Consequently, one end of the capacitor that clamps the potential of the signal line is set to the predetermined reference potential, and thus variations in an analog region can be removed. Furthermore, the detection unit 218 may also perform a difference process on a digital value after AD conversion. The detection unit 218 can remove variations in a digital region by performing the difference process on the digital value after AD conversion.

Furthermore, the detection unit 218 may have a function to shift a clamp level as described later. By shifting the clamp level, the detection unit 218 can optimize an analog value distribution centered on a predetermined reference when converting an analog value into a digital value. By optimizing the analog value distribution, it is possible to obtain unique information output by the unique information generation unit 214 without loss.

In a case where a plurality of detection units 218 is arranged, each detection unit 218 may have a function to obtain a difference between a signal input to each detection unit 218 and a reference signal common to the plurality of detection units 218. In this case, a reference signal common to the plurality of detection units 218 may be substantially the same as the average of signals that are each input to the detection units 218.

Between the unique information generation unit 214 and the detection unit 218, a memory, particularly an analog memory, for temporarily holding the unique information output by the unique information generation unit 214 may be provided. The analog memory may be a parasitic capacitance of a signal line as described below. Furthermore, in a case where analog memories are provided respectively between the unique information generation unit 214 and the plurality of detection units 218, a switch for short-circuiting the analog memories may be provided. It becomes easy to generate unique information, and the unique information held in each analog memory is erased by shorting-circuiting and averaging the analog memories.

FIG. 10B is an explanatory diagram illustrating a circuit configuration example of the reference signal generation unit 216, the current source 217, and the comparator 231. FIG. 10B illustrates an (n−1)th output line VSL(n−1), an nth output line VSL(n), and an (n+1)th output line VSL(n+1).

The output line VSL(n−1) is provided with switches 251a and 252a as the reference signal generation unit 216, and a parasitic capacitance 253a exists on the output line VSL(n−1). The output line VSL(n) is provided with switches 251b and 252b as the reference signal generation unit 216, and a parasitic capacitance 253b exists on the output line VSL(n). The output line VSL(n+1) is provided with switches 251c and 252c as the reference signal generation unit 216, and a parasitic capacitance 253c exists on the output line VSL(n+1).

As the current source 217, a transistor 261a is connected to one end of the switch 252a, a transistor 261b is connected to one end of the switch 252b, and a transistor 261c is connected to one end of the switch 252c.

On the output line VSL(n−1), input capacitors 271a and 272a, switches 273a and 274a, and a comparator 275a exist as the comparator 231. On the output line VSL(n), input capacitors 271b and 272b, switches 273b and 274b, and a comparator 275b exist as the comparator 231. On the output line VSL(n+1), input capacitors 271c and 272c, switches 273c and 274c, and a comparator 275c exist as the comparator 231.

Figure 11A:
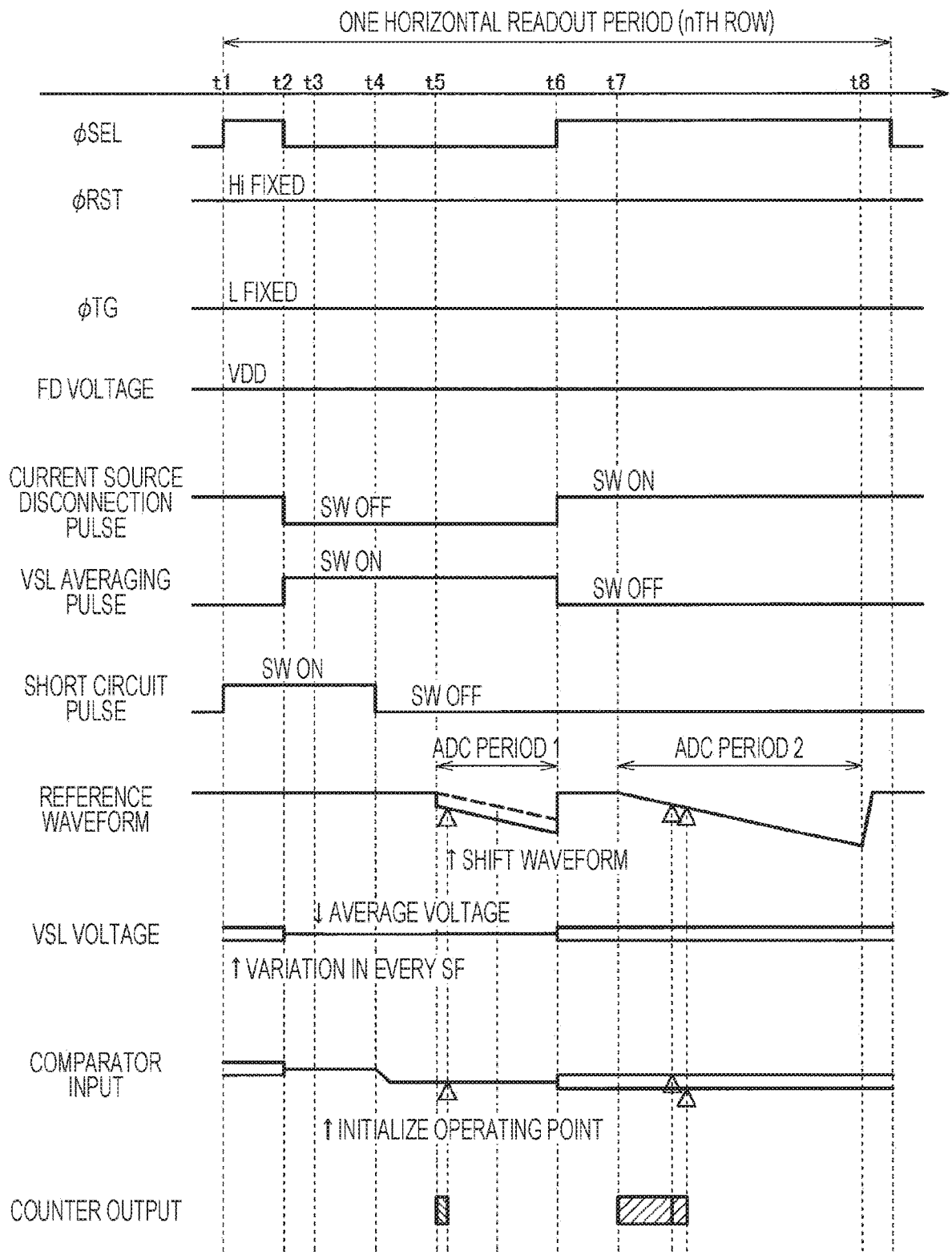
FIG. 11A is an explanatory diagram illustrating operations when generating unique information according to the same embodiment in a timing chart.

FIG. 11A is an explanatory diagram illustrating operations of the reference signal generation unit 216, the current source 217, and the comparator 231 when generating unique information in a timing chart. Operations of respective elements provided on the output line VSL(n−1) or along the output line VSL(n−1) will be described below.

One horizontal readout period starts at time t1. At this point, a row selection signal φSEL goes high and row selection starts. At this point, the reset transistor RST is in an on state, and thus the voltage of the floating diffusion part FD is fixed to VDD. Thus, variations in the floating diffusion part FD are removed. Furthermore, when generating the unique information, a transfer pulse φTRG is fixed to low. Since the transfer pulse φTRG is fixed to low, the transfer transistor TRG is turned off, and variations in the photodiode PD can be removed.

Further, at time t1, a current source disconnection pulse for disconnecting the current source 217 is high, and the switch 252a is on. Furthermore, at time t1, the VSL averaging pulse that averages the VSL voltage is low, and the switch 251a is off. Thus, even when the source follower is operating, variation information of every source follower is output to the output line VSL.

At time t2, the row selection signal (selection pulse) φSEL and the current source disconnection pulse simultaneously become low, and the VSL voltage for every column is held in the VSL parasitic capacitance 253a. Furthermore, at time t2, the VSL averaging pulse goes high and the VSL voltage in each column is averaged. This averaged VSL voltage becomes the reference signal.

At time t3, an internal offset of the comparator 275a and a difference between the VSL voltage and the reference waveform are charged in the input capacitor 272a, and the operating point of the comparator 275a is initialized.

At time t4, a short circuit pulse goes low, turning off the switches 273a and 274a. Thus, kTC noise and feedthrough variations occur in the switches 273a and 274a.

Times t5 to t6 are a first AD conversion period (ADC period 1). During this period, the DA converter 232 changes the reference waveform linearly with a predetermined slope. Then, the comparator 275a AD-converts the reference signal using the reference waveform. The DA converter 232 may have a function to shift the reference waveform. That is, the DA converter 232 may have a function to shift a clamp level. The DA converter 232 can add an offset to an output of the counter 233 by shifting the reference waveform. In this ADC period 1, an inversion delay of the comparator 275a, a delay of the reference waveform, and a clock delay of the counter occur. Note that a triangle in FIG. 11A indicates an inversion timing of the comparator 275a.

When the ADC period 1 ends at time t6, the row selection signal φSEL goes high, the current source disconnection pulse goes high, and the VSL averaging pulse goes low. That is, the switch 251a turns off and the switch 252a turns on. Thus, even when the source follower is operating, variation information (variations in output of the amplification transistor) for every source follower is output to the output line VSL.

Times t7 to t8 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11A indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, it is possible to remove variations generated in the detection unit 218. Therefore, it is possible to prevent the element unique information from including the variations generated in the detection unit 218.

Furthermore, since the output of the counter 233 is offset in the ADC period 1, even if the above difference process is performed, variations due to the unique information generation unit 214 will not be lost. The variations due to the unique information generation unit 214 are normally distributed with the reference signal as the center. Therefore, if there is no offset, a negative value occurs in the variations due to the unique information generation unit 214, and all values less than or equal to 0 become 0.

It is desirable that a slope of the reference waveform during AD conversion is adjusted (analog gain adjustment) so that a desired digital value can be obtained. Furthermore, when the element unique information is read, the current of the current source (drain current Id) may be smaller than that in normal reading. An overdrive voltage is obtained by $2 \times Id/gm$ and variations thereof are proportional to the overdrive voltage. Thus, if the drain current Id is reduced, a variation component of the overdrive voltage included in the source follower becomes relatively small. That is, information of variations in the threshold value of the amplification transistor AMP can be mainly detected. Furthermore, when the element unique information is read, the current of the current source (drain current Id) may be made larger than that in normal reading. By increasing the current of the current source, the variation component of the overdrive voltage in the variation information included in the source follower can also be relatively increased.

Thermal noise of the amplification transistor AMP, 1/f noise, RTN, and thermal noise of peripheral circuits are included as temporal noise, but these can be suppressed by performing multiple readings and adding (averaging).

In order to suppress deterioration with time, it is desirable that the solid-state imaging device 1 be drive-controlled under the following conditions. Considering hot carrier injection, it is desirable that the current during operation is small. That is, it is desirable to control the bias current to be small. Furthermore, similarly considering hot carrier injection, it is desirable that the operation time is short. For example, it is desirable to control so as to drive only at a time of activation or request. Furthermore, similarly considering hot carrier injection, it is desirable that no current flows when not in use. That is, it is desirable to turn off the selection transistor SEL when not in use. Furthermore, considering destruction of the oxide film, it is desirable that the voltage difference between the gate and the source or drain of the target element is small when not in use. That is, it is desirable to turn on the reset transistor RST when not in use. Furthermore, considering substrate hot carrier injection, it is desirable that the unique information generation unit 214 is shielded from light.

A high-level potential of the selection pulse φSEL may be about VDD (2.7 V), or may be an intermediate potential (about 1 V to 1.5 V). If a potential difference (VDS) between the drain and source of the selection transistor SEL is taken to cause a saturation operation, a source follower is formed. For example, assuming that the drain voltage of the selection transistor SEL is 2.7 V, the drain side of the selection transistor SEL (source side of the amplification transistor AMP) is usually about 2.2 V. On the other hand, if VDS of the selection transistor SEL is sufficiently taken (if there is a difference of at least about several hundred to 700 mV), it is possible to cause the saturation operation. Consequently, an output according to a gate voltage of the selection transistor SEL is transmitted to the output line VSL. Similarly to the amplification transistor AMP, when the selection transistor SEL operates in saturation, the threshold value and the overdrive voltage vary from element to element, and thus variations in the threshold value of the selection transistor SEL and the overdrive voltage can be detected. At this time, for the pixels in a non-selected row and the clip circuit 215, the selection switch is turned off, and they do not participate in the reading.

The current control voltage generation unit 219 can change the overdrive voltage by driving the current control voltage with different voltages in the ADC period 1 and the ADC period 2. The change amount of the overdrive voltage at this time varies, and thus the change amount of the overdrive voltage can be detected as element unique information.

Figure 11B:
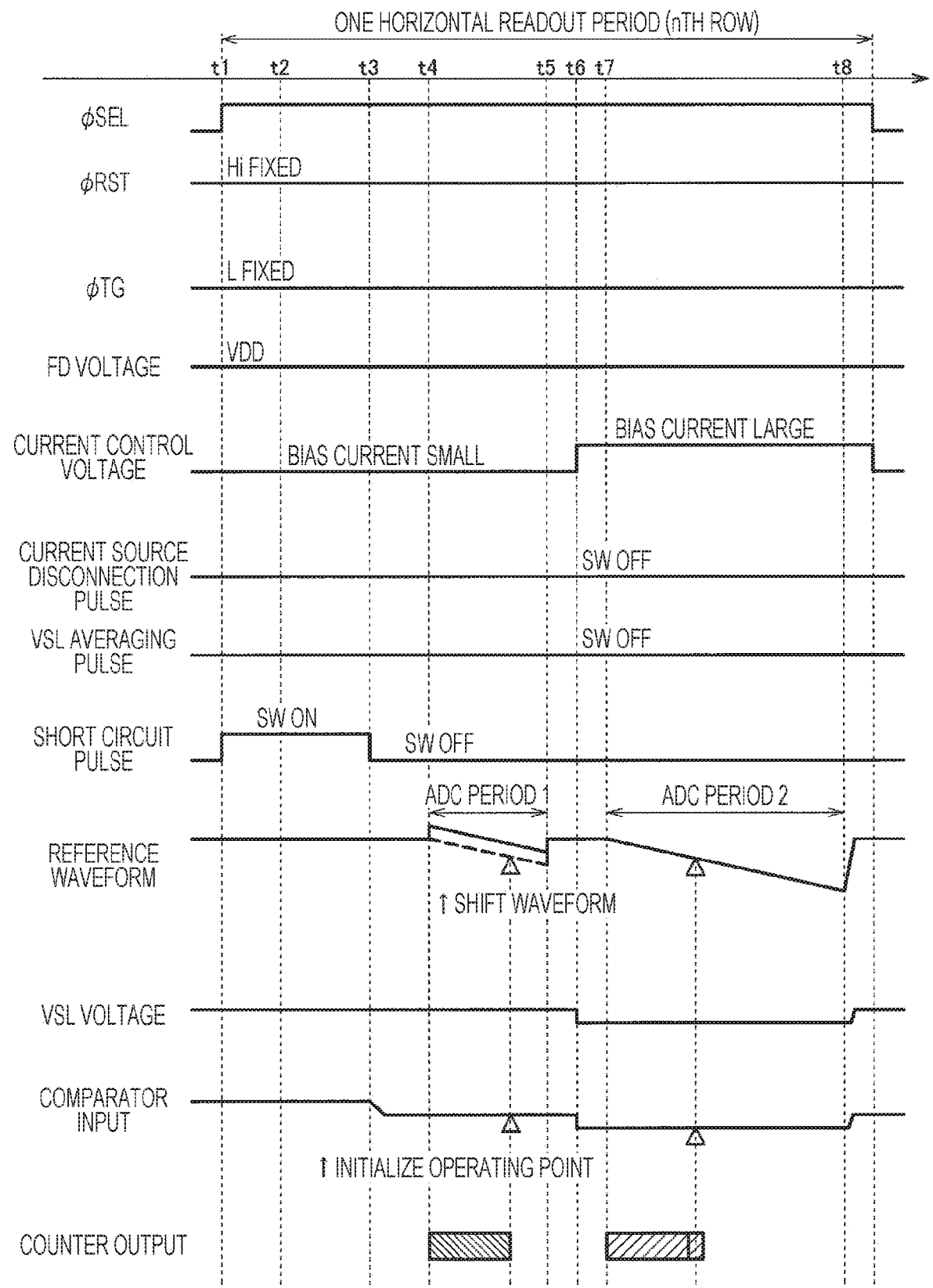
FIG. 11B is an explanatory diagram illustrating operations when generating unique information according to the same embodiment in a timing chart.

FIG. 11B is an explanatory diagram illustrating operations of the reference signal generation unit 216, the current source 217, and the comparator 231 when generating unique information in a timing chart. Operations of respective elements provided on the output line VSL(n−1) or along the output line VSL(n−1) will be described below. It differs from the timing chart of FIG. 11A in that the current source disconnection pulse and the VSL averaging pulse are always at low level.

One horizontal readout period starts at time t1. At this point, the row selection signal φSEL goes high and row selection starts. At this point, the reset transistor RST is in an on state, and thus the voltage of the floating diffusion part FD is fixed to VDD. Thus, variations in the floating diffusion part FD are removed. Furthermore, when generating the unique information, the transfer pulse φTRG is fixed to low. Since the transfer pulse φTRG is fixed to low, the transfer transistor TRG is turned off, and variations in the photodiode PD can be removed.

At time t2, an internal offset of the comparator 275a and a difference between the VSL voltage and the reference waveform are charged in the input capacitor 272a, and the operating point of the comparator 275a is initialized.

At time t3, the short circuit pulse goes low, turning off the switches 273a and 274a. Thus, kTC noise and feedthrough variations occur in the switches 273a and 274a.

Times t4 to t5 are a first AD conversion period (ADC period 1). During this period, the DA converter 232 changes the reference waveform linearly with a predetermined slope. Then, the comparator 275a AD-converts the reference signal using the reference waveform. In this ADC period 1, an inversion delay of the comparator 275a, a delay of the reference waveform, and a clock delay of the counter occur. Note that a triangle in FIG. 11B indicates an inversion timing of the comparator 275a.

Subsequently, at time t6, the current control voltage generation unit 219 controls the current control voltage so as to increase the bias current.

Times t7 to t8 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11B indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, it is possible to remove variations generated in the detection unit 218. Only bias current values are different between the ADC period 1 and the ADC period 2, and thus threshold value information is canceled and it is possible to extract the component of the overdrive voltage. Here, gain coefficient β of the transistor is $(W/L) \times \mu \times C_{ox}$. W is a gate width, L is a gate length, μ is electron mobility, and $C_{ox}$ is an oxide film capacity per unit area. Furthermore, the mutual inductance gm is approximately $2^{1/2} \times \beta \times Id$. Therefore, the overdrive voltage is $2 \times Id/gm = (2 \times Id/\beta)^{1/2}$. β has element-specific variations, and thus an output according to the bias current and element variations can be obtained. The mobility μ is included in β, and the mobility μ includes temperature characteristics. Therefore, as will be described later, by adjusting the bias current and the slope and shift amount of the reference waveform according to the temperature, it is possible to mitigate characteristic changes due to temperature and perform AD conversion in an appropriate range. Lattice scattering is dominant at operating temperatures of the solid-state imaging device 1, and thus a temperature characteristic of the mobility depends on an absolute temperature $T^{-3/2}$.

Even when operating according to the timing chart illustrated in FIG. 11B, the high-level potential of the selection pulse φSEL may be about VDD (2.7 V), or may be an intermediate potential (about 1 V to 1.5 V). If the potential difference (VDS) between the drain and source of the selection transistor SEL is taken to cause a saturation operation, a source follower is formed.

The RTN is a component that fluctuates with time, but an element that generates it is fixed (FPN component). Therefore, detection of RTN is also possible.

In general, the RTN is generated during a process of capturing or emitting electrons to a defect level and has a large amplitude, and thus it produces a binary or multilevel output. Since RTN detection usually involves a temporal change, it is either observed continuously or is sampled multiple times. Here, the temporal change refers to having a time constant generated by a difference between energy level that a defect has and Fermi level of channel electrons of the amplification transistor AMP of the pixel, with which a binary or multiple states occur at an arbitrary timing.

Figure 11C:
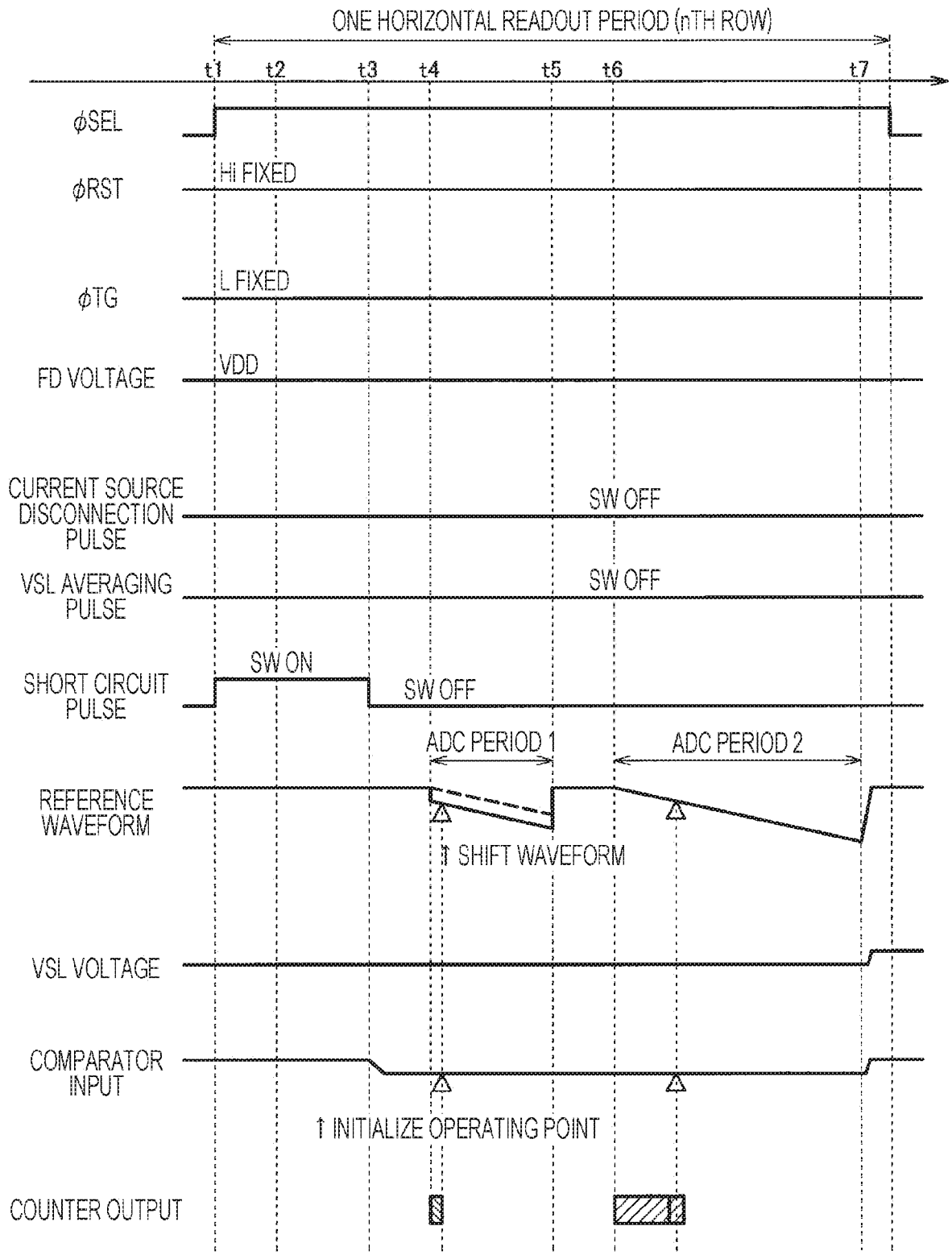
FIG. 11C is an explanatory diagram illustrating operations when generating unique information according to the same embodiment in a timing chart.

FIG. 11C is an explanatory diagram illustrating operations of the reference signal generation unit 216, the current source 217, and the comparator 231 when generating unique information in a timing chart. Operations of respective elements provided on the output line VSL(n−1) or along the output line VSL(n−1) will be described below.

One horizontal readout period starts at time t1. At this point, the row selection signal φSEL goes high and row selection starts. At this point, the reset transistor RST is in an on state, and thus the voltage of the floating diffusion part FD is fixed to VDD. Thus, variations in the floating diffusion part FD are removed. Furthermore, when generating the unique information, the transfer pulse φTRG is fixed to low. Since the transfer pulse φTRG is fixed to low, the transfer transistor TRG is turned off, and variations in the photodiode PD can be removed.

At time t2, an internal offset of the comparator 275a and a difference between the VSL voltage and the reference waveform are charged in the input capacitor 272a, and the operating point of the comparator 275a is initialized.

At time t3, the short circuit pulse goes low, turning off the switches 273a and 274a. Thus, kTC noise and feedthrough variations occur in the switches 273a and 274a.

Times t4 to t5 are a first AD conversion period (ADC period 1). During this period, the DA converter 232 changes the reference waveform linearly with a predetermined slope. Then, the comparator 275a AD-converts the reference signal using the reference waveform. In this ADC period 1, an inversion delay of the comparator 275a, a delay of the reference waveform, and a clock delay of the counter occur. Note that a triangle in FIG. 11C indicates an inversion timing of the comparator 275a.

Subsequently, at time t6, the current control voltage generation unit 219 controls the current control voltage so as to increase the bias current.

Times t7 to t8 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11C indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, it is possible to remove variations generated in the detection unit 218. Furthermore, it is possible to obtain data as to whether or not RTN has occurred by this difference process. By performing this data obtainment multiple times, an occurrence frequency of RTN for every amplification transistor AMP of the pixel can be evaluated. Therefore, in a case of having a voltage amplitude larger than the thermal noise that the amplifier circuit has or the voltage amplitude generated at 1/f, it is possible to have the address of the element that could detect it as element unique information. In this case, the RTN changes in time constant, that is, changes in detection probability on the basis of the energy difference as described above, and thus it is desirable to have an address table for every temperature.

Even when operating according to the timing chart illustrated in FIG. 11C, the high-level potential of the selection pulse φSEL may be about VDD (2.7 V), or may be an intermediate potential (about 1 V to 1.5 V). If the potential difference (VDS) between the drain and source of the selection transistor SEL is taken to cause a saturation operation, a source follower is formed.

As described above, the clip circuit 215 is also a source follower circuit, and element unique information can be obtained by an operation similar to that illustrated in FIG. 11A.

Figure 11D:
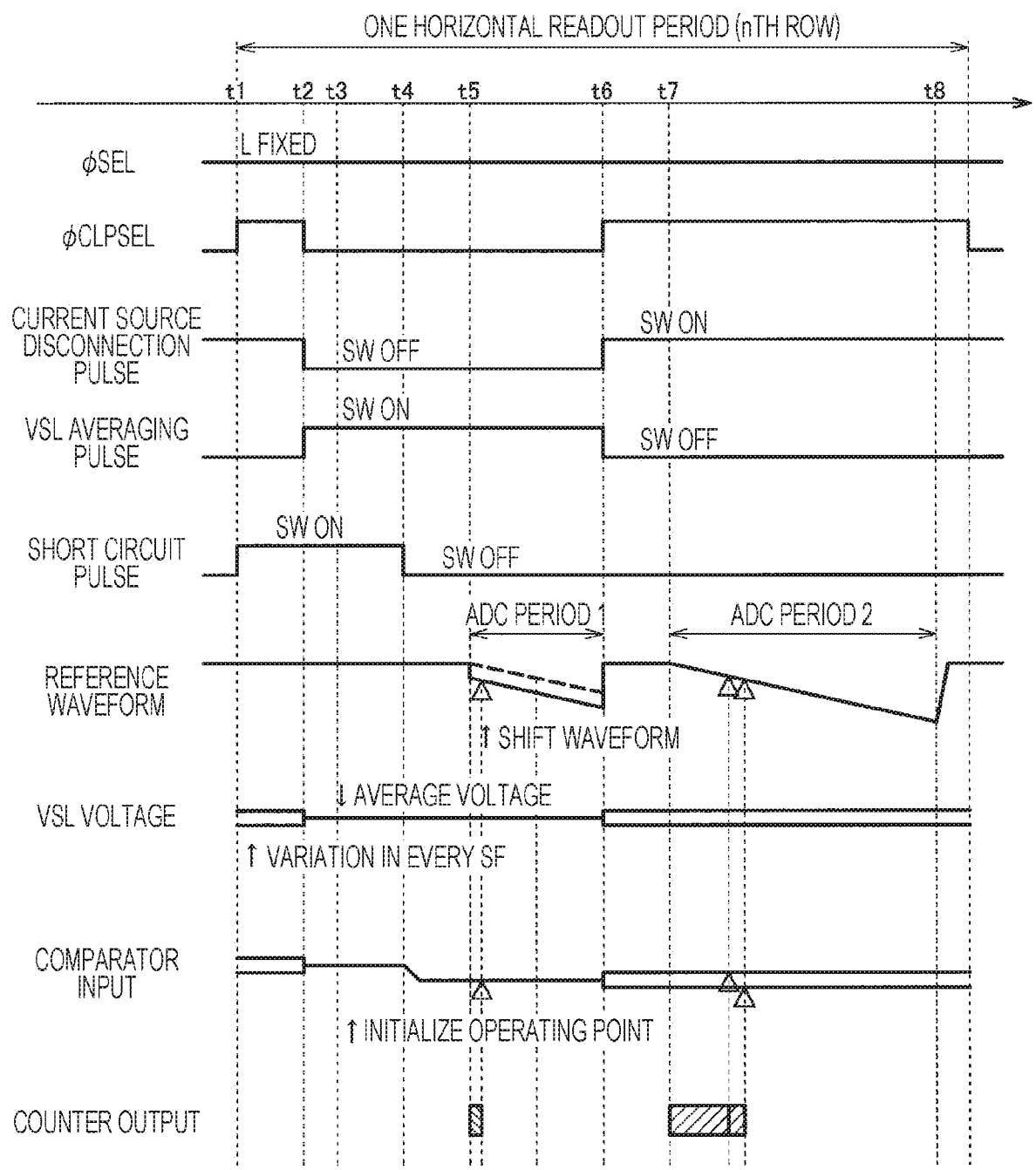
FIG. 11D is an explanatory diagram illustrating operations when generating unique information according to the same embodiment in a timing chart.

FIG. 11D is an explanatory diagram illustrating operations of the clip circuit 215, the reference signal generation unit 216, the current source 217, and the comparator 231 when generating unique information in a timing chart. Operations of respective elements provided on the output line VSL(n-1) or along the output line VSL(n-1) will be described below.

In the timing chart of FIG. 11D, no pixel is selected in all rows. That is, the row selection signal φSEL is fixed to low. The states of other pulses for driving pixels are arbitrary. One horizontal readout period starts at time t1. At this point, a clip selection pulse φCLPSEL goes high, and the clip circuit 215 is selected. Furthermore, the short circuit pulse goes high, and the switches 273a and 274a are connected. Since the switch 252a for disconnecting the current source 217 is on and the switch 251a for averaging the VSL voltage is off, a source follower operation is performed, and variation information of every source follower of the clip circuit 215 (variations in output of the transistor CLPAMP) is output to the output line VSL.

At time t2, the clip selection pulse φCLPSEL and the current source disconnection pulse are simultaneously set to low. Thus, the VSL voltage is held in the parasitic capacitance 253a. Since the VSL voltage is averaged here, the VSL voltage of each column is averaged. This averaged VSL voltage becomes the reference signal.

At time t3, an internal offset of the comparator 275a and a difference between the VSL voltage and the reference waveform are charged in the input capacitor 272a, and the operating point of the comparator 275a is initialized.

At time t4, the short circuit pulse goes low, turning off the switches 273a and 274a. This completes initialization of the operating point of the comparator 275a. Furthermore, since the switches 273a and 274a are turned off, kTC noise and feedthrough variations occur in the switches 273a and 274a.

Times t5 to t6 are a first AD conversion period (ADC period 1). During this period, the DA converter 232 changes the reference waveform linearly with a predetermined slope. Then, the comparator 275a AD-converts the reference signal using the reference waveform. The DA converter 232 may have a function to shift the reference waveform. That is, the DA converter 232 may have a function to shift a clamp level. The DA converter 232 can add an offset to an output of the counter 233 by shifting the reference waveform. In this ADC period 1, an inversion delay of the comparator 275a, a delay of the reference waveform, and a clock delay of the counter occur. Note that a triangle in FIG. 11D indicates an inversion timing of the comparator 275a.

At time t6, the clip selection pulse φCLPSEL goes high, and the clip circuit 215 is selected. At this point, the switch 252a for disconnecting the current source 217 is on and the switch 251a for averaging the VSL voltage is off, a source follower operation is performed, and variation information for every source follower of the clip circuit 215 (variations in output of the transistor CLPAMP) is output to the output line VSL.

Times t7 to t8 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11D indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, it is possible to remove variations generated in the detection unit 218. Therefore, it is possible to prevent the element unique information from including the variations generated in the detection unit 218.

Furthermore, since the output of the counter 233 is offset in the ADC period 1, even if the above difference process is performed, variations due to the unique information generation unit 214 will not be lost. The variations due to the unique information generation unit 214 are normally distributed with the reference signal as the center. Therefore, if there is no offset, a negative value occurs in the variations due to the unique information generation unit 214, and all values less than or equal to 0 become 0.

In a case of operating according to the timing chart illustrated in FIG. 11D, if the transistor CLPSEL is saturated instead of the transistor CLPAMP, a source follower circuit is formed. A high-level potential of the pulse that selects the transistor CLPSEL may be approximately VDD (2.7 V), or may be an intermediate potential (approximately 1 V to 1.5 V). If a potential difference (VDS) between the drain and source of the transistor CLPSEL is taken to cause a saturation operation, a source follower is formed. For example, assuming that the drain voltage of the transistor CLPSEL is 2.7 V, the drain side of the transistor CLPSEL (source side of the transistor CLPAMP) is usually about 2.2 V. On the other hand, if VDS of the transistor CLPSEL is sufficiently taken (if there is a difference of at least about several hundred to 700 mV), it is possible to cause a saturated operation. Consequently, the output according to the gate voltage of the transistor CLPSEL is transmitted to the output line VSL. Similarly to the transistor CLPAMP, when the transistor CLPSEL operates in saturation, the threshold value and the overdrive voltage vary from element to element, and thus variations in the threshold value of the transistor CLPSEL and the overdrive voltage can be detected.

The current control voltage generation unit 219 can change the overdrive voltage of the transistor CLPAMP by driving the current control voltage with different voltages in the ADC period 1 and the ADC period 2. The change amount of the overdrive voltage at this time varies, and thus the change amount of the overdrive voltage can be detected as element unique information.

Figure 11E:
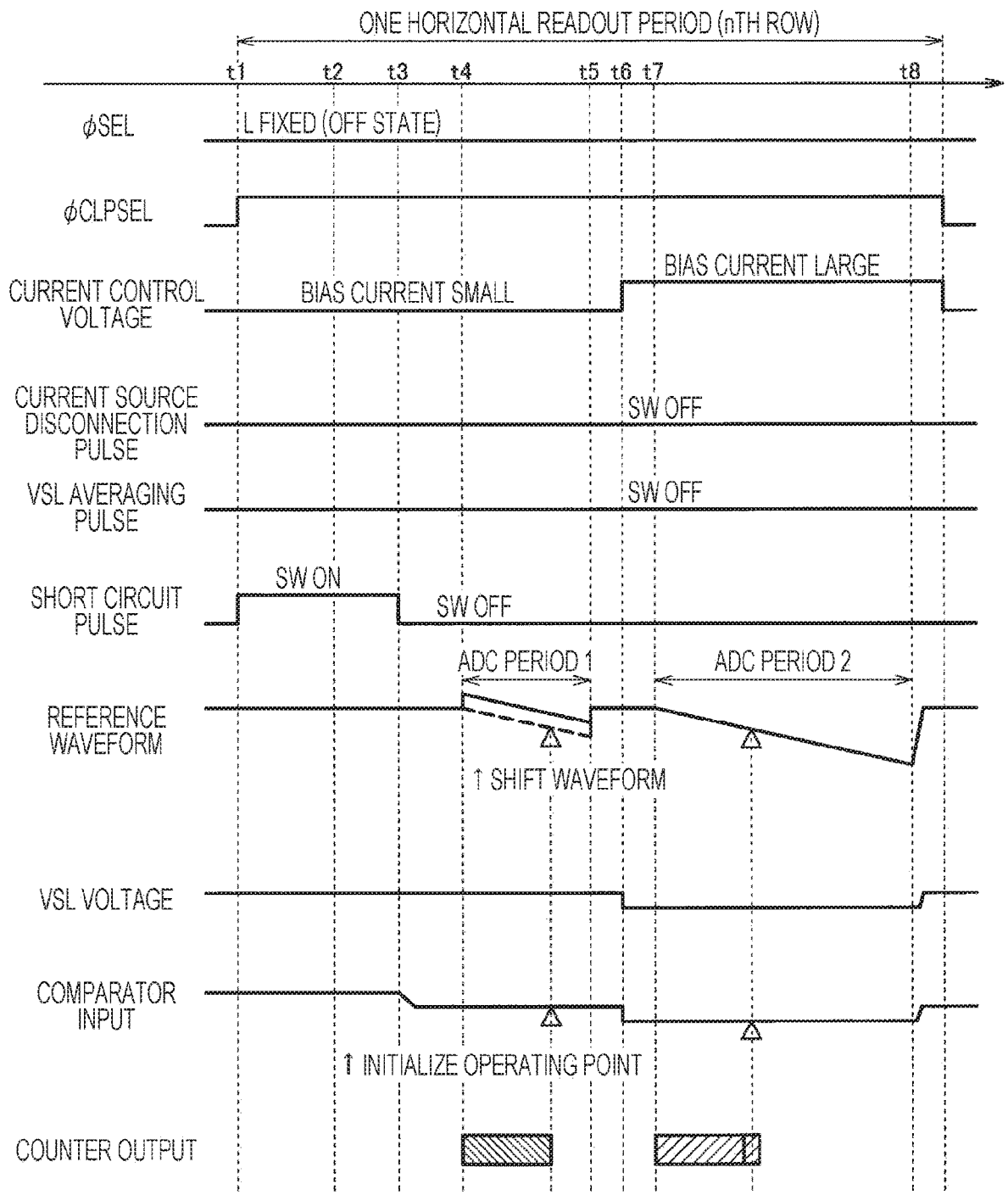
FIG. 11E is an explanatory diagram illustrating operations when generating unique information according to the same embodiment in a timing chart.

FIG. 11E is an explanatory diagram illustrating operations of the clip circuit 215, the reference signal generation unit 216, the current source 217, and the comparator 231 when generating unique information in a timing chart. Operations of respective elements provided on the output line VSL(n−1) or along the output line VSL(n−1) will be described below. It differs from the timing chart of FIG. 11D in that the current source disconnection pulse and the VSL averaging pulse are always at low level.

In the timing chart of FIG. 11E, no pixel is selected in all rows. That is, the row selection signal φSEL is fixed to low. The states of other pulses for driving pixels are arbitrary. One horizontal readout period starts at time t1. At this point, the clip selection pulse φCLPSEL goes high, and the clip circuit 215 is selected. Furthermore, the short circuit pulse goes high, and the switches 273*a* and 274*a* are connected.

At time t2, an internal offset of the comparator 275*a* and a difference between the VSL voltage and the reference waveform are charged in the input capacitor 272*a*, and the operating point of the comparator 275*a* is initialized.

At time t3, the short circuit pulse goes low, turning off the switches 273*a* and 274*a*. This completes initialization of the operating point of the comparator 275*a*. Furthermore, since the switches 273*a* and 274*a* are turned off, kTC noise and feedthrough variations occur in the switches 273*a* and 274*a*.

Times t4 to t5 are a first AD conversion period (ADC period 1). During this period, the DA converter 232 changes the reference waveform linearly with a predetermined slope. Then, the comparator 275*a* AD-converts the reference signal using the reference waveform. In this ADC period 1, an inversion delay of the comparator 275*a*, a delay of the reference waveform, and a clock delay of the counter occur. Note that a triangle in FIG. 11E indicates an inversion timing of the comparator 275*a*.

Subsequently, at time t6, the current control voltage generation unit 219 controls the current control voltage so as to increase the bias current.

Times t7 to t8 are a second AD conversion period (ADC period 2). Also during this period, the DA converter 232 changes the reference waveform linearly with a predetermined slope. Then, the comparator 275*a* AD-converts the reference signal using the reference waveform. Here, the digital value after conversion similarly includes the kTC noise and the feedthrough variations in the switches 273*a* and 274*a* generated at time t4, the inversion delay of the comparator 275*a* generated in the ADC period 1, the delay of the reference waveform, and the clock delay of the counter. Note that a triangle in FIG. 11E indicates an inversion timing of the comparator 275*a*.

Accordingly, when the ADC period 2 ends, a difference process is performed between a count value of the counter 233 in the ADC period 1 and a count value of the counter 233 in the ADC period 2. By this difference process, it is possible to remove variations generated in the detection unit 218. Only bias current values are different between the ADC period 1 and the ADC period 2, and thus threshold value information is canceled and it is possible to extract the component of the overdrive voltage. Here, gain coefficient R of the transistor is $(W/L) \times \mu \times C_{ox}$. W is a gate width, L is a gate length, $\mu$ is electron mobility, and $C_{ox}$ is an oxide film capacity per unit area. Furthermore, the mutual inductance gm is approximately $2^{1/2} \times \beta \times Id$. Therefore, the overdrive voltage is $2 \times Id/gm = (2 \times Id/\beta)^{1/2}$. $\beta$ has element-specific variations, and thus an output according to the bias current and element variations can be obtained. The mobility $\mu$ is included in $\beta$, and the mobility $\mu$ includes temperature characteristics. Therefore, as will be described later, by adjusting the bias current and the slope and shift amount of the reference waveform according to the temperature, it is possible to mitigate characteristic changes due to temperature and perform AD conversion in an appropriate range. Lattice scattering is dominant at operating temperatures of the solid-state imaging device 1, and thus a temperature characteristic of the mobility depends on an absolute temperature $T^{-3/2}$.

In a case of operating according to the timing chart illustrated in FIG. 11E, if the transistor CLPSEL is saturated instead of the transistor CLPAMP, a source follower circuit is formed. The high-level potential of the pulse that selects the transistor CLPSEL may be approximately VDD (2.7 V), or may be an intermediate potential (approximately 1 V to 1.5 V).

The transistor CLPAMP can also detect RTN as described above. When detecting RTN by the transistor CLPAMP, the clipping voltage is set to an intermediate potential (for example, about 1.5 V to VDD).

Figure 11F:
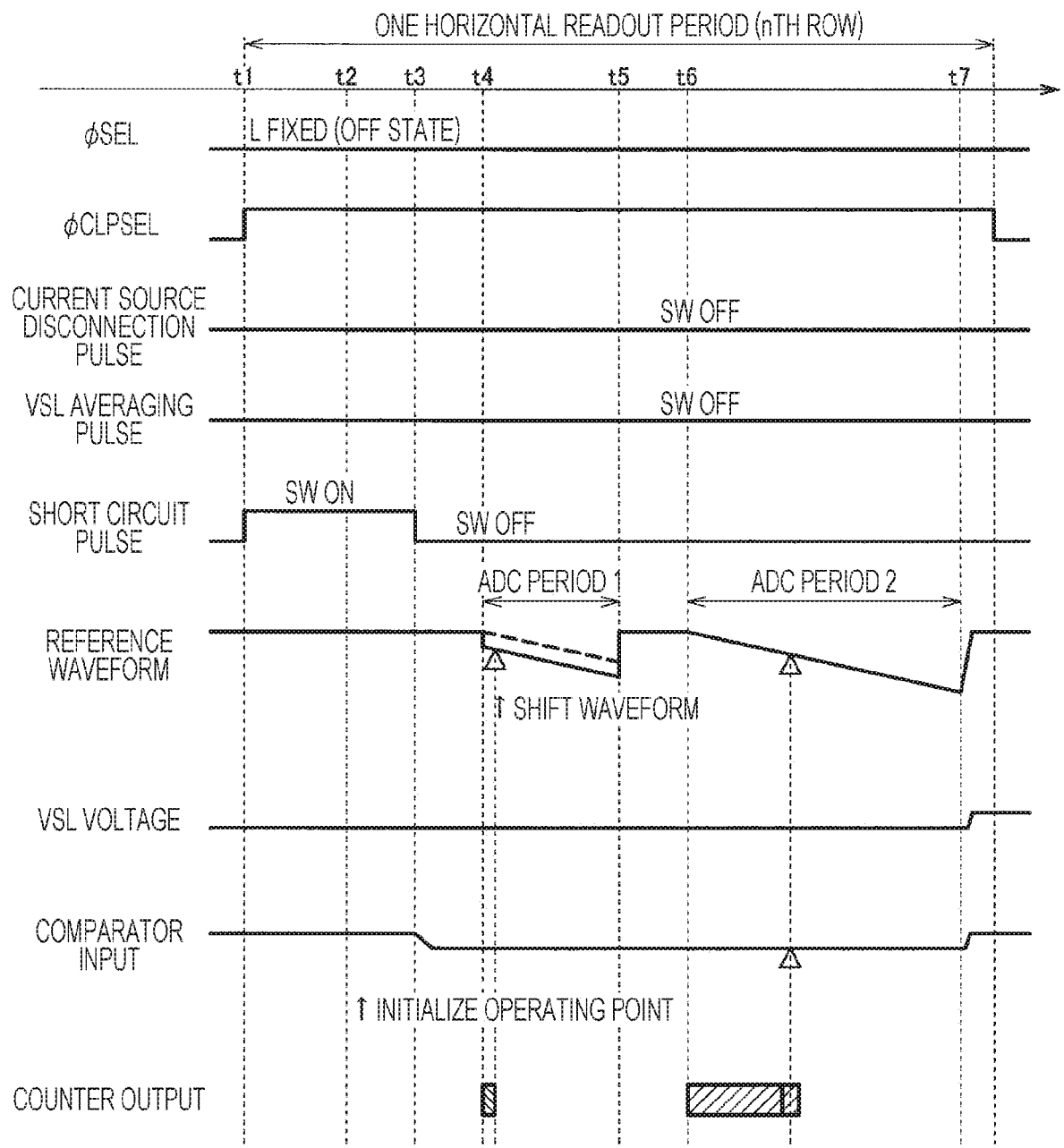
FIG. 11F is an explanatory diagram illustrating operations when generating unique information according to the same embodiment in a timing chart.

FIG. 11F is an explanatory diagram illustrating operations of the clip circuit 215, the reference signal generation unit 216, the current source 217, and the comparator 231 when generating unique information in a timing chart. Operations of respective elements provided on the output line VSL(n−1) or along the output line VSL(n−1) will be described below.

In the timing chart of FIG. 11F, no pixel is selected in all rows. That is, the row selection signal φSEL is fixed to low. The states of other pulses for driving pixels are arbitrary. One horizontal readout period starts at time t1. At this point, the clip selection pulse φCLPSEL goes high, and the clip circuit 215 is selected. Furthermore, the short circuit pulse goes high, and the switches 273*a* and 274*a* are connected.

At time t2, an internal offset of the comparator 275*a* and a difference between the VSL voltage and the reference waveform are charged in the input capacitor 272*a*, and the operating point of the comparator 275*a* is initialized.

At time t3, the short circuit pulse goes low, turning off the switches 273*a* and 274*a*. This completes initialization of the operating point of the comparator 275*a*. Furthermore, since the switches 273*a* and 274*a* are turned off, kTC noise and feedthrough variations occur in the switches 273*a* and 274*a*.

Times t4 to t5 are a first AD conversion period (ADC period 1). During this period, the DA converter 232 changes the reference waveform linearly with a predetermined slope. Then, the comparator 275a AD-converts the reference signal using the reference waveform. In this ADC period 1, an inversion delay of the comparator 275a, a delay of the reference waveform, and a clock delay of the counter occur. Note that a triangle in FIG. 11F indicates an inversion timing of the comparator 275a.

Times t6 to t7 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11F indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, it is possible to remove variations generated in the detection unit 218. Furthermore, it is possible to obtain data as to whether or not RTN has occurred by this difference process. By performing this data obtainment multiple times, an occurrence frequency of RTN for every transistor CLPAMP can be evaluated. Therefore, in a case of having a voltage amplitude larger than the thermal noise that the amplifier circuit has or the voltage amplitude generated at 1/f, it is possible to have the address of the element that could detect it as element unique information. In this case, the RTN changes in time constant, that is, changes in detection probability on the basis of the energy difference as described above, and thus it is desirable to have an address table for every temperature.

In a case of operating according to the timing chart illustrated in FIG. 11F, if the transistor CLPSEL is saturated instead of the transistor CLPAMP, a source follower circuit is formed. The high-level potential of the pulse that selects the transistor CLPSEL may be approximately VDD (2.7 V), or may be an intermediate potential (approximately 1 V to 1.5 V).

The solid-state imaging device 1 can also use feedthrough variations in the comparator 275a as element unique information.

Figure 11G:
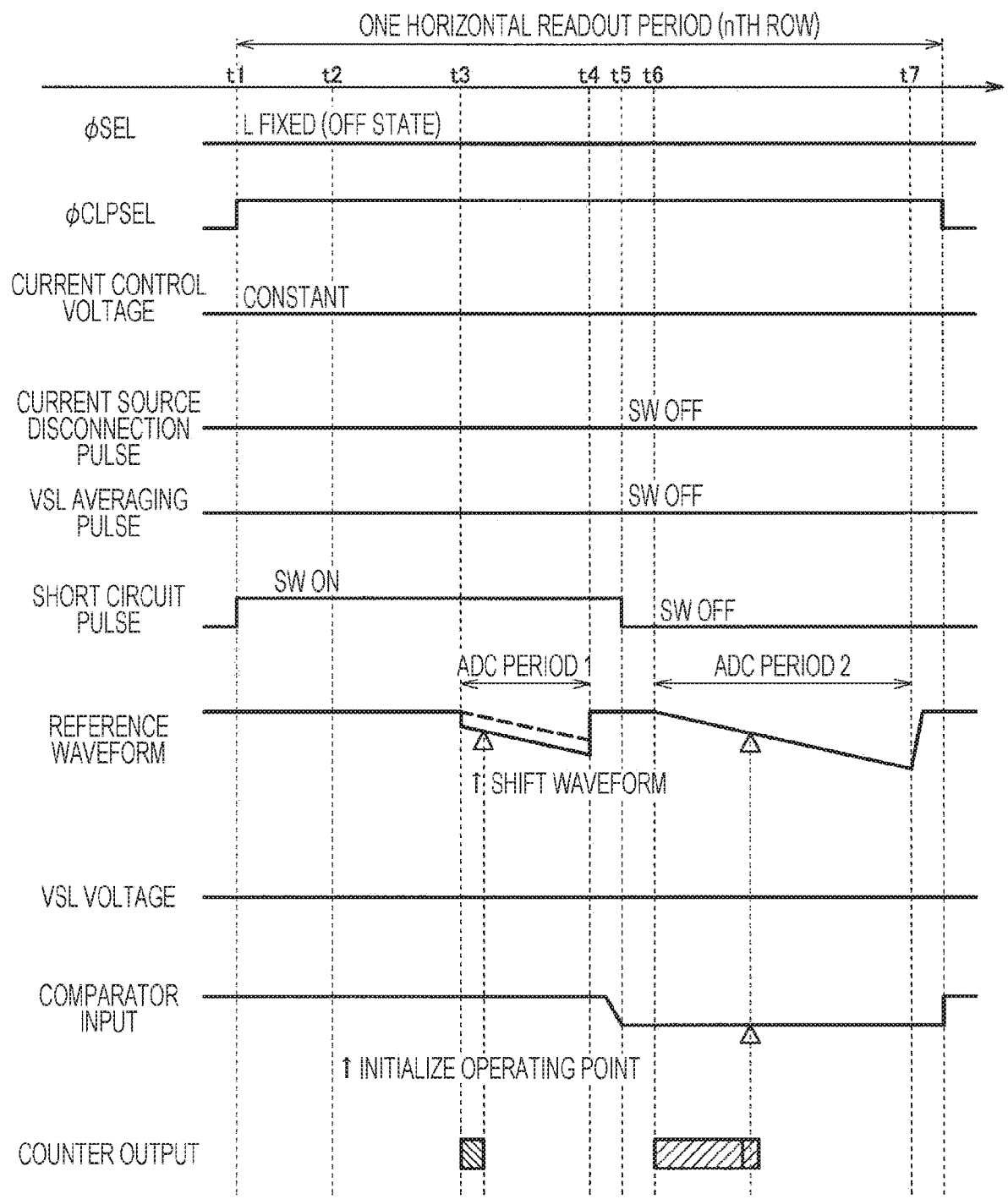
FIG. 11G is an explanatory diagram illustrating operations when generating unique information according to the same embodiment in a timing chart.

FIG. 11G is an explanatory diagram illustrating operations of the clip circuit 215, the reference signal generation unit 216, the current source 217, and the comparator 231 when generating unique information in a timing chart. Operations of respective elements provided on the output line VSL(n−1) or along the output line VSL(n−1) will be described below.

In the timing chart of FIG. 11G, no pixel is selected in all rows. That is, the row selection signal φSEL is fixed to low. The states of other pulses for driving pixels are arbitrary. One horizontal readout period starts at time t1. At this point, the clip selection pulse φCLPSEL goes high, and the clip circuit 215 is selected. Furthermore, the short circuit pulse goes high, and the switches 273a and 274a are connected.

At time t2, an internal offset of the comparator 275a and a difference between the VSL voltage and the reference waveform are charged in the input capacitor 272a, and the operating point of the comparator 275a is initialized.

Times t3 to t4 are a first AD conversion period (ADC period 1). During this period, the DA converter 232 changes the reference waveform linearly with a predetermined slope. Then, the comparator 275a AD-converts the reference signal using the reference waveform. In this ADC period 1, an inversion delay of the comparator 275a, a delay of the reference waveform, and a clock delay of the counter occur. Note that a triangle in FIG. 11G indicates an inversion timing of the comparator 275a.

At time t5, the short circuit pulse goes low, turning off the switches 273a and 274a. This completes initialization of the operating point of the comparator 275a. Furthermore, since the switches 273a and 274a are turned off, kTC noise and feedthrough variations occur in the switches 273a and 274a.

Times t6 to t7 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11G indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, the kTC noise and the feedthrough variations in the switches 273a and 274a are detected.

By detecting the kTC noise and the feedthrough variations in the switches 273a and 274a a plurality of times and averaging them, the kTC noise is suppressed and the feedthrough variations (FPN component) can be extracted.

The solid-state imaging device 1 can also use feedthrough variations in the column ADC as element unique information.

Figure 11H:
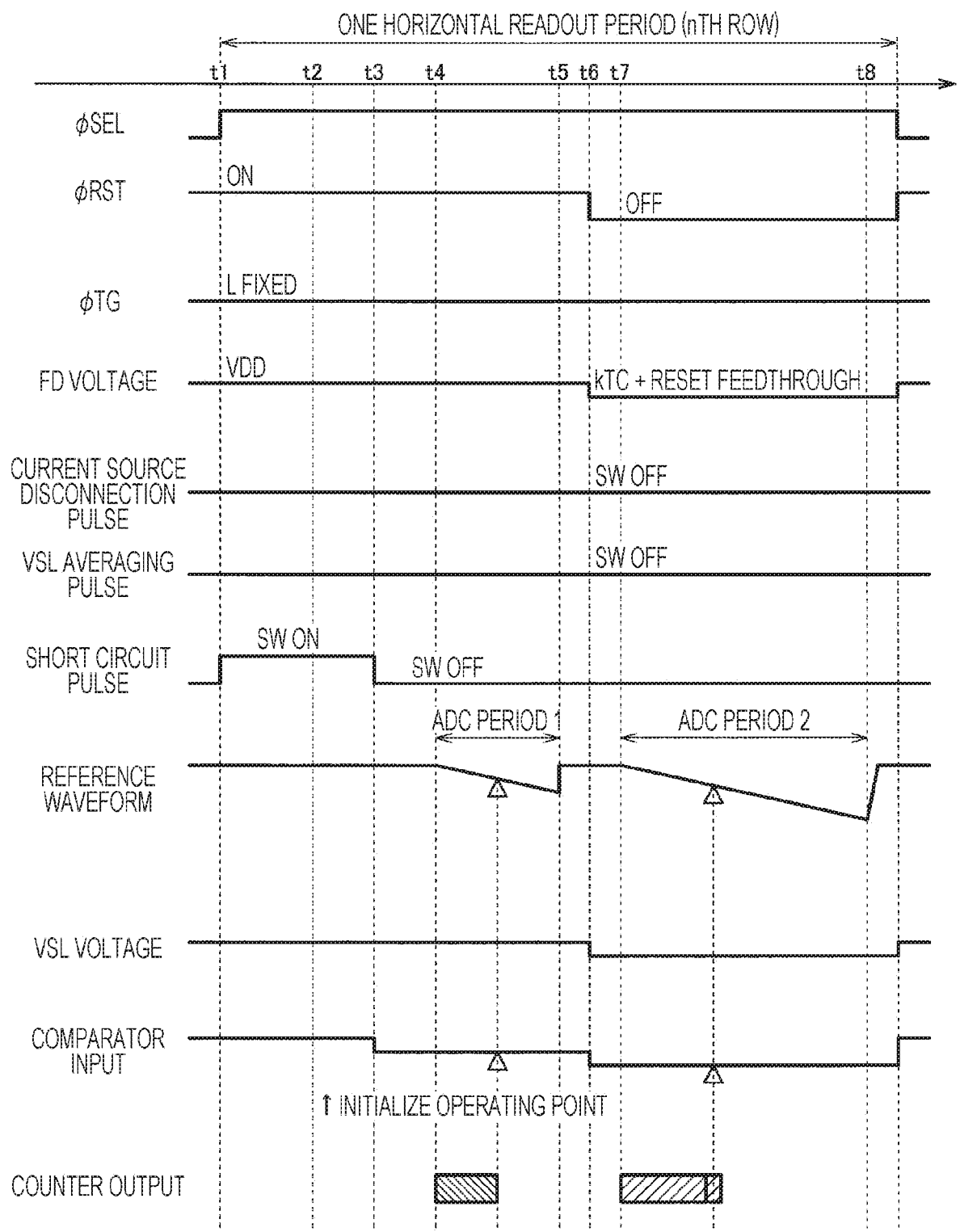
FIG. 11H is an explanatory diagram illustrating operations when generating unique information according to the same embodiment in a timing chart.

FIG. 11H is an explanatory diagram illustrating operations of the clip circuit 215, the reference signal generation unit 216, the current source 217, and the comparator 231 when generating unique information in a timing chart. Operations of respective elements provided on the output line VSL(n−1) or along the output line VSL(n−1) will be described below.

One horizontal readout period starts at time t1. At this point, the row selection signal φSEL goes high and row selection starts. At this point, the reset transistor RST is in an on state, and thus the voltage of the floating diffusion part FD is fixed to VDD. Thus, variations in the floating diffusion part FD are removed. Furthermore, when generating the unique information, the transfer pulse φTRG is fixed to low. Since the transfer pulse φTRG is fixed to low, the transfer transistor TRG is turned off, and variations in the photodiode PD can be removed. Furthermore, the short circuit pulse goes high, and the switches 273a and 274a are connected.

At time t2, an internal offset of the comparator 275a and a difference between the VSL voltage and the reference waveform are charged in the input capacitor 272a, and the operating point of the comparator 275a is initialized.

At time t3, the short circuit pulse goes low, turning off the switches 273a and 274a. Thus, kTC noise and feedthrough variations occur in the switches 273a and 274a.

Times t4 to t5 are a first AD conversion period (ADC period 1). During this period, the DA converter 232 changes the reference waveform linearly with a predetermined slope.

Then, the comparator 275a AD-converts the reference signal using the reference waveform. In this ADC period 1, an inversion delay of the comparator 275a, a delay of the reference waveform, and a clock delay of the counter occur. Note that a triangle in FIG. 11H indicates an inversion timing of the comparator 275a.

Since the reset transistor RST is in an on state at time t6, the kTC noise (temporal component) and the reset feedthrough noise (FPN component) are held in the voltage of the floating diffusion part FD.

Times t7 to t8 are a second AD conversion period (ADC period 2). Also during this period, the DA converter 232 changes the reference waveform linearly with a predetermined slope. Then, the comparator 275a AD-converts the reference signal using the reference waveform. Here, the digital value after conversion similarly includes the kTC noise and the feedthrough variations in the switches 273a and 274a generated at time t4, the inversion delay of the comparator 275a generated in the ADC period 1, the delay of the reference waveform, and the clock delay of the counter. Note that a triangle in FIG. 11H indicates an inversion timing of the comparator 275a.

Accordingly, when the ADC period 2 ends, a difference process is performed between a count value of the counter 233 in the ADC period 1 and a count value of the counter 233 in the ADC period 2. By this difference process, the variations generated in the detection unit 218 are removed, and the kTC noise and the reset feedthrough noise held in the floating diffusion part FD are detected. By detecting the kTC noise and the reset feedthrough noise a plurality of times and averaging them, the kTC noise is suppressed and the reset feedthrough variations (FPN component) can be extracted.

A defect in the photodiode PD can also be used as element unique information. The defect of the photodiode PD can be read out by normal driving. When the defect of the photodiode PD is read by normal driving, an optical signal and defect information of the floating diffusion part FD are also read at the same time. An FPN component and kTC noise when resetting the floating diffusion part FD, other than them, are removed by the CDS processing. The defect information of the floating diffusion part FD is excluded because it is driven so that the detection period is as short as possible and the defect is corrected. Since it is difficult to extract defect information of the photodiode PD when there is an optical signal, in a case where the defect of the photodiode PD is used as element unique information, it is desirable that a signal of the photodiode PD is accumulated in a light-shielded state. In a case where the defect of the photodiode PD is used as element unique information, the photodiode PD of a pixel (optical black pixel) that is shielded from light may be used.

Since a dark signal due to the defect of the photodiode PD has time dependency, it is desirable to set a shutter time as long as possible and accumulate the signal. Furthermore, the photodiode PD generally has a hole accumulated diode structure (HAD structure), and is formed and driven so as to be surrounded by holes. In driving, a negative bias is applied so that a channel of the transfer transistor is in an accumulated state (pinning state). In this manner, a dark signal due to a defect near the transfer transistor can be suppressed to be small.

In a case where the signal is very small or the number of defects is very small, it is only required to change the pinning state to a depletion state by setting the potential when the transfer transistor is off to an intermediate potential in the positive direction when the signal is accumulated. A dark output occurs due to a defect near the transfer transistor.

In this manner, defect information near the photodiode PD and the transfer transistor can be detected, and for example, a pixel address of a desired threshold value level or higher treated as a defect can be treated as element unique information.

Since these pieces of defect information have temperature characteristics (activation energy is about 0.55 eV to 1.1 eV), in order to stabilize output, it is desirable to set an accumulation time and analog gain appropriately on the basis of temperature information, and have a temperature correction table for every defect and make correction.

The unique value calculation unit 220 calculates a value unique to the solid-state imaging device 1 (unique value) on the basis of the digital signal sent from the detection unit 218. The unique value calculation unit 220 generates a value having a predetermined bit length as the unique value. An example of a method of calculating the unique value of the solid-state imaging device 1 by the unique value calculation unit 220 will be described later in detail. After calculating the unique value of the solid-state imaging device 1, the unique value calculation unit 220 sends the unique value to the encryption unit 222. The unique value generated by the unique value calculation unit 220 can be a seed or a key itself used in the encryption processing in the encryption unit 222.

The unique value calculation unit 220 may select which element unique information is employed from among a plurality of pieces of element unique information. When selecting element unique information, the unique value calculation unit 220 may select which element unique information to employ by calculation based on element unique information, or select whether or not to employ element unique information by a random number. Furthermore, selection conditions for selecting element unique information may be stored in a non-volatile memory. Writing of the selection conditions to the non-volatile memory may be performed only once. The timing of writing to the non-volatile memory may be, for example, at a time of test, shipping, first use, or the like. The unique value calculation unit 220 can repeatedly calculate the unique value by using element unique information based on any manufacturing variations occurring in a chip of the solid-state imaging device 1, including element unique information having a relatively small amount of information. That is, the amount of element unique information can be increased.

Furthermore, the unique value calculation unit 220 may calculate the unique value by combining a plurality of pieces of element unique information among element unique information generated by the unique information generation unit 214. By calculating a unique value by combining a plurality of pieces of element unique information, it becomes difficult to analyze how the unique value is calculated.

Furthermore, the unique value generated by the unique value calculation unit 220 may be temporarily stored in a memory. By storing the unique value generated by the unique value calculation unit 220 in the memory, it becomes difficult to analyze calculation timing of the unique value. That is, the solid-state imaging device 1 may use a unique value generated in advance according to an encryption request, instead of generating the unique value at the timing of the encryption request. The solid-state imaging device 1 may calculate the unique value, for example, after a predetermined time has elapsed after driving during normal imaging. Furthermore, the solid-state imaging device 1 may generate the unique value at a timing of receiving a request for generating the unique value, not at a timing of the encryption request.

Furthermore, the unique value calculation unit 220 may average unique values obtained under the same driving conditions. Noise in the time direction can be suppressed by averaging the unique values obtained under the same driving conditions.

The encryption unit 222 uses the unique value generated by the unique value calculation unit 220 to execute data encryption processing. The encryption unit 222 can be provided in the logic circuit 23014 illustrated in FIGS. 2A and 2B, for example. Specifically, the encryption unit 222 performs data encryption processing using the unique value generated by the unique value calculation unit 220 as a seed or a key itself. The target of encryption may be the unique value itself, image information, a feature amount based on the image information, or the like. By performing the encryption processing using the unique value generated by the unique value calculation unit 220, the solid-state imaging device 1 can extremely securely encrypt data.

The communication control unit 224 transmits data to the outside of the solid-state imaging device 1. The communication control unit 224 may perform different processing between when imaging data is output and when data encrypted by the encryption unit 222 is output.

In the configuration of the solid-state imaging device 1 illustrated in FIG. 9, at least a path for processing unique information is formed so as not to appear on the surface of the solid-state imaging device 1. For example, the path for processing unique information is arranged so as to be covered with a metal of an upper layer including the outermost layer. The path for processing the unique information may be covered with a predetermined shield layer or may be covered with VDD or VSS wiring. The path for processing the unique information may include, for example, the unique information generation unit 214, the detection unit 218, the unique value calculation unit 220, and the encryption unit 222. Furthermore, the solid-state imaging device 1 is formed so that a pad for monitoring the unique information is not provided on the path for processing the unique information. By forming the solid-state imaging device 1 in this manner, not only leak of the unique information of the solid-state imaging device 1 used for the encryption processing to the outside is hindered, but also destruction of the solid-state imaging device 1 is inevitable when it is attempted to analyze the unique information. Consequently, analysis of the unique information is impossible. In addition, the solid-state imaging device 1 according to the present embodiment does not internally store the unique information but generates the unique information each time, and performs encryption processing using a unique value based on the generated unique information. Therefore, the solid-state imaging device 1 according to the present embodiment can perform extremely secure encryption processing.

Since the solid-state imaging device 1 according to the present embodiment does not internally store unique information, it is impossible to decrypt encrypted data if the unique value generated on the basis of the unique information changes each time it is generated. Therefore, the unique value is required to be the same regardless of when it is calculated. Therefore, the solid-state imaging device 1 according to the present embodiment may be provided with a function to correct the unique value calculated by the unique value calculation unit 220 on the basis of a signal output by the unique information generation unit 214 according to the temperature of the chip provided with the unique information generation unit 214. Furthermore, the solid-state imaging device 1 according to the present embodiment may be provided with a function to detect the temperature of the chip provided with the unique information generation unit 214.

Figure 12:
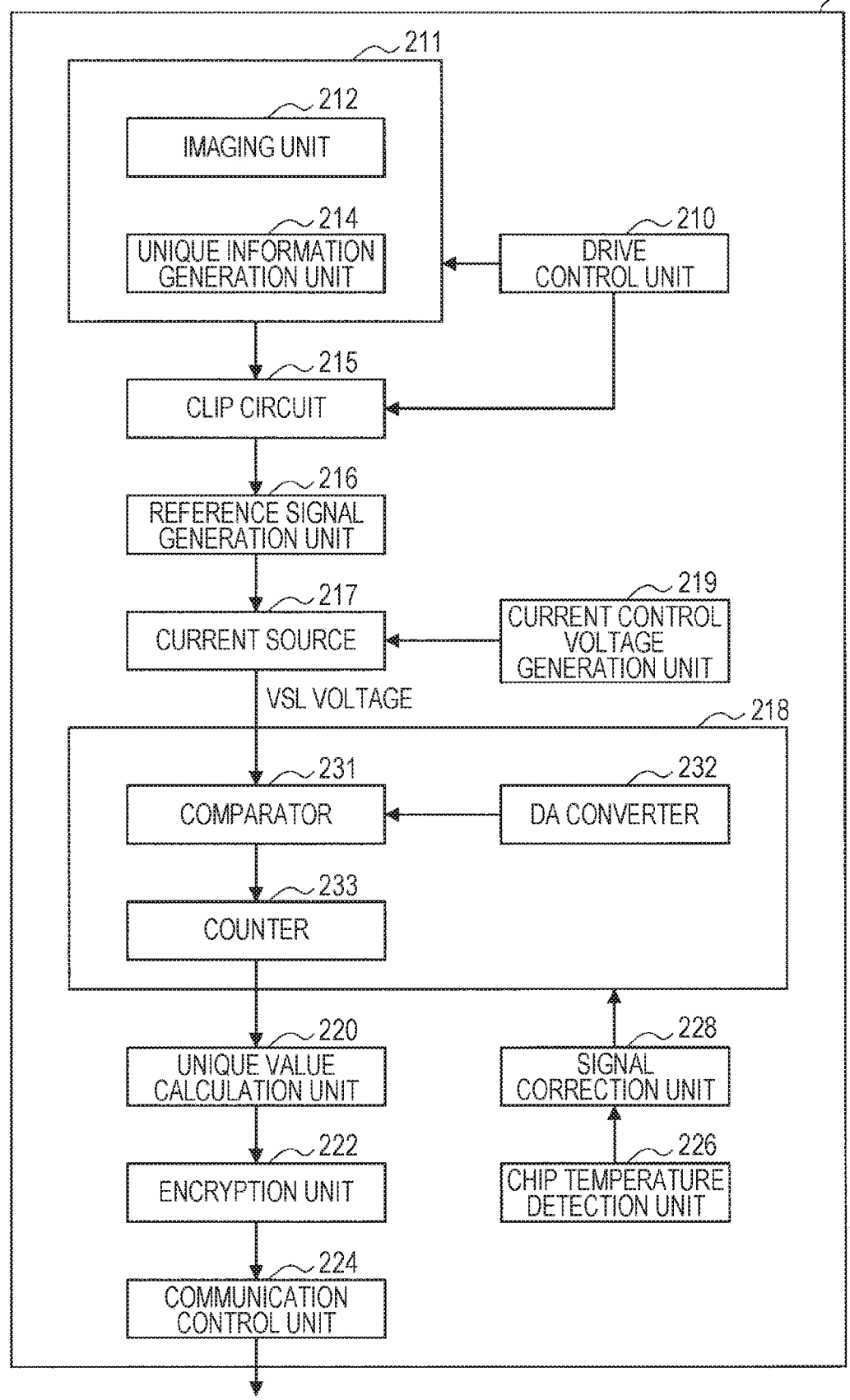
FIG. 12 is an explanatory diagram illustrating a functional configuration example of the solid-state image sensor according to the same embodiment.

FIG. 12 is an explanatory diagram illustrating another functional configuration example of the solid-state imaging device 1 according to the present embodiment. FIG. 12 illustrates a configuration in which a chip temperature detection unit 226 and a signal correction unit 228 are provided in addition to the configuration of the solid-state imaging device 1 illustrated in FIG. 9.

The chip temperature detection unit 226 detects the temperature of a chip provided with the unique information generation unit 214. The chip temperature detection unit 226 sends information of the detected chip temperature to the signal correction unit 228. The signal correction unit 228 corrects the unique value calculated by the unique value calculation unit 220 on the basis of the temperature of the chip provided with the unique information generation unit 214 that is detected by the chip temperature detection unit 226. The signal correction unit 228 may hold a table in which correction values according to temperatures are stored and determine a correction value on the basis of the temperature detected by the chip temperature detection unit 226.

3.2. Operation Example

Figure 13:
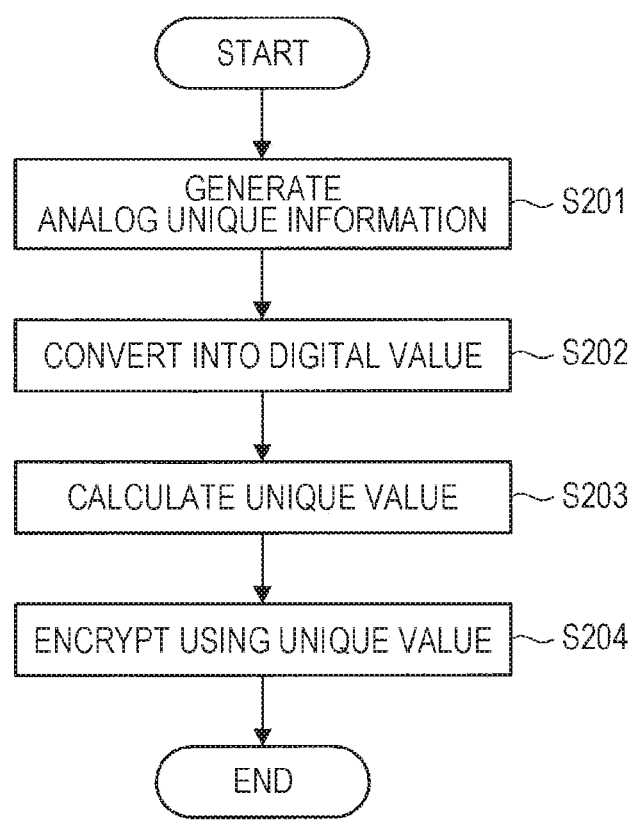
FIG. 13 is a flowchart illustrating an operation example of the solid-state image sensor according to the same embodiment.

Next, an operation example of the solid-state imaging device according to the present embodiment will be described. FIG. 13 is a flowchart illustrating an operation example of the solid-state imaging device according to the present embodiment. FIG. 13 illustrates an operation example when the solid-state imaging device 1 calculates a unique value and performs encryption processing using the unique value.

The solid-state imaging device 1 first generates analog unique information that is a basis of the unique value (step S201). The analog unique information is generated by the drive control unit 210 driving the unique information generation unit 214.

After generating the analog unique information, the solid-state imaging device 1 subsequently converts the analog unique information into a digital value (step S202). Conversion of the analog unique information into a digital value is performed by the detection unit 218. The conversion process of the analog unique information into the digital value by the detection unit 218 is as described above.

After converting the analog unique information into a digital value, the solid-state imaging device 1 subsequently calculates the unique value of the solid-state imaging device 1 using the digital value after conversion (step S203). Calculation of the unique value of the solid-state imaging device 1 is performed by the unique value calculation unit 220.

When the unique value of the solid-state imaging device 1 is calculated, the solid-state imaging device 1 subsequently performs encryption processing of data using the unique value (step S204). The encryption processing of data using the unique value is performed by the encryption unit 222.

By executing the series of operations described above, the solid-state imaging device 1 according to the present embodiment can internally complete encryption processing using unique information without outputting the unique information to the outside. The solid-state imaging device 1 according to the present embodiment can quite safely encrypt and output important information by performing encryption processing using the unique information that is not to be leaked to the outside.

4. Second Embodiment

Next, as a second embodiment of the present disclosure, an example of technology will be described that is related to generation of a unique value unique to the solid-state imaging device 1 that is difficult to copy (that is, a PUF value) using physical characteristics (that is, hardware characteristics) of the solid-state imaging device 1 described above.

4.1. Basic Idea

First, characteristics required for PUF will be described, and then a basic idea of the technology related to generation of the PUF value according to the present embodiment will be outlined.

As described above, the PUF is a function that outputs a value unique to the device by using physical characteristics that are difficult to copy. In a case where it is assumed that a value unique to the device generated using such a PUF (that is, a PUF value) is used as, for example, an identifier for identifying an individual device or key information for encryption processing and the like, reproducibility and individual difference are obtained as characteristics of the PUF value.

Here, the reproducibility represents a characteristic that the same output can be obtained for a given input every time even if conditions such as changes in various states such as temperature and voltage and deterioration over time of the device itself change when generating and recalculating the PUF value. That is, ideally, it is desirable that the same output can be perfectly reproduced for a given input every time even if a change in conditions as described above occurs. On the other hand, it is also possible to apply a technique such as an error correction code when generating and recalculating the PUF value. In this case, reproducibility of the output does not necessarily have to be perfect as long as variations in the output obtained every time are within a range that can be corrected by the error correction code or the like.

Furthermore, as the individual difference, it is desirable that a sufficient difference occurs in the PUF values among a plurality of devices so that individual devices can be distinguished by the PUF values generated in every device. In the present embodiment, it is desirable to secure entropy of, for example, 128 bits as an individual difference.

On the assumption as above, in the present embodiment, the amplification transistor Tr13 is targeted among the transistors forming each pixel 2 of the solid-state imaging device 1, and variations in threshold voltage Vth of the amplification transistor Tr13 are used for generation of the PUF value. More specifically, for the threshold voltage of a transistor, there are many elements that give variations in every device in the manufacturing process, such as the thickness of a gate oxide film, the size of a transistor, and ion implantation. Therefore, it is possible to satisfy the above-mentioned required characteristic of individual difference. Furthermore, since the amplification transistor Tr13 is located in a relatively later stage among the respective transistors that constitute the pixel 2, it tends to be less susceptible to the influence of multiple factors. From such a characteristic, it is possible to also satisfy the above-mentioned required characteristic of reproducibility. Furthermore, the variations in the threshold voltage Vth can be obtained as, for example, an output result of a pixel signal (in other words, a pixel value) from the pixel 2 in the process of what is called compensation of the threshold voltage Vth.

Furthermore, in the present embodiment, the PUF value may be generated by using characteristics of the pixel 2 that operates more stably among the respective pixels 2 of the solid-state imaging device 1. As a specific example, the characteristics of the pixels 2 included in at least a part of what is called optical black (OPB) region of a pixel region 3 (in other words, an imaging surface) may be used for generating the PUF value.

Figure 14:
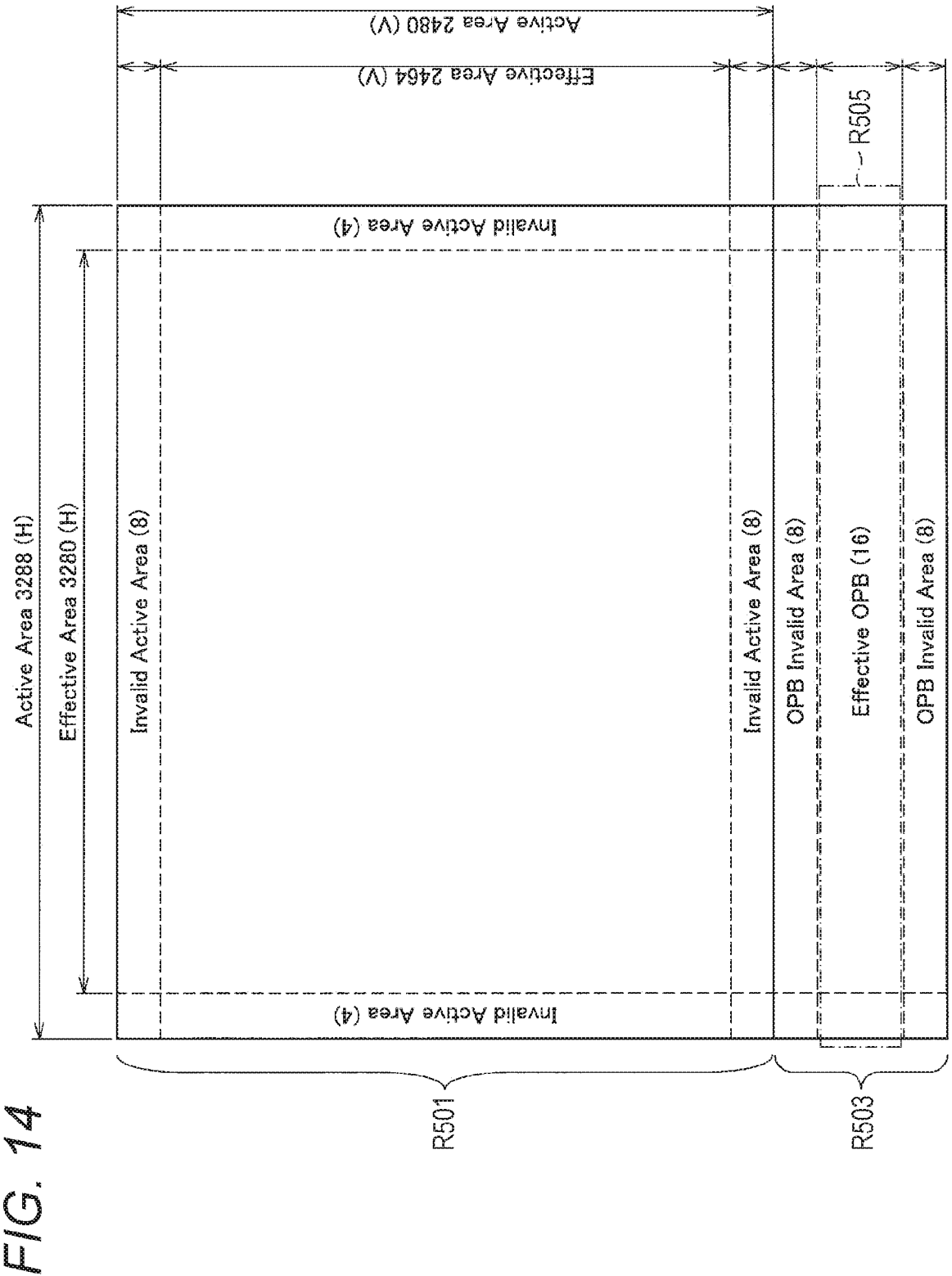
FIG. 14 is an explanatory diagram for describing an example of a technique related to generation of a PUF value according to a second embodiment of the present disclosure.

For example, FIG. 14 is an explanatory diagram for describing an example of the technique related to generation of the PUF value according to the present embodiment, and illustrates an example of a configuration of the pixel region 3 of the solid-state imaging device 1. As illustrated in FIG. 14, the pixel region 3 of the solid-state imaging device 1 according to the present embodiment includes, for example, an effective pixel region R501 and an OPB region R503.

The effective pixel region R501 corresponds to a region where a subject image is formed via an optical system such as a lens within the pixel region 3 of the solid-state imaging device 1. That is, an image signal based on a pixel signal (in other words, a pixel value) read from the pixel 2 included in the effective pixel region R501 within the pixel region 3 of the solid-state imaging device 1 is output as an image capturing result.

The OPB region R503 is a region provided near the effective pixel region R501 and shielded from light by a metal or the like. The pixel 2 included in the OPB region R503 is used, for example, to measure the level of a pixel signal that is a reference for correcting a black level. Specifically, by measuring the level of a pixel signal output from the pixel 2 included in the OPB region R503, it is possible to recognize the level (offset amount) of a signal including influence of a dark current and read noise in a state where no light is incident. Therefore, by subtracting the measured value (that is, the offset amount) of the level of a pixel signal output from the pixel 2 in the OBP region R503 from an image signal read from the pixel 2 in the effective pixel region R501, ideally, the black level can be corrected to 0.

As described above, the pixel 2 included in the OPB region R503 is hardly affected by light incident through an optical system such as a lens due to the characteristic that the pixel is shielded from light by a metal or the like. Due to such a characteristic, it is possible to obtain a relatively stable output as a light reception result from the pixel 2 included in the OPB region R503 as compared with the pixel 2 included in the effective pixel region R501. That is, use of the characteristics of the pixel 2 included in the OPB region R503 is, in comparison with the case of using characteristics of the pixel 2 included in the effective pixel region R501, also effective from the viewpoint of satisfying the requirement of reproducibility of the PUF value.

Furthermore, a pixel signal output from the pixel 2 included in the OPB region R503 is not output as a result of image capturing. Therefore, it is difficult to estimate the characteristics of the pixel 2 included in the OPB region R503 from an analysis result of an image obtained as an imaging result. That is, even if the characteristics of the pixel 2 included in the OPB region R503 are used for generating the PUF value, it is difficult to estimate the PUF value from the analysis result of the image obtained as the imaging result.

Furthermore, since the pixel 2 included in the OPB region R503 does not always need to be operated at all times, it is less likely to deteriorate than the pixels 2 included in the effective pixel region R501. Therefore, it is more effective from the viewpoint of reliability as a characteristic of the device used to generate the PUF value.

Furthermore, the OPB region R503 is a region already provided in the existing solid-state imaging device 1. Therefore, by using the characteristics of the pixel 2 included in the OPB region R503 for generating the PUF value, it is not necessary to provide a dedicated region or a dedicated device for generating the PUF value.

For example, in the example illustrated in FIG. 14, among the pixels 2 included in the OPB region R503, the characteristics of the pixel 2 included in the region indicated by reference sign R505 are used for generating the PUF value.

In the above, the characteristics required for the PUF have been described, and then the basic idea of the technique related to the generation of the PUF value according to the present embodiment has been outlined.

4.2. Method of Generating PUF Value

Next, an outline of a method of generating the PUF value in the solid-state imaging device 1 according to the present embodiment will be described.

Figure 15:
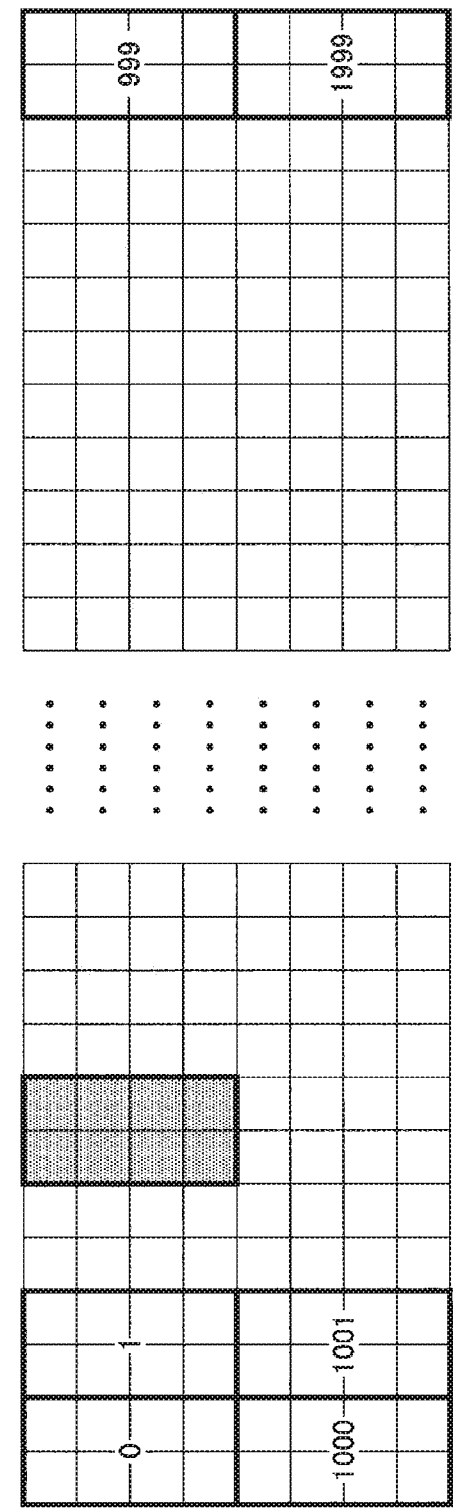
FIG. 15 is an explanatory diagram for describing an example of a technique related to generation of the PUF value according to the same embodiment.

In the solid-state imaging device 1 according to the present embodiment, pixels included in a predetermined region (for example, OPB region) are divided into a plurality of blocks each including one or more pixels. With such a configuration, in the solid-state imaging device 1 according to the present embodiment, one or more blocks specified according to a predetermined condition among the plurality of blocks are used for generating the PUF value. For example, FIG. 15 is an explanatory diagram for describing an example of a technique related to generation of the PUF value according to the present embodiment, and illustrating an example of the above blocks. Specifically, in the example illustrated in FIG. 15, 2000×8 pixels are divided into blocks each including 2×4 pixels, and in this case, the number of blocks is 2000.

Note that in a case where pixels included in a predetermined region are divided into a plurality of blocks, each block is only required to be defined so that a plurality of pixels sharing a predetermined circuit such as what is called an AMP circuit and the like are included in a common block. With such a configuration, the pixels included in each block exhibit the same tendency in variations due to the circuit shared among the pixels among variations in output signals (that is, pixel values) from the pixels.

Furthermore, in the solid-state imaging device 1 according to the present embodiment, a pixel value corresponding to the block is calculated on the basis of a pixel value of each of one or more pixels included in each block. As a specific example, the sum of a pixel value or values of one or more respective pixels included in each block may be set as the pixel value corresponding to the block. For example, in the example illustrated in FIG. 15, in a case where the pixel value of each pixel is indicated by 10 bits, since one block includes 2×4 pixels, the pixel value corresponding to the block calculated for every block can be expressed as a 13-bit value. Note that, hereinafter, the pixel value corresponding to the block calculated for every block is also simply referred to as a "pixel value of every block". Furthermore, the pixel value of each pixel corresponds to a "first pixel value", and the pixel value of every block corresponds to a "second pixel value". Note that in a case where each block is defined to include one pixel, the pixel value of every block corresponds to the pixel value of every pixel.

On the basis of the configuration as above, in the solid-state imaging device 1 according to the present embodiment, among the plurality of blocks defined as described above, a block in which the pixel value of every block is not included in a predetermined range that includes an average of the pixel value among the plurality of blocks is used for generating the PUF value. For example, FIG. 16 is an explanatory diagram for describing an example of a technique related to generation of the PUF value according to the present embodiment, and illustrates an example of a pixel value distribution of every block among a plurality of blocks. Furthermore, in FIG. 16, reference sign D510 indicates an average value of pixel values of every block among the plurality of blocks.

As illustrated in FIG. 16, the pixel value distribution of every block tends to indicate what is called a normal distribution on the basis of the average D510 of the pixel values among a plurality of blocks. With such a configuration, in the solid-state imaging device 1 according to the present embodiment, "1" is set for a block indicating a pixel value larger than the average D510 as a value for generating the PUF value, and "0" is set for a block indicating a pixel value smaller than the average D510.

On the other hand, the pixel value of every block may change every time (for example, for every frame) due to the influence of random noise or the like. Accordingly, for example, for a block in which the pixel value indicates a value close to the average value D510, for every frame, there is a case of indicating a value larger than the average D510 (that is, a case where "1" is set as the value for generating the PUF value), and there is a case of indicating a value smaller than the average D510 (that is, a care where "0" is set as the value for generating the PUF value). In view of such characteristics, in the solid-state imaging device 1 according to the present embodiment, a block in which the pixel value of every block is included in the predetermined range R511 that includes the average value D510 is excluded from the target of use for PUF value generation. In other words, a block in which the pixel value of every block is not included in the range R511, that is, a block in which the pixel value is included in any of the ranges R513 and R515 is specified as a target of use for PUF value generation. That is, as a value for generating the PUF value, "0" is set to the block in which the pixel value is included in the range R513, and "1" is set to the block in which the pixel value is included in the range R515.

Note that the range R511 illustrated in FIG. 16 may be set, for example, according to a standard deviation 6 of the pixel value of every block among the plurality of blocks. In this case, a block in which the absolute value of the difference between the pixel value of every block and the average D510 of the pixel values among the blocks (that is, distance between the pixel value of every block and the average D510) is equal to or greater than a predetermined threshold is specified as a target of use for PUF value generation.

Here, in a case where the standard deviation of the pixel value of each pixel in the block is σ', the standard deviation σ' can be, for example, about ½₀ of the standard deviation 6 of the pixel value of every block between blocks. At that time, the threshold of the distance between the pixel value of every block and the average D510 may be set to, for example, around 0.3σ. In this case, in the block in which the distance between the pixel value of every block and the average D510 exceeds the threshold, in order for the value set according to the pixel value to change between "0" and "1", it is necessary that variations in the pixel value exceed 6σ'.

From such characteristics, in the solid-state imaging device 1 according to the present embodiment, a block in which the pixel value indicates a value close to the average value D510 is excluded from the target of use for PUF value generation, and a block in which the distance between the pixel value and the average value D510 is equal to or greater than the threshold is the target of use for PUF value generation.

Note that the narrower the range R511 illustrated in FIG. 16 is set, the larger the number of blocks that can be candidates for the target of use for PUF value generation becomes, and meanwhile the higher the probability of an error to occur in the generated PUF value increases tends to become. On the other hand, the wider the range R511 is set, the smaller the number of blocks that can be candidates for the target of use for PUF value generation becomes, and meanwhile the lower the probability of an error to occur in the generated PUF value can be suppressed lower. Therefore, for example, the range R511 to be excluded from the target of use for PUF value generation may be set according to an error rate allowed for the generated PUF value.

Note that the information itself of the block specified as the target of use for PUF value generation is not information to be protected (information having confidentiality) such as what is called secret information and thus, for example, is only required to be stored in a predetermined storage area in the solid-state imaging device 1 (for example, a non-volatile storage area).

Next, with reference to FIGS. 16 to 18, an example of a method of calculating a value unique to the solid-state imaging device 1 (that is, a PUF value) according to a pixel value of every block will be described. For example, FIGS. 17 and 18 are explanatory diagrams for describing an example of a method of generating the PUF value according to the present embodiment.

In FIG. 17, reference sign D511 schematically indicates a plurality of blocks in which pixels included in a predetermined region are divided, as described with reference to FIG. 15. Furthermore, the numerical value presented in each block denoted by reference sign D511 indicates whether or not a pixel value corresponding to the block is included in a predetermined range including an average of pixel values (that is, the range R511 illustrated in FIG. 16).

That is, the solid-state imaging device 1 according to the present embodiment sequentially determines, for each block from a predetermined start position, whether or not the pixel value of every block is included in the predetermined range R511 including the average of the pixel values, and associates a value of "0" or "1" with the block according to a determination result. For example, in the example indicated by reference sign D511 in FIG. 17, "0" is associated with a block whose pixel value is included in the range R511, and "1" is associated with a block whose pixel value is not included in the range R511 (that is, included in the range R513 or R515). As described above, the solid-state imaging device 1 sequentially executes the above determination until the number of blocks in which the pixel value of every block is not included in the range R511 (that is, the number of blocks associated with "1") is specified by a predetermined bit length or more. Then, the solid-state imaging device 1 stores the position of the block associated with "1" in the predetermined storage area. Note that the block associated with "1" is the target of use for PUF value generation.

Next, as illustrated in FIG. 17, the solid-state imaging device 1 compares the pixel value of a block in which the pixel value of every block is not included in the range R511 with the average D510 of pixel values among the blocks, thereby specifying a value (hereinafter, also referred to as a "bit value") for generating the PUF value corresponding to the block. Specifically, the solid-state imaging device 1 sets "0" as a bit value for a block having a pixel value of every block smaller than the average D510 among the target blocks, and sets "1" as a bit value for a block having the pixel value larger than the average D510. For example, in FIG. 17, reference sign D513 schematically indicates the bit value set for each of the blocks to be the target of use for PUF value generation.

As described above, the solid-state imaging device 1 secures bit values by a predetermined bit length or more and concatenates the bit values to generate the PUF value. Note that the solid-state imaging device 1 may use a part of the series of secured bit values when generating the PUF value to calculate an error correction code (ECC) for correcting an error in a separately recalculated PUF value, and store it in the predetermined storage area. In this case, a large number of blocks to be the target of use for PUF value generation may be specified so that the bit value used for calculating the error correction code is secured.

Furthermore, when using the PUF value, the solid-state imaging device 1 recalculates this PUF value on the basis of information stored in the predetermined storage area. That is, the solid-state imaging device 1 specifies a block to be the target of use for PUF value generation on the basis of the information stored in the storage area, and reads out a pixel value corresponding to this block (that is, a pixel value of every block). Then, the solid-state imaging device 1 is only required to compare the pixel value corresponding to the specified block with the average D510 of the pixel values among the blocks to thereby specify a bit value corresponding to this block, and concatenate specified bit values to regenerate the PUF value. Furthermore, at this time, in a case where the error correction code for correcting an error of the PUF value is stored in the predetermined storage area, the solid-state imaging device 1 is only required to execute an error correction of the PUF value generated again on the basis of this error correction code.

The PUF value generated (calculated) as described above can be used as, for example, an identifier for identifying the solid-state imaging device 1 or key information for encrypting predetermined information generated in the solid-state imaging device 1.

Note that as the pixel value of every block used to generate the PUF value, an average of pixel values of every block during a plurality of times of imaging may be used. With such a configuration, it is possible to reduce the influence of variations in pixel value of every block due to random noise and the like (in other words, it is possible to reduce the error rate of the pixel value of every block).

The outline of the method of generating the PUF value in the solid-state imaging device 1 according to the present embodiment has been described above with reference to FIGS. 15 to 18.

4.3. Functional Configuration

Figure 19:
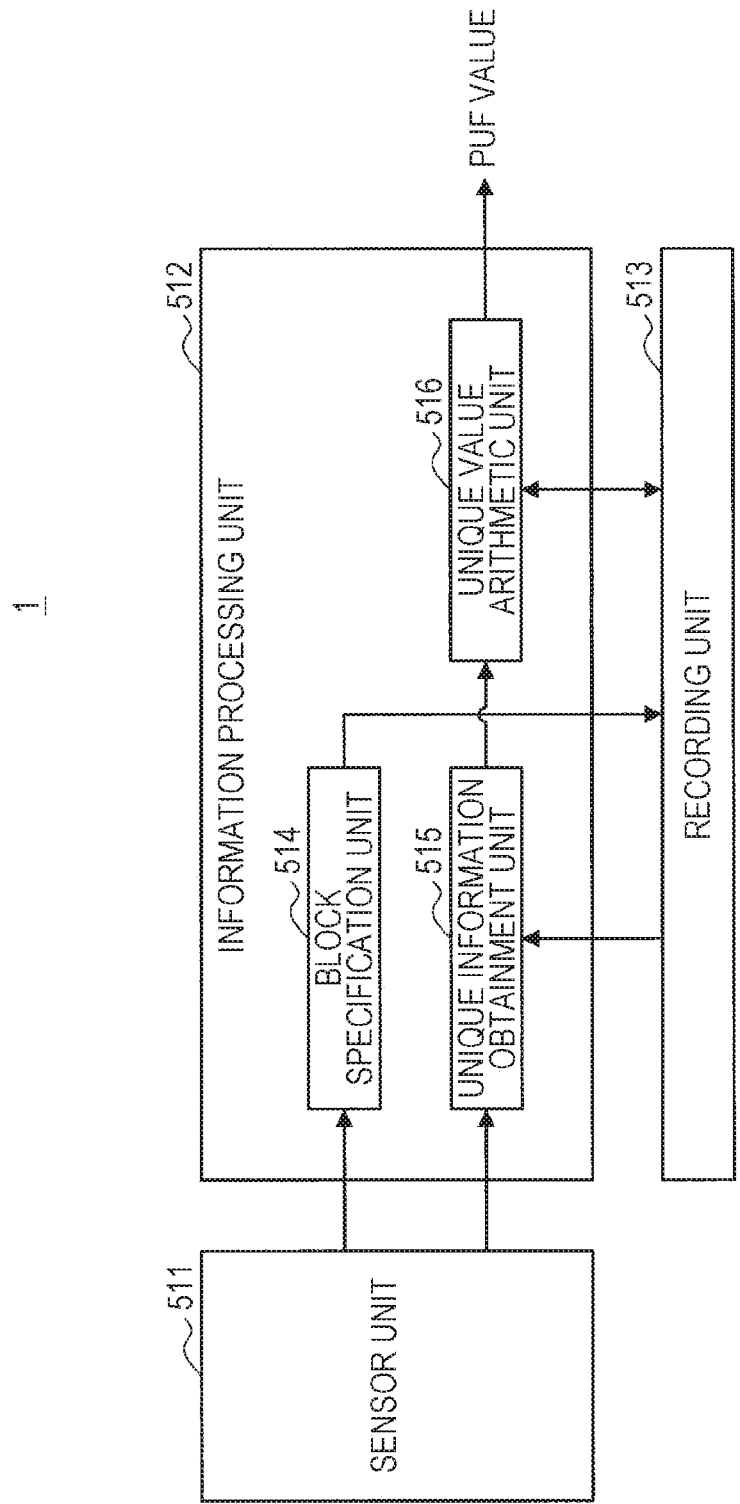
FIG. 19 is a block diagram illustrating an example of a functional configuration of a solid-state imaging device according to the same embodiment.

Next, an example of a functional configuration of the solid-state imaging device 1 according to the present embodiment will be described, particularly focusing on a part related to generation and recalculation of the PUF value unique to the solid-state imaging device 1. For example, FIG. 19 is a block diagram illustrating an example of the functional configuration of the solid-state imaging device 1 according to the present embodiment. Note that, in FIG. 19, in order to make characteristics of the solid-state imaging device 1 according to the present embodiment more understandable, components related to generation of the PUF value unique to the solid-state imaging device 1 are illustrated, and other components are omitted.

As illustrated in FIG. 19, the solid-state imaging device 1 according to the present embodiment includes a sensor unit 511, an information processing unit 512, and a storage unit 513.

The sensor unit 511 corresponds to the pixel array 3 described with reference to FIG. 1, and photoelectrically converts light from a subject into an electrical signal.

The information processing unit 512 executes various processes related to generation of the PUF value unique to the solid-state imaging device 1. As illustrated in FIG. 19, the information processing unit 512 includes, for example, a block specification unit 514, a unique information obtainment unit 515, and a unique value arithmetic unit 516. Note that operation of respective components of the information processing unit 512 will be described separately for a case where the PUF value is generated and a case where the PUF value is recalculated. First, focusing on the case where the PUF value is generated, the operation of the related configuration will be described.

The block specification unit 514 specifies, from a plurality of blocks into which pixels included in at least a part of the region (for example, the OPB region) are divided among the plurality of pixels that form the sensor unit 511, one or more blocks to be the target of use for PUF value generation according to a predetermined condition. As a specific example, the block specification unit 514 may specify the block to be the target of use for PUF value generation according to whether or not the pixel value of every block is included in a predetermined range including the average of the pixel values among a plurality of blocks. Then, the block specification unit 514 stores information regarding the specified block in the storage unit 513 described later. Note that the block specification unit 514 corresponds to an example of a "specification unit".

The unique information obtainment unit 515 obtains the pixel value of every block as unique information from a predetermined number or more of blocks to be the target of use for PUF value generation among the plurality of blocks into which pixels included in the above predetermined region (for example, the OPB region) are divided. Note that at this time, the unique information obtainment unit 515 may specify the block to be the target of use for PUF value generation on the basis of information stored in the storage unit 513. Then, the unique information obtainment unit 515 outputs to the unique value arithmetic unit 516 the unique information (that is, the pixel value of every block) obtained from each of the predetermined number or more of blocks to be the target of use for PUF value generation.

The unique value arithmetic unit 516 obtains, from the unique information obtainment unit 515, the unique information obtained from each of the predetermined number or more of blocks to be the target of use for PUF value generation, and generates the PUF value on the basis of the obtained unique information. As a specific example, the unique value arithmetic unit 516 may specify a bit value corresponding to the block according to whether or not the unique information obtained from every block is larger than a predetermined threshold (for example, an average of pixel values among blocks), and may concatenate the bit values specified in every block, to thereby generate the PUF value. Note that the unique value arithmetic unit 516 corresponds to an example of a "generation unit" that generates (calculates) a value unique to the device.

Furthermore, the unique value arithmetic unit 516 may use a part of the bit values specified in every block when generating the PUF value so as to calculate an error correction code for correcting an error in the PUF value that is separately recalculated, and may store the error correction code in the storage unit 513.

As described above, the unique value arithmetic unit 516 generates the PUF value and outputs the generated PUF value to a predetermined output destination.

The storage unit 513 temporarily or permanently holds various information for each component in the solid-state image sensor 1 to execute various processes. The storage unit 513 can include, for example, a non-volatile recording medium (for example, a memory or the like) capable of holding stored contents without supplying power. The storage unit 513 may store, for example, information regarding blocks to be the target of use for PUF value generation. Furthermore, the storage unit 513 may store an error correction code for correcting an error in the PUF value.

Next, focusing on the case where the PUF value is recalculated, an operation of the related configuration will be described.

The unique information obtainment unit 515 obtains a pixel value of every block as unique information from a predetermined number or more of blocks to be the target of use for PUF value generation, similarly to the case of generating the PUF value. Then, the unique information obtainment unit 515 outputs, to the unique value arithmetic unit 516, the unique information obtained from each of a predetermined number or more of blocks to be used for PUF value generation.

The unique value arithmetic unit 516 recalculates the PUF value on the basis of the unique information of every block obtained from the unique information obtainment unit 515, similarly to when the PUF value is generated. Furthermore, at this time, if the storage unit 513 stores the error correction code for correcting an error in the PUF value, the unique value arithmetic unit 516 may correct the error in the PUF value recalculated on the basis of the error correction code. Then, the unique value arithmetic unit 516 outputs the recalculated PUF value to a predetermined output destination.

As described above, an example of the functional configuration of the solid-state imaging device 1 according to the present embodiment has been described with reference to FIG. 19, particularly focusing on a part related to generation and recalculation of the PUF value unique to the solid-state imaging device 1.

4.4. Processing

Next, as an example of a flow of a series of processes of the solid-state imaging device 1 according to the present embodiment, processes related to generation and recalculation of the PUF value unique to the solid-state imaging device 1 will be described.

Figure 20:
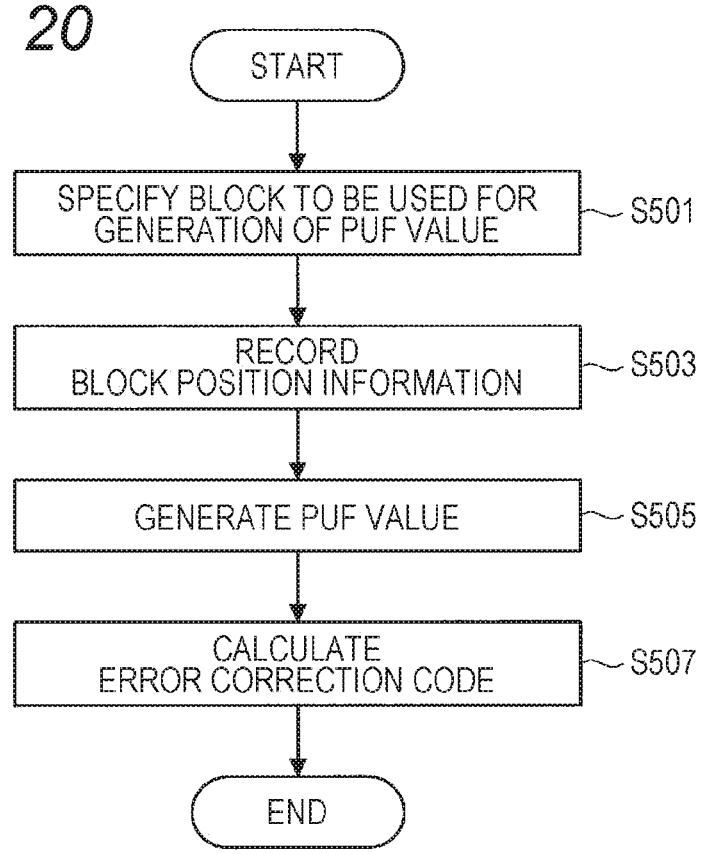
FIG. 20 is a flowchart illustrating an example of a flow of a series of processes of the solid-state imaging device according to the same embodiment.

First, with reference to FIG. 20, an example of processes related to generation of the PUF value will be described. FIG. 20 is a flowchart illustrating an example of a flow of a series of processes of the solid-state imaging device 1 according to the present embodiment, and illustrates a flow of processes related to generation of the PUF value.

As illustrated in FIG. 20, first, the solid-state imaging device 1 (block specification unit 514) specifies, from a plurality of blocks into which pixels included in a predetermined region are divided among the plurality of pixels forming the sensor unit 511, a predetermined number or more (at least 1 or more) of blocks to be used for PUF value generation (S501). Then, the solid-state imaging device 1 stores information regarding the specified blocks (for example, information indicating positions of the blocks) in the predetermined storage area (S503).

Subsequently, the solid-state imaging device 1 (unique information obtainment unit 515) obtains the pixel value of every block as unique information from the blocks specified as the target of use for PUF value generation on the basis of the information stored in the predetermined storage area. Then, the solid-state imaging device 1 (unique value arithmetic unit 516) generates a PUF value on the basis of the unique information obtained from each of the predetermined number or more of blocks to be the target of use. As a specific example, according to whether or not the unique information obtained from every block is larger than a predetermined threshold, the solid-state imaging device 1 may specify a bit value corresponding to the block, and generate a PUF value by concatenating bit values specified for every block (S507).

Furthermore, the solid-state imaging device 1 (unique value arithmetic unit 516) may calculate an error correction code for correcting an error in the PUF value that is separately recalculated by using a part of the bit values specified for every block. In this case, the solid-state imaging device 1 may store the calculated error correction code in the predetermined storage area (S507).

As described above, the PUF value is generated and the generated PUF value is output to a predetermined output destination.

The example of the processes related to generation of the PUF value has been described above with reference to FIG. 20.

Figure 21:
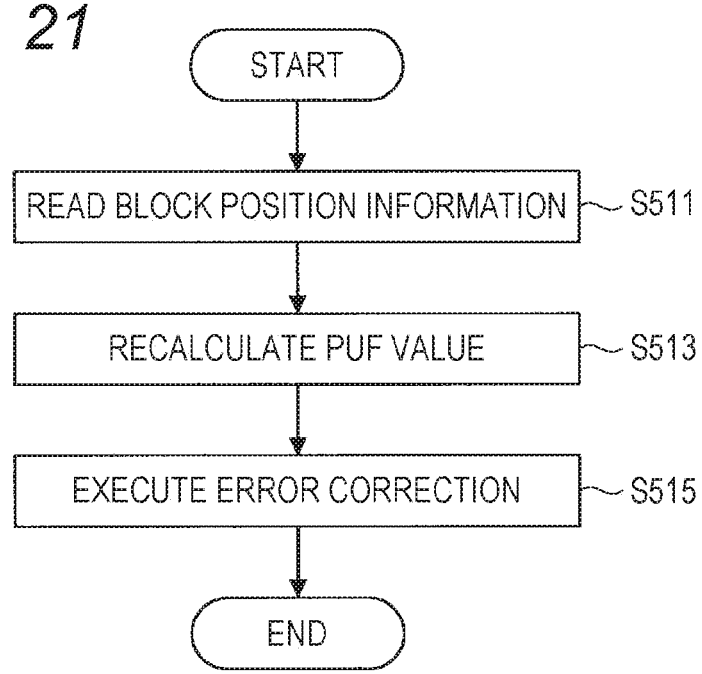
FIG. 21 is a flowchart illustrating an example of a flow of a series of processes of the solid-state imaging device 1 according to the same embodiment.

Next, with reference to FIG. 21, an example of processes related to recalculation of the PUF value will be described. FIG. 21 is a flowchart illustrating an example of a flow of a series of processes of the solid-state imaging device 1 according to the present embodiment, and illustrates a flow of processes related to recalculation of the PUF value.

As illustrated in FIG. 21, first, the solid-state imaging device 1 (unique information obtainment unit 515) specifies the position of a block to be the target of use for PUF value generation on the basis of information stored in the predetermined storage area (S511).

Next, the solid-state imaging device 1 (unique information obtainment unit 515) obtains a pixel value of every block as unique information from the blocks specified as the target of use for PUF value generation. Then, the solid-state imaging device 1 (unique value arithmetic unit 516) recalculates the PUF value on the basis of the unique information obtained from each of a predetermined number or more of blocks to be used, similarly to the case of generating the PUF value (S513).

Furthermore, in a case where the error correction code for correcting an error in the PUF value is stored in the predetermined storage area, the solid-state imaging device 1 (unique information obtainment unit 515) may correct the error in the PUF value recalculated on the basis of the error correction code (S515).

As described above, the PUF value is recalculated, and the recalculated PUF value is output to a predetermined output destination.

The example of the process related to recalculation of the PUF value has been described above with reference to FIG. 21.

4.5. Evaluation

As described above, the solid-state imaging device 1 according to the present embodiment specifies at least one or more blocks as the target for PUF value generation from a plurality of blocks set by dividing pixels included in at least a part of the region (for example, the OPB region) in an imaging surface in which a plurality of pixels is arranged. Note that each block includes at least one pixel. Then, the solid-state imaging device 1 generates a value unique to the solid-state imaging device 1 (that is, a PUF value) on the basis of the pixel values of pixels included in the specified blocks and variations in the pixel values of pixels among the plurality of blocks.

With the above configuration, the value unique to the solid-state imaging device 1 is generated by using physical characteristics (that is, hardware characteristics) of the solid-state imaging device 1 that are difficult to copy. Thus, it is possible to use the unique value as, for example, an identifier for identifying an individual device or key information for encryption processing or the like. Furthermore, by generating the unique value in the solid-state imaging device 1 on the basis of the above-described configuration, in a case where the unique value is used as the identifier or key information, it is possible to sufficiently satisfy the conditions of reproducibility and individual difference required for the identifier or the key information described above.

Note that the above-mentioned example is merely an example, and the physical characteristics are not necessarily limited only to variations in the threshold voltage Vth of the amplification transistor Tr13 as long as the physical characteristics can be detected in every pixel 2 and can satisfy the conditions of reproducibility and individual difference required for the PUF value. For example, among the respective transistors constituting the pixels 2, physical characteristics of transistors other than the amplification transistor Tr13 may be used, and the physical characteristics are not necessarily limited only to variations in the threshold voltage Vth. As a specific example, a detection result of noise generated due to a device, such as what is called random telegraph signal (RTS), may be used to generate the PUF value.

5. Third Embodiment

The above-described first embodiment of the present disclosure has described the solid-state imaging device capable of internally completing encryption processing using unique information without outputting the unique information to the outside. In a third embodiment of the present disclosure described below, a solid-state imaging device capable of detecting a unique value with a good S/N will be described.

5.1. Outline

First, an outline of the third embodiment of the present disclosure will be described. The solid-state imaging device according to the third embodiment of the present disclosure is characterized by selecting pixels by using a scanner that selects different rows in one CDS period, and using variations in a source follower as a PUF value. Specifically, the solid-state imaging device according to the third embodiment of the present disclosure performs a difference process of values read out from adjacent pixels in one CDS period, and uses a result of the difference process as a PUF value.

FIGS. 22 and 23 are explanatory diagrams for describing an outline of operation of the solid-state imaging device according to the third embodiment of the present disclosure. FIG. 22 is an explanatory diagram illustrating a difference process by the solid-state imaging device according to the third embodiment of the present disclosure. In FIG. 22, two output lines VSL0 and VSL1 are illustrated, and a difference between two source follower outputs is taken on the same output line. FIG. 23 illustrates how the PUF value is obtained by eight AD conversions (difference processes). In the present embodiment, in order to improve the S/N, the PUF value is obtained by eight AD conversions (difference processes) as illustrated in FIG. 23, but the present disclosure is not limited to such an example and the number of times is arbitrary.

Figure 24:
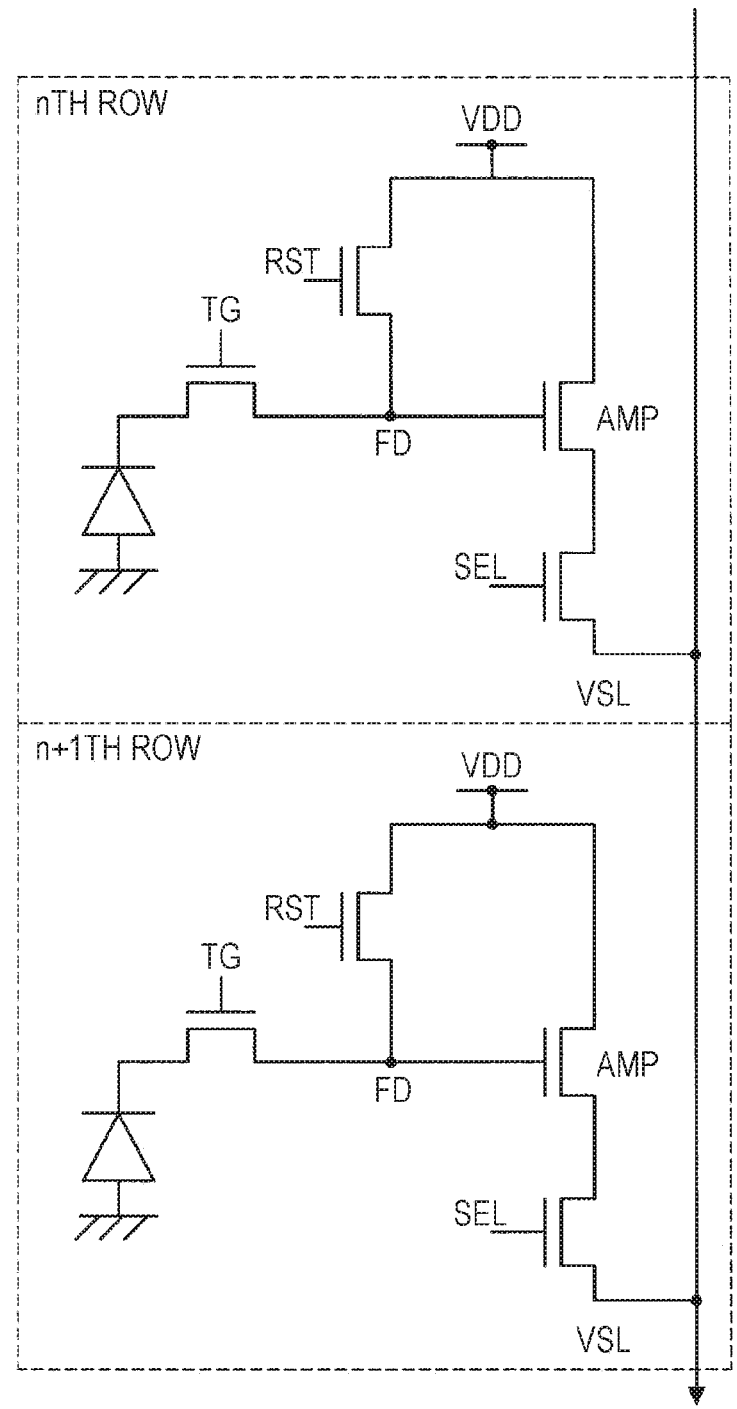
FIG. 24 is an explanatory diagram illustrating a circuit configuration example of the solid-state imaging device according to the same embodiment.

FIG. 24 is an explanatory diagram illustrating a circuit configuration example of the solid-state imaging device according to the third embodiment of the present disclosure, and is an explanatory diagram illustrating an example in which two source follower outputs of an nth row and a (n+1)th row of the pixels are output to the same output line. The solid-state imaging device according to the third embodiment of the present disclosure samples variations in the source follower in the nth row in the first AD conversion, samples variations in the source follower in the (n+1)th row in the second AD conversion, and takes a difference between the variations, during one CDS period.

Normally, in general extraction of a pixel output, noise having a similar in-plane tendency in a plurality of chips, such as shading and unevenness, cannot be removed, and there is a problem in individuality. Furthermore, when removing these noises, it is common to take an adjacent difference in a digital circuit, but the calculation produces $2^{1/2}$ times more noise. Thus, the S/N deteriorates and the reproducibility of the PUF value decreases. On the other hand, the solid-state imaging device according to the third embodiment of the present disclosure can reduce low frequency components and temporal noise at the same time while extracting a variation component of the source follower by taking an adjacent difference during one CDS period in this manner. Specifically, noise can be reduced to $½^{1/2}$ as compared with the method in which the difference is taken by a digital circuit after normal reading. Consequently, in the solid-state imaging device according to the third embodiment of the present disclosure, S/N is improved, and individuality and reproducibility can be improved.

5.2. Driving Example

Figure 25:
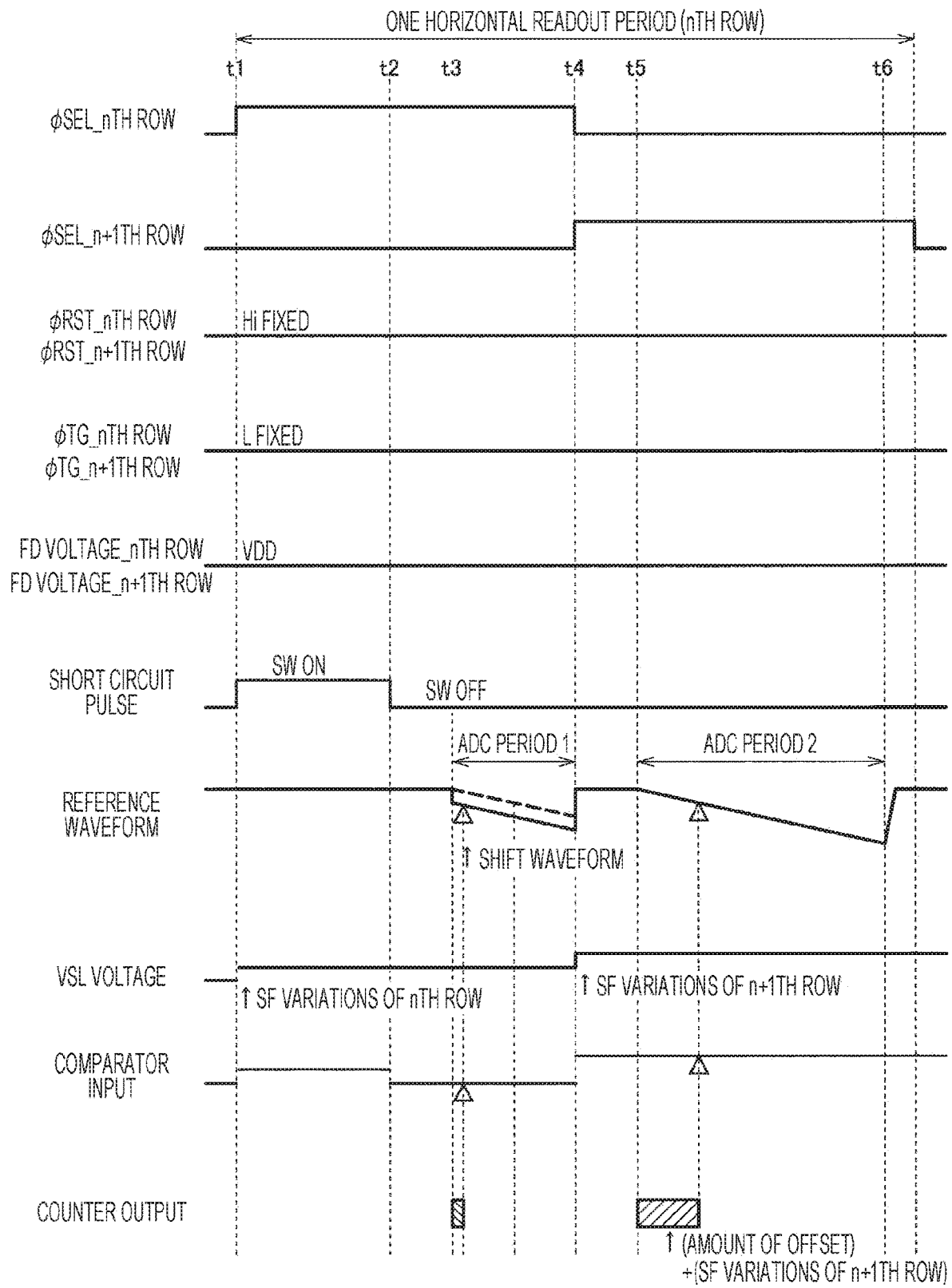
FIG. 25 is an explanatory diagram illustrating a timing chart of a driving example of the solid-state imaging device 1 according to the same embodiment.

Next, a driving example of the solid-state imaging device 1 according to the third embodiment of the present disclosure will be described. FIG. 25 is an explanatory diagram illustrating by a timing chart a driving example of the solid-state imaging device 1 according to the third embodiment of the present disclosure when element unique information is generated. The solid-state imaging device 1 according to the third embodiment of the present disclosure generates element unique information by using a configuration similar to that of the functional configuration example of the solid-state imaging device 1 illustrated in FIG. 9.

First, one horizontal readout period starts at time t1. At time t1, the nth row is selected. That is, the ΦSEL_nth row becomes high. Furthermore, at time t1, a short circuit pulse goes high (on). At this point, the reset transistor RST is in an on state, and thus the voltage of the floating diffusion part FD is fixed to VDD. Thus, variations in the floating diffusion part FD are removed. At this time, a transfer transistor TG may be in an off state. With the transfer transistor TG in an off state, the variations in the photodiode PD can be removed.

Since the short circuit pulse becomes high at time t1, variation information for every source follower in the nth row is output to VSL. It can be said that this is output variation in the amplification transistor AMP. Furthermore, an internal offset of the comparator 275a and a difference between the VSL voltage and the reference waveform are charged in the input capacitor 272a, and the operating point of the comparator 275a is initialized.

Then, at time t2, the short circuit pulse goes low (off), and the initialization of the operating point of the comparator 275a ends. When the short circuit pulse goes low (off), the switches 273a and 274a are turned off. Thus, kTC noise and feedthrough variations occur in the switches 273a and 274a.

Subsequently, at time t3, the first ADC period (ADC period 1) starts. In the ADC period 1, the DA converter 232 linearly changes the reference waveform with a predetermined slope, and AD-converts the variations in the source follower in the nth row. An offset can be added to counter output by shifting the reference waveform (analog clamp level can be adjusted). In this ADC period 1, an inversion delay of the comparator 275a, a delay of the reference waveform, and a clock delay of the counter occur. Note that a triangle in FIG. 25 indicates an inversion timing of the comparator 275a.

Subsequently, at time t4, the first ADC period ends, and the n+1th row is selected. That is, the ΦSEL_n+1th row becomes high. The variation information for every source follower on the n+1th row is output to VSL. It can be said that this is also output variations in the amplification transistor AMP.

Subsequently, at time t5, the second ADC period (ADC period 2) starts. In the ADC period 2, the DA converter 232 linearly changes the reference waveform with a predetermined slope, and AD-converts the variations in the source follower in the n+1th row. This AD conversion value also includes variations in kTC and feedthrough at time t2, inversion delay of the comparator 275a, reference waveform delay, and counter clock delay.

At time t6, the second ADC period (ADC period 2) ends. Thereafter, the solid-state imaging device 1 performs a difference process between the AD conversion value (count value) in the ADC period 1 and the AD conversion value (count value) in the ADC period 2. By this difference process, the solid-state imaging device 1 can detect high-quality element unique information in which variations in the detector and low-frequency components in the vertical direction are removed.

Furthermore, since the counter output is offset in the ADC period 1, the variation information will not be lost even if the difference process is performed. This tendency is due to that the variation information is normally distributed with the reference signal as the center, and thus if there is no offset, a negative value will occur, and all values at and below 0 will stick to 0.

Here, in a case where the low frequency component such as unevenness is in the wafer surface, adjacent chips have similar characteristics, and thus individuality is reduced. Further, in a case where a two-dimensional low-frequency component such as unevenness is unevenness that occurs in the chip surface, the characteristics are similar between chips, and thus individuality decreases. Furthermore, if there are one-dimensional variations in the control circuit (arranged in the vertical direction), the column circuit (arranged in the horizontal direction), or the like within the chip, individuality decreases. Therefore, it is desirable that these components are removed.

Therefore, the solid-state imaging device 1 includes a spatial filter (high-pass filter) that passes a high-frequency signal for a one-dimensional or two-dimensional data string read in the ADC period. Any filter having a low frequency removing function may be used. When it is implemented in the digital region, for example, a rank filter or a convolution filter which is generally used may be used, and a simple adjacent difference may be used as described above.

In a case where a white spot of the photodiode PD (or the photodiode PD and the transfer transistor TG) is used as element unique information, the white spot and the dark current generally have different temperature characteristics, and therefore it is desirable to remove the dark current. Although the dark current is smaller than the white spot, it varies among the individual photodiodes PD and also includes uneven low frequency components. Therefore, the solid-state imaging device 1 can accurately detect the white spot by removing the uneven low-frequency components by passing through the high-pass filter.

In a case where a component of the reset transistor RST is used as element unique information, individuality of every element can be enhanced by removing, with the high-pass filter, low frequency components such as unevenness among variations in the threshold value and parasitic capacitance of the reset transistor RST.

In a case where a source follower output is used as element unique information, the individuality of every element can be enhanced by removing, with the high-pass filter, two-dimensional low frequency components such as linear variations and unevenness in the horizontal direction or the vertical direction among variations in the threshold value and overdrive voltage of the amplification transistor AMP due to manufacturing variations.

In a case where switch variations in the comparator 231 are used as element unique information, the individuality of every element can be enhanced by removing, with the high-pass filter, low frequency components such as unevenness among variations in the threshold value and parasitic capacitance of the transistor used as a switch. At this time, since the comparator 231 is arranged in the horizontal direction, a horizontal high-pass filter may be applied.

A two-dimensional spatial filter may be a filter performed in an analog region in one direction and may be a filter performed in a digital region in another direction. That is, if the filter performed in the analog region is in the vertical direction, the filter performed in the digital region is in the horizontal direction, and if the filter performed in the analog region is in the horizontal direction, the filter performed in the digital region is in the vertical direction. Furthermore, if the filter performed in the analog region is diagonal, the filter performed in the digital region can be achieved in a diagonal direction orthogonal thereto. The lateral filter and the diagonal filter in the analog region can be achieved with a multiplexer.

In the third embodiment of the present disclosure, as components for generating element unique information, source follower circuits in which selection switches are connected in series are arranged in a two-dimensional matrix, and a function to perform a difference process for two sampled input signals is provided in, for example, the detection unit 218. When the drive control unit 210 samples the first input signal and the second input signal, it has a function to control the selection switch so as to select respective different rows.

The solid-state imaging device 1 according to the third embodiment of the present disclosure can detect the element unique information by two times of sampling and one time of difference process that are the same as in normal reading, and thus the calculation amount can be minimized and temporal noise at the time of detection can be minimized.

Moreover, since the solid-state imaging device 1 according to the third embodiment of the disclosure is configured to detect element unique information from an output difference of a pair of source followers, the types of elements related to generation of element unique information can be minimized, and the characteristics can be managed easily.

Furthermore, the solid-state imaging device 1 according to the third embodiment of the present disclosure can remove low-frequency component noise in the scanning direction by performing the difference process between rows. Here, the difference process between adjacent rows does not necessarily have to be performed, but the closer the rows are, the higher the noise removal effect is. Thus, the difference process between the adjacent rows is desirable.

Furthermore, when performing the spatial filter process two-dimensionally, the solid-state imaging device 1 according to the third embodiment of the present disclosure may perform the high-pass filter process such as a difference process for block values in different columns. As long as the source follower circuit is provided with a selection switch and can be read out via the vertical signal line, the type such as an effective pixel, a light-shielded pixel, or a clip circuit is not in question. Furthermore, the solid-state imaging device 1 according to the third embodiment of the present disclosure can also perform the difference process in the column direction by performing a switching process in the same row for signal lines in adjacent columns. Furthermore, the solid-state imaging device 1 according to the third embodiment of the present disclosure can also perform the difference process in the diagonal direction by performing the switching processing on the signal lines of the adjacent columns in different rows.

The solid-state imaging device according to the third embodiment of the present disclosure can reduce low frequency components and temporal noise at the same time and can improve the individuality and reproducibility while extracting a variation component of the source follower by taking an adjacent difference during one CDS period in this manner and using the high-pass filter.

The solid-state imaging device according to the third embodiment of the present disclosure includes a normal drive (imaging mode) and a drive for detecting element unique information (PUF mode), and may further include a drive (test mode) for testing a circuit related to generation of element unique information and unique value detection, and may switch these drives.

In a case of handling element unique information for security purposes (for example, when generating a key), outputting the element unique information and the encryption processing method to the outside reduces the security. Thus, in order to test whether or not the unique value calculation unit 220 can correctly generate the unique value, it is necessary to perform a test inside the chip and output a test result to the outside. Therefore, the solid-state imaging device according to the third embodiment of the present disclosure includes a test mode, so that subject information can be output as an image in the imaging mode, element unique information can be processed inside the chip to calculate a unique value in the PUF mode, and whether or not the circuit that calculates the unique value is normal can be tested or whether or not the unique value calculation unit 220 and other components include an abnormality can be tested inside the chip in the test mode.

Figure 26:
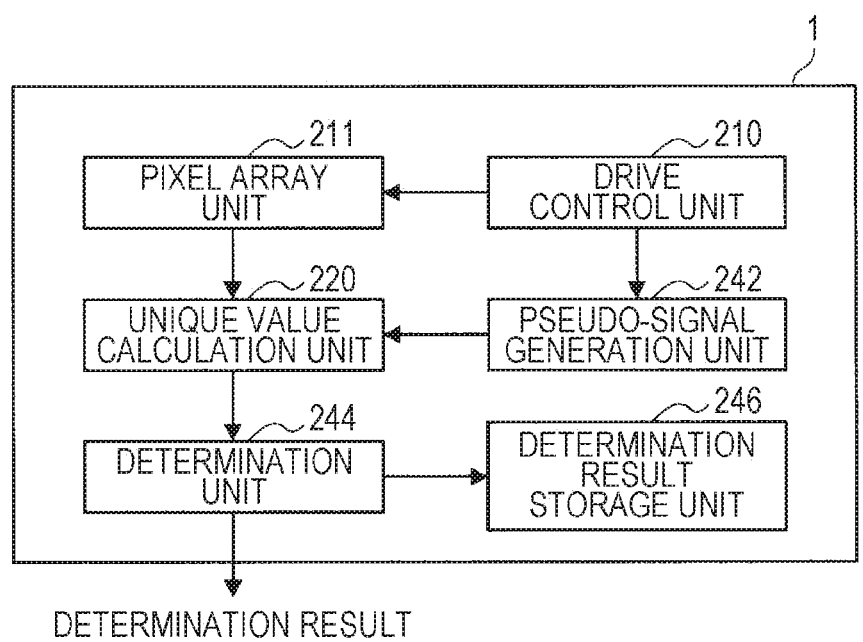
FIG. 26 is an explanatory diagram illustrating a functional configuration example of the solid-state imaging device according to the same embodiment.

FIG. 26 is an explanatory diagram illustrating a functional configuration example of the solid-state imaging device according to the third embodiment of the present disclosure. FIG. 26 illustrates a part of the functional configuration example of the solid-state imaging device 1 illustrated in FIG. 9, and moreover, in addition to the functional configuration example of the solid-state imaging device 1 illustrated in FIG. 9, a pseudo-signal generation unit 242, a determination unit 244, and a determination result storage unit 246 are illustrated.

The pseudo-signal generation unit 242 generates a pseudo-signal for test when the solid-state imaging device 1 operates in the test mode. The pseudo-signal for test is sent to the unique value calculation unit 220 and used for calculating the unique value.

The determination unit 244 determines whether or not a test result is within a desired range and outputs a determination result to the outside of the solid-state imaging device 1. It is desired that the determination unit 244 outputs, for example, a value that is simple and unrelated to a unique value, such as 1 if the test result is within a desired range or 0 if the test result is outside the desired range, or outputs a value (hash value) having undergone a calculation process that is irreversible and includes a loss of information amount.

An output path of the determination result from the determination unit 244 is not particularly limited, and may be superimposed on an existing interface or may be output from a dedicated terminal. Furthermore, output timing of the determination result may be at an end of the test mode, or a result may be written in a memory such as the determination result storage unit 246 or the like so that it can be read out to the outside at an arbitrary timing.

The solid-state imaging device according to the third embodiment of the present disclosure may include one or more sets of memories for storing a data string corresponding to an address of every element of the unique information generation unit 214. For example, when allocating a one-bit memory for each address, 1 or 0 is written to the address of an element to be used. Thus, the solid-state imaging device according to the third embodiment of the present disclosure can store in advance whether or not a predetermined condition is satisfied for every address.

The solid-state imaging device according to the third embodiment of the present disclosure can further write a value corresponding to an element of the unique information generation unit 214 (obtained by coding a block value by every address) in the memory during the test, thereby allowing a desired process to be performed with respect to a fluctuation in unique value due to test conditions. This value is erased by overwriting a predetermined value (for example, 0) after the test is completed, and thus cannot be read from the outside. Furthermore, after the memory is erased, if One Time Programmable (OTP) is used, setting can be made so that address information cannot be changed or a value cannot be written. In a case where the address is stored, it is desired that a non-volatile memory or OTP is used. In a case where the value is stored, since the information is finally erased, the type such as a volatile memory, a non-volatile memory, OTP, or the like is not in question.

The solid-state imaging device according to the third embodiment of the present disclosure can test a circuit and output a test result to the outside, for example, without outputting information requiring security such as key information to the outside, and can thereby ensure safety when testing the circuit.

Figure 27:
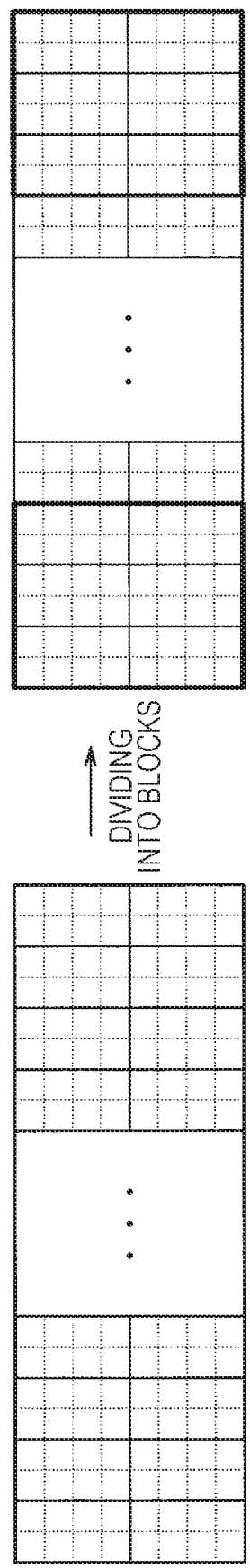
FIG. 27 is an explanatory diagram illustrating a state in which respective pixels of a unique information generation unit 214 are divided into blocks.

The unique value calculation unit 220 may include a function of performing a predetermined test on block values when operating in the test mode. FIG. 27 is an explanatory diagram illustrating a state in which respective pixels of the unique information generation unit 214 are divided into blocks. Since the solid-state imaging device according to the third embodiment of the present disclosure cannot output element unique information itself to the outside due to the nature of security, it is necessary to test inside the chip whether or not the element unique information has no abnormality. When operating in the test mode, the solid-state imaging device according to the third embodiment of the present disclosure can test for the element unique information without using an element exhibiting an abnormal characteristic, and thus can enhance reliability (reproducibility) of the element unique information.

For example, the unique value calculation unit 220 may include a function to calculate one or more of an average value, a median value, a variance value, and a difference from the average value or the median value for a data string of block values. By including such a function, the unique value calculation unit 220 can perform statistical processing, and therefore can perform a test so that only a desired element is used on the basis of a calculation result.

The unique value calculation unit 220 may include a function to determine, when operating in the test mode, whether or not a distribution exhibits symmetry with respect to the data string of block values, and exclude the data string from the data for calculating a unique value on the basis of a determination result. For example, the unique value calculation unit 220 compares the number of blocks indicating a block value larger than the average with the number of blocks indicating a block value smaller than the average, and can determine that the distribution of block values is asymmetric if there is a difference of a predetermined amount or more as a result of comparison. When the expected distribution of the data string of block values is a symmetric distribution like a normal distribution, the unique value calculation unit 220 can determine that the data string includes an abnormality and exclude this data string.

The unique value calculation unit 220 may have a function to determine, when operating in the test mode, whether or not the difference from the average value or the median value for a block value is an outlier of a predetermined value or more, and exclude it from the data for calculating a unique value on the basis of a determination result. With such a function, the unique value calculation unit 220 can detect and remove a point-like abnormal value due to a defect, and thereafter calculate the unique value from the block value. Therefore, the reliability of the unique value calculated by the unique value calculation unit 220 can be improved. For example, the unique value calculation unit 220 may obtain a difference from the average or median value, a G value, and make a determination on the basis of a value obtained by multiplying the G value by a predetermined coefficient. This outlier can be assumed to be deviated by $k*\sigma$, where k may be determined on the basis of the number of blocks to be handled. Furthermore, the outlier may be determined in advance to be a specific value or more. Then, the unique value calculation unit 220 may be able to store the address of a block indicating an abnormal block value.

The unique value calculation unit 220 may have a function to determine, when operating in the test mode, whether or not the average value or the variance value of a block group including a predetermined number of blocks exceeds a predetermined range, and exclude it from the data for calculating a unique value on the basis of a determination result. With such a function, the unique value calculation unit 220 can detect and exclude a linear or lumped abnormal value due to a defect such as an open defect or a short defect. Therefore, the reliability of the unique value calculated by the unique value calculation unit 220 can be improved, and the amount of memory used for storing the address of the block indicating the abnormal block value can be reduced. In the block group, an abnormal value for one row may be detected, or one row may be divided into a plurality of regions and the abnormal value may be detected in each region. The unique value calculation unit 220 may be able to store the address of a block group indicating an abnormal block value. Furthermore, the start address and end address of the block may be set arbitrarily.

The unique value calculation unit 220 may have a function to determine, when operating in the test mode, whether or not the number of blocks excluded from the data used for calculating a unique value is larger than a predetermined number, and output a determination result to the outside. With such a function, the unique value calculation unit 220 can determine a defective chip when the number of defective block values is large and exceeds the upper limit of a memory in which an address can be registered, and can manage quality of the solid-state imaging device 1. The memory having a function to register the address of an outlier may be shared with the memory used by the unique value calculation unit 220. If the unique value has temperature dependency, the unique value calculation unit 220 may register the address of a block indicating an abnormal value for every temperature in the memory. If the unique value has voltage dependency, the unique value calculation unit 220 may register the address of a block indicating an abnormal value for every voltage. If the unique value has current dependency, the unique value calculation unit 220 may register the address of a block indicating an abnormal value for every current. If the unique value has one or more characteristics of temperature dependency, voltage dependency, and current dependency, the unique value calculation unit 220 may register the address of a block indicating an abnormal value for each of them. When registering the address of an outlier, the unique value calculation unit 220 may repeat the determination a plurality of times. By repeating the determination a plurality of times, the unique value calculation unit 220 can improve probability of detecting a component that fluctuates over time, and can increase accuracy of detecting whether or not there is a defect.

Figure 28:
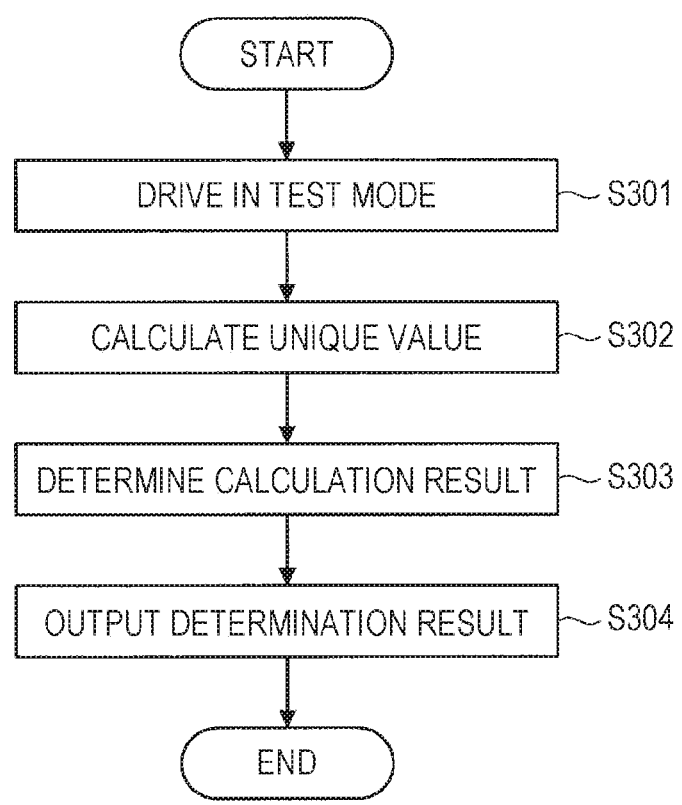
FIG. 28 is a flowchart illustrating an operation example of the solid-state imaging device 1 according to the same embodiment.

FIG. 28 is a flowchart illustrating an operation example of the solid-state imaging device 1 according to the third embodiment of the present disclosure. FIG. 28 illustrates an operation example of the solid-state imaging device 1 when operating in the test mode.

Upon starting driving in the test mode (step S301), the solid-state imaging device 1 calculates a unique value using a pseudo-signal for test (step S302). Then, the solid-state imaging device 1 determines a calculation result of the unique value (step S303) and outputs a determination result to the outside (step S304).

By executing such a series of operations, the solid-state imaging device 1 according to the third embodiment of the present disclosure can test whether or not the circuit that calculates the unique value is normal, or can test whether or not an abnormality is included in the unique value calculation unit 220 or the like inside the chip.

The solid-state imaging device 1 according to the third embodiment of the present disclosure may test whether or not the circuit that calculates a unique value is normal by performing the unique value calculation a plurality of times while changing conditions at the time of determination. For example, assuming the condition for the first test as "condition 1", the solid-state imaging device 1 stores in the memory a value corresponding to address and element of a defective element (for example, a binary on whether it is larger or smaller than the average of an element group) in a test result under the condition 1. Assuming the condition for the next test as "condition 2", if it is inverted as compared with the value corresponding to the element of condition 1, the address is additionally written in the memory as a defective element. Since the solid-state imaging device 1 performs such a test a plurality of times, the unique value is calculated by using only a stable element with respect to a characteristic fluctuation accompanying an environmental change, and thus the reliability of the unique value can be further improved. Note that the solid-state imaging device 1 can also test for a fluctuation due to random noise components (thermal noise, flicker noise, random telegraph noise, and the like) by repeating the test a plurality of times under the same condition for all tests.

6. Application Example

Next, application examples of the solid-state imaging device according to the present disclosure will be described.

6.1. Application Example to Biometric Authentication

As an application example of the technology according to the present disclosure, an example of a case where the solid-state imaging device 1 according to one embodiment of the present disclosure is applied to biometric authentication using what is called biometric information will be described. Note that in the present description, "biometric information" refers to information representing characteristics of human body, such as an iris, fingerprint, vein, face, handprint, voiceprint, pulse wave, and retina, for example.

Figure 29:
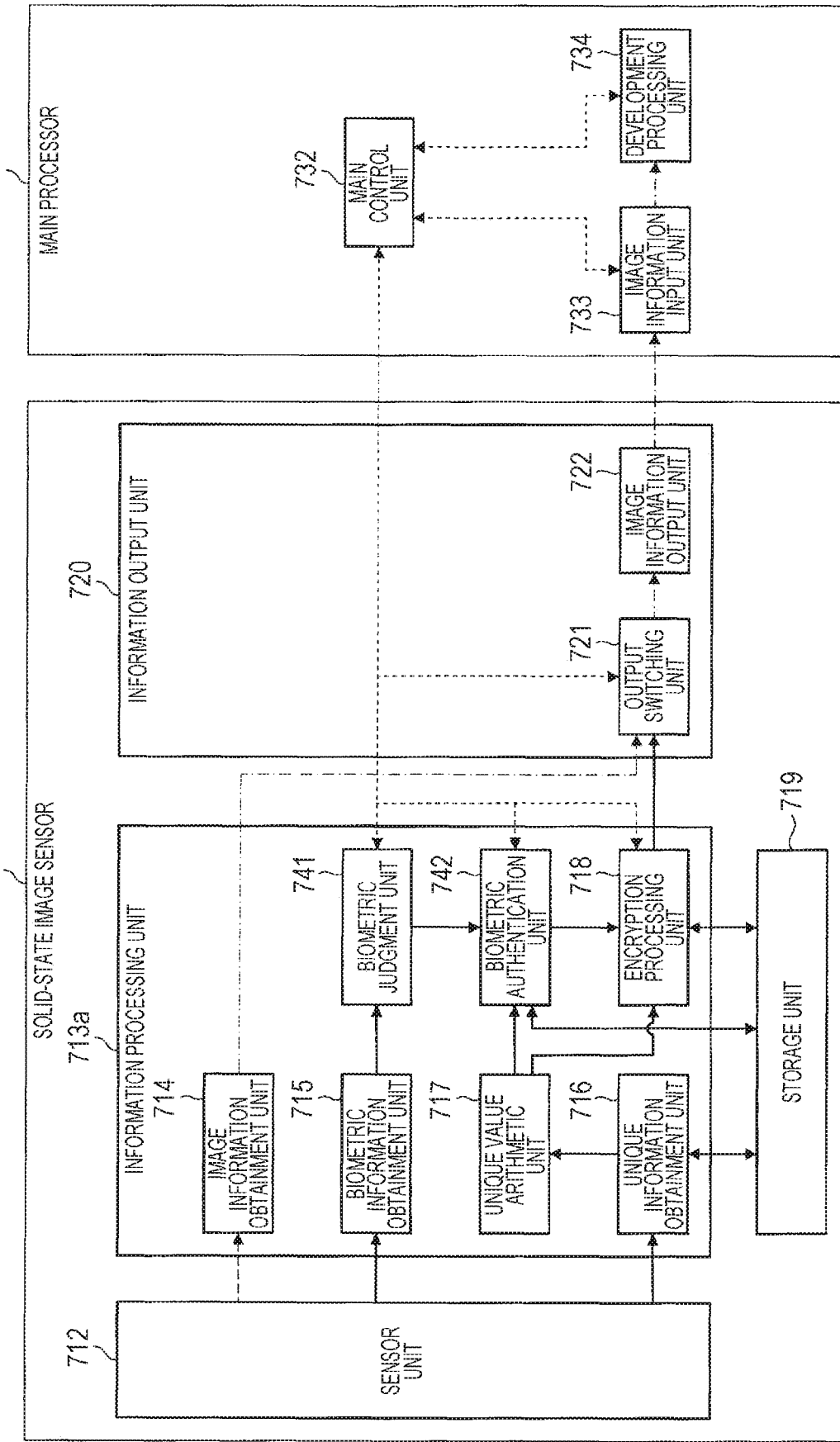
FIG. 29 is a block diagram illustrating an example of a schematic functional configuration of an imaging device in a case of applying to biometric authentication.

Configuration Example 1: Example of Configuration for Performing Biometric Authentication in Solid-State Imaging Device First, with reference to FIG. 29, regarding an example of a functional configuration of an imaging device to which the solid-state imaging device according to the present application example is applied, particularly an example of a case where biometric authentication is performed in the solid-state imaging device will be described. FIG. 29 is an explanatory diagram for describing an application example of the technology according to the present disclosure, and is a block diagram illustrating an example of a schematic functional configuration of an imaging device according to the present application example.

As illustrated in FIG. 29, an imaging device 710a according to the present application example includes a solid-state image sensor 711a and a main processor 731a.

The solid-state image sensor 711a corresponds to the solid-state imaging device 1 according to one embodiment of the present disclosure described above. As illustrated in FIG. 29, the solid-state image sensor 711a includes a sensor unit 712, an information processing unit 713, a storage unit 719, and an information output unit 720. Furthermore, although not illustrated in FIG. 29, the solid-state image sensor 711a may include a register interface that transmits and receives set values to and from the outside. Here, the "outside" means a recording medium that stores image information generated by the image sensor, a network for transmitting the image information, and a main processor that processes the image information or an imaging device main body such as a digital camera, a personal computer (PC), a mobile terminal, a game device, a non-contact type IC card such as FeliCa (registered trademark), a USB memory, and the like.

The sensor unit 712 corresponds to the pixel array 3 described with reference to FIG. 1 and photoelectrically converts light from a subject into an electrical signal.

The information processing unit 713a processes the obtained information as needed. As illustrated in FIG. 29, the information processing unit 713a includes, for example, an image information obtainment unit 714, a biometric information obtainment unit 715, a biometric judgment unit 741, a biometric authentication unit 742, a unique information obtainment unit 716, a unique value arithmetic unit 717, and an encryption processing unit 718.

The image information obtainment unit 714 performs, on the basis of light of a subject imaged by the user, analog-digital conversion (A/D conversion) for converting an electrical signal photoelectrically converted by the sensor unit 712 from an analog signal to a digital signal, so as to obtain image information.

The biometric information obtainment unit 715 performs A/D conversion of the electrical signal photoelectrically converted by the sensor unit 712 on the basis of light of a subject imaged for biometric authentication of the user, so as to obtain biometric information.

The unique information obtainment unit 716 obtains information unique to a device that constitutes the solid-state image sensor 711 (hereinafter, also referred to as "unique information"). For example, as described above in the second embodiment, the unique information obtainment unit 716 may obtain, as unique information, a pixel value of one or more pixels included in at least a part of the region (for example, OPB region) among the plurality of pixels forming the sensor unit 712. Furthermore, at this time, the unique information obtainment unit 716 may specify, for example, a pixel or a block including one or more pixels for which unique information is to be obtained on the basis of information stored in advance in a storage unit 719 described later.

The unique value arithmetic unit 717 receives the unique information obtained by the unique information obtainment unit 716 as an input, and generates (or calculates) a value unique to the solid-state image sensor 711 on the basis of a predetermined function (for example, the PUF described above). As a specific example, as described above in the second embodiment, the unique value arithmetic unit 717 may receive a pixel value of a predetermined pixel obtained as the unique information as an input, and generate a PUF value unique to the solid-state image sensor 711.

The biometric judgment unit 751 judges whether or not the biometric information obtained by the biometric information obtainment unit 715 is capable of authenticating the user.

The biometric authentication unit 752 compares the biometric information judged to be capable of authenticating the user with reference information stored in the predetermined storage area (for example, the storage unit 719 described later), and authenticates whether or not the user is eligible for use. Note that the reference information may be encrypted on the basis of, for example, a value (for example, PUF value) unique to the solid-state image sensor 711 generated by the unique value arithmetic unit 717. In this case, the biometric authentication unit 752 may obtain a value unique to the solid-state image sensor 711 from the unique value arithmetic unit 717, and decrypt the reference information on the basis of the obtained value.

The encryption processing unit 718 encrypts biometric authentication information that has been authenticated as that of a person who is eligible to use to generate encryption information, and sends the encryption information to the information output unit 720. Note that key information for the encryption may be encrypted on the basis of a value (for example, PUF value) unique to the solid-state image sensor 711 generated by the unique value arithmetic unit 717, for example. In this case, the encryption processing unit 718 may obtain a value unique to the solid-state image sensor 711 from the unique value arithmetic unit 717, and decrypt the key information on the basis of the obtained value.

The information output unit 720 outputs various information output from the information processing unit 713a to the outside of the solid-state image sensor 711a, and includes, for example, an output switching unit 721 and an image information output unit 722.

The output switching unit 721 switches which information is output to the outside of the solid-state image sensor 711a according to the type of information input from the information processing unit 713a. That is, it has a role of a switch for switching the output destination. By the solid-state image sensor 711a including the output switching unit 721, the user can select whether or not to output image information illustrated below or to output encryption information.

For example, when the output switching unit 721 has selected to output the encryption information, the output switching unit 721 performs control so that the encryption information generated by the encryption processing unit 718 (for example, encrypted biometric authentication information) is transmitted to the main processor 731a via a register interface (not illustrated) or the like.

When the output switching unit 721 has selected to output the image information, the image information output unit 722 receives image information obtained by the image information obtainment unit 714, and outputs the image information to the outside of the solid-state image sensor 711a.

The main processor 731a receives image information or encryption information from the solid-state image sensor 711a, and executes various processes according to the type of the received information. As illustrated in FIG. 20, the main processor 731a includes a main control unit 732, an image information input unit 733, and a development processing unit 734.

The main control unit 732 controls operation of each component of the imaging device 710a. For example, in order to cause the solid-state image sensor 711a to execute each function, the main control unit 732 transmits a control signal corresponding to the function to the solid-state image sensor 711a. Furthermore, in order to implement each function of the main processor 731a, the main control unit 732 transmits a control signal corresponding to the function to each unit in the main processor 731a.

The image information input unit 733 obtains image information output from the solid-state image sensor 711a in response to the control signal from the main control unit 732.

The development processing unit 734 performs development processing of an output image on the basis of the image information obtained by the image information input unit 733 from the solid-state image sensor 711a in response to the control signal from the main control unit 732.

As above, with reference to FIG. 29, the example of the functional configuration of the imaging device to which the solid-state imaging device according to the present application example is applied, particularly the example of the case where biometric authentication is performed in the solid-state imaging device has been described.

Figure 30:
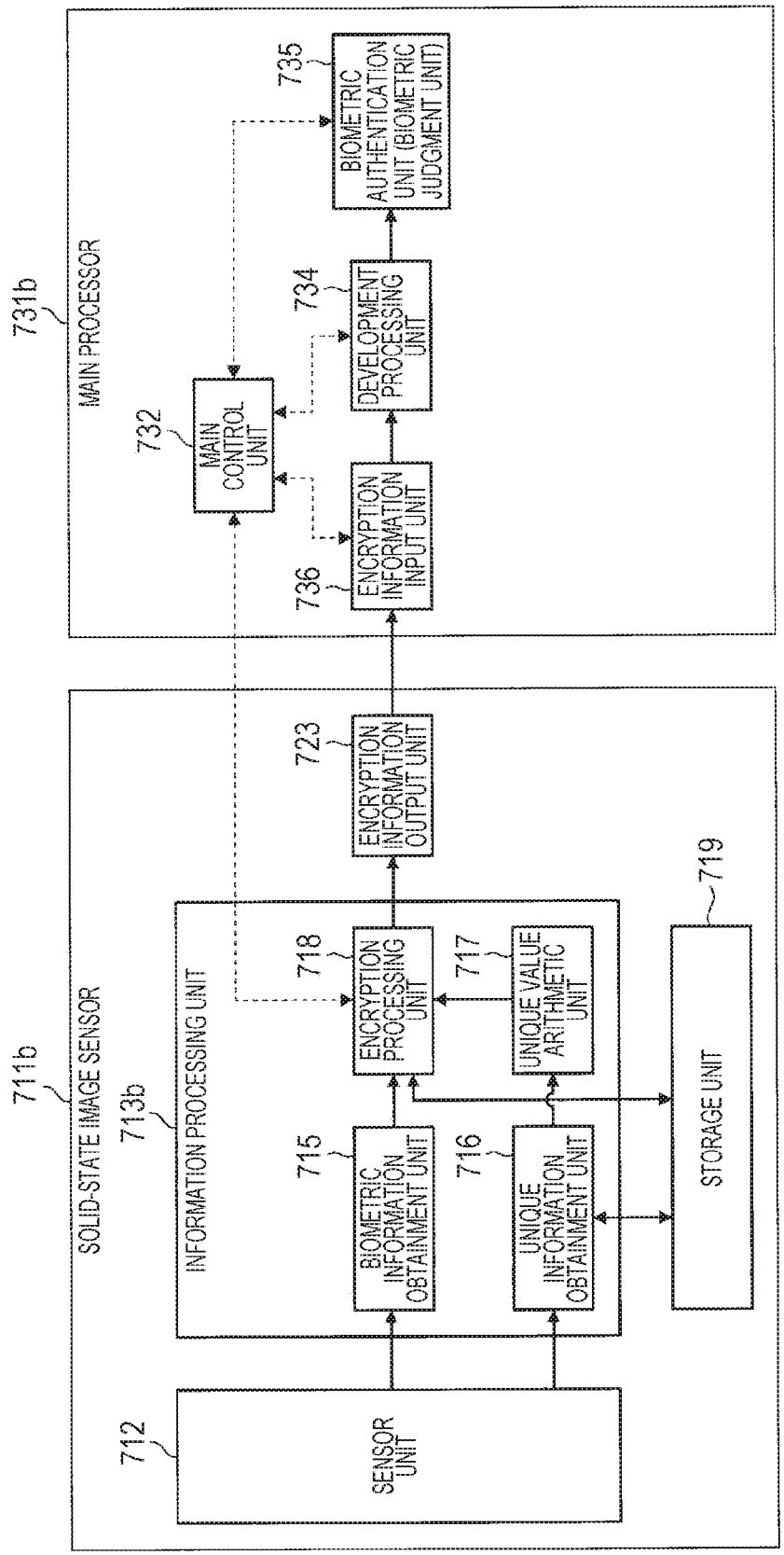
FIG. 30 is a block diagram illustrating another example of a schematic functional configuration of an imaging device in a case of applying to biometric authentication.

Configuration Example 2: Example of Configuration for Encrypting and Outputting Biometric Information Next, with reference to FIG. 30, regarding an example of a functional configuration of an imaging device to which the solid-state imaging device according to the present application example is applied, particularly an example of a case where biometric information obtained by the solid-state imaging device is subjected to encryption processing and then output to the outside will be described. FIG. 30 is an explanatory diagram for describing an application example of the technology according to the present disclosure, and is a block diagram illustrating another example of a schematic functional configuration of an imaging device according to the present application example. Note that in the present description, the functional configuration of the imaging device 710b illustrated in FIG. 30 will be described, particularly focusing on differences from the imaging device 710a described with reference to FIG. 29, and detailed description of parts substantially similar to those of the imaging device 710a will be omitted.

As illustrated in FIG. 30, an imaging device 710b according to the present application example includes a solid-state image sensor 711b and a main processor 731b. Note that the solid-state image sensor 711b and the main processor 731b correspond to the solid-state image sensor 711a and the main processor 731a in the imaging device 710a illustrated in FIG. 29. Note that, in the example illustrated in FIG. 30, in order to make the features easier to understand, mainly components related to processing for biometric information are illustrated, and illustration of the components related to the processing for the image information described above is omitted. Therefore, for example, also in the example illustrated in FIG. 30, similarly to the example illustrated in FIG. 29, components such as the image information obtainment unit 714, the output switching unit 721, the image information output unit 722, the image information input unit 733, and the like may be included.

As illustrated in FIG. 30, the solid-state image sensor 711b includes a sensor unit 712, an information processing unit 713b, an encryption information output unit 723, and a storage unit 719. Furthermore, the information processing unit 713b includes, for example, a biometric information obtainment unit 715, a unique information obtainment unit 716, a unique value arithmetic unit 717, and an encryption processing unit 718. Note that the sensor unit 712, the storage unit 719, the biometric information obtainment unit 715, the unique information obtainment unit 716, and the unique value arithmetic unit 717 are substantially similar to the sensor unit 712, the storage unit 719, the biometric information obtainment unit 715, the unique information obtainment unit 716, and the unique value arithmetic unit 717 in the imaging device 710a illustrated in FIG. 29.

The encryption processing unit 718 encrypts biometric information obtained by the biometric information obtainment unit 715 (for example, image information of iris, fingerprint, vein, face, handprint, voiceprint, pulse wave, and retina, or the like) to generate encryption information, and then transmits the encryption information to the encryption information output unit 723. Note that key information for the encryption may be encrypted on the basis of a value (for example, PUF value) unique to the solid-state image sensor 711 generated by the unique value arithmetic unit 717, for example. In this case, the encryption processing unit 718 may obtain a value unique to the solid-state image sensor 711 from the unique value arithmetic unit 717, and decrypt the key information on the basis of the obtained value.

The encryption information output unit 723 receives the encryption information generated by the encryption processing performed on the biometric information by the encryption processing unit 718, and outputs the encryption information to the outside of the solid-state image sensor 711b.

The main processor 731b includes a main control unit 732, an encryption information input unit 736, a development processing unit 734, and a biometric authentication unit 735.

The main control unit 732 controls operation of each component of the imaging device 710b. For example, in order to cause the solid-state image sensor 711b to execute each function, the main control unit 732 transmits a control signal corresponding to the function to the solid-state image sensor 711b. Furthermore, in order to implement each function of the main processor 731b, the main control unit 732 transmits a control signal corresponding to the function to each unit in the main processor 731b.

The encryption information input unit 736 obtains encryption information output from the solid-state image sensor 711b in response to the control signal from the main control unit 732.

The development processing unit 734 decrypts the encryption information obtained by the encryption information input unit 736 from the solid-state image sensor 711b in response to the control signal from the main control unit 732, and performs development processing of an output image used for biometric authentication on the basis of biometric information (image information) obtained as a decryption result. Note that regarding key information for decrypting the encryption information, it is only required that one similar to the key information used for generating the encryption information is obtained in advance and stored in a predetermined storage area. Then, the development processing unit 734 outputs an output image obtained as a result of current processing to the biometric authentication unit 735.

The biometric authentication unit 735 judges whether or not an output image output from the development processing unit 734 can authenticate the user. The biometric authentication unit 735 compares the output image (in other words, biometric information) judged to be capable of authenticating the user with reference information stored in the predetermined storage area, and authenticates whether or not the user is eligible for use.

As above, with reference to FIG. 30, regarding the example of the functional configuration of the imaging device to which the solid-state imaging device according to the present application example is applied, particularly the example of the case where biometric information obtained by the solid-state imaging device is subjected to encryption processing and then output to the outside has been described.

Figure 31:
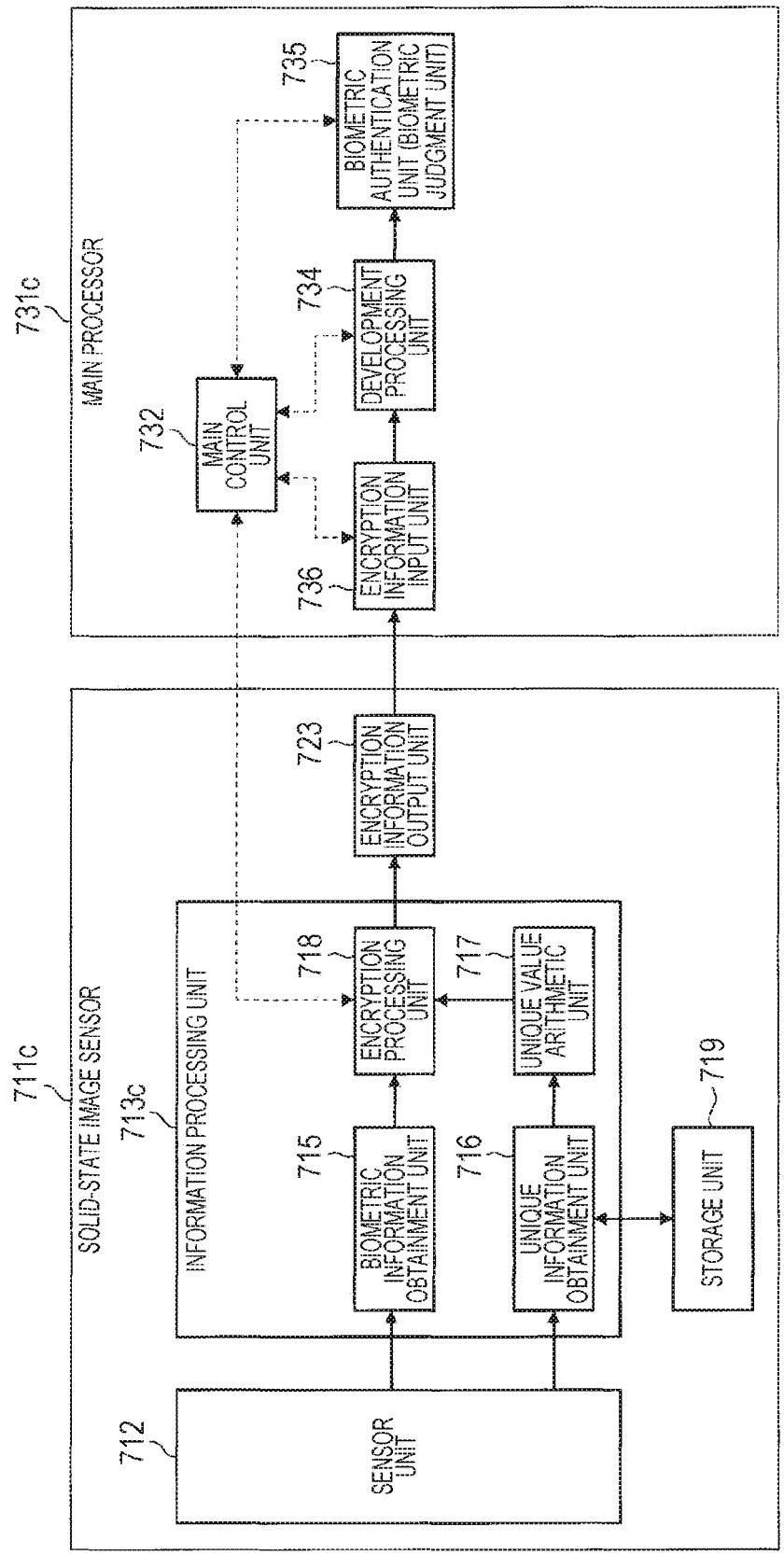
FIG. 31 is a block diagram illustrating another example of a schematic functional configuration of an imaging device in a case of applying to biometric authentication.

Configuration Example 3: Another Example of Configuration for Encrypting and Outputting Biometric Information Next, with reference to FIG. 31, regarding an example of a functional configuration of an imaging device to which the solid-state imaging device according to the present application example is applied, particularly another example of a case where biometric information obtained by the solid-state imaging device is subjected to encryption processing and then output to the outside will be described. FIG. 31 is an explanatory diagram for describing an application example of the technology according to the present disclosure, and is a block diagram illustrating another example of a schematic functional configuration of an imaging device according to the present application example. Note that, in the present description, the functional configuration of the imaging device 710c illustrated in FIG. 31 will be described, particularly focusing on differences from the imaging device 710b described with reference to FIG. 30, and detailed description of parts substantially similar to those of the imaging device 710b will be omitted.

As illustrated in FIG. 31, an imaging device 710c according to the present application example includes a solid-state image sensor 711c and a main processor 731c. Note that the solid-state image sensor 711c and the main processor 731c correspond to the solid-state image sensor 711b and the main processor 731b in the imaging device 710b illustrated in FIG. 30. Note that, in the example illustrated in FIG. 31, in order to make the features easier to understand, mainly components related to processing for biometric information are illustrated, and illustration of the components related to the processing for the image information described above is omitted. Therefore, for example, also in the example illustrated in FIG. 31, similarly to the example illustrated in FIG. 29, components such as the image information obtainment unit 714, the output switching unit 721, the image information output unit 722, the image information input unit 733, and the like may be included.

As illustrated in FIG. 31, the solid-state image sensor 711c includes a sensor unit 712, an information processing unit 713c, an encryption information output unit 723, and a storage unit 719. Furthermore, the information processing unit 713c includes, for example, a biometric information obtainment unit 715, a unique information obtainment unit 716, a unique value arithmetic unit 717, and an encryption processing unit 718.

Note that in the example illustrated in FIG. 31, as key information for performing encryption processing on the biometric information obtained by the biometric information obtainment unit 715, a value unique to the solid-state image sensor 711c generated by the unique value arithmetic unit 717 (for example, PUF value) is used, which is the difference from the example illustrated in FIG. 31. That is, in the solid-state image sensor 711c illustrated in FIG. 31, the operation of the encryption processing unit 718 is different from that of the solid-state image sensor 711b illustrated in FIG. 30, and other configurations are substantially similar to those of the solid-state image sensor 711b.

That is, the encryption processing unit 718 encrypts biometric information obtained by the biometric information obtainment unit 715 by using a value unique to the solid-state image sensor 711c generated by the unique value arithmetic unit 717 as key information to thereby generate encryption information, and transmits the encryption information to the encryption information output unit 723.

Furthermore, the encryption information output unit 723 receives the encryption information generated by the encryption processing performed on the biometric information by the encryption processing unit 718, and outputs the encryption information to the outside of the solid-state image sensor 711c.

The encryption information input unit 736 obtains the encryption information output from the solid-state image sensor 711c in response to the control signal from the main control unit 732.

The development processing unit 734 decrypts the encryption information obtained by the encryption information input unit 736 from the solid-state image sensor 711c in response to the control signal from the main control unit 732, and performs development processing of an output image used for biometric authentication on the basis of biometric information (image information) obtained as a decryption result. Note that regarding key information for decrypting the encryption information, that is, the value unique to the solid-state image sensor 711c (for example, PUF value), it is only required to be obtained in advance and stored in a predetermined storage area. Then, the development processing unit 734 outputs an output image obtained as a result of current processing to the biometric authentication unit 735.

Note that the subsequent processing is similar to that of the imaging device 710b described with reference to FIG. 30.

As described above, in the solid-state image sensor 711c illustrated in FIG. 31, there is no need to store the key information itself used for encryption of biometric information in the storage area of the solid-state image sensor 711c. Therefore, according to the solid-state image sensor 711c illustrated in FIG. 31, it is possible to further improve security regarding protection of biometric information, as compared with the solid-state image sensor 711b described with reference to FIG. 30.

As above, with reference to FIG. 31, regarding the example of the functional configuration of the imaging device to which the solid-state imaging device according to the present application example is applied, particularly another example of the case where biometric information obtained by the solid-state imaging device is subjected to encryption processing and then output to the outside has been described.

6.2. Application Example to Biometric Authentication System

Next, as an application example of the technology according to the present disclosure, an example of application to what is called biometric authentication system will be described in which biometric information obtained by the solid-state imaging device 1 according to one embodiment of the present disclosure is transferred to a server via a network, and biometric authentication is executed in the server.

(System Configuration)

Figure 32:
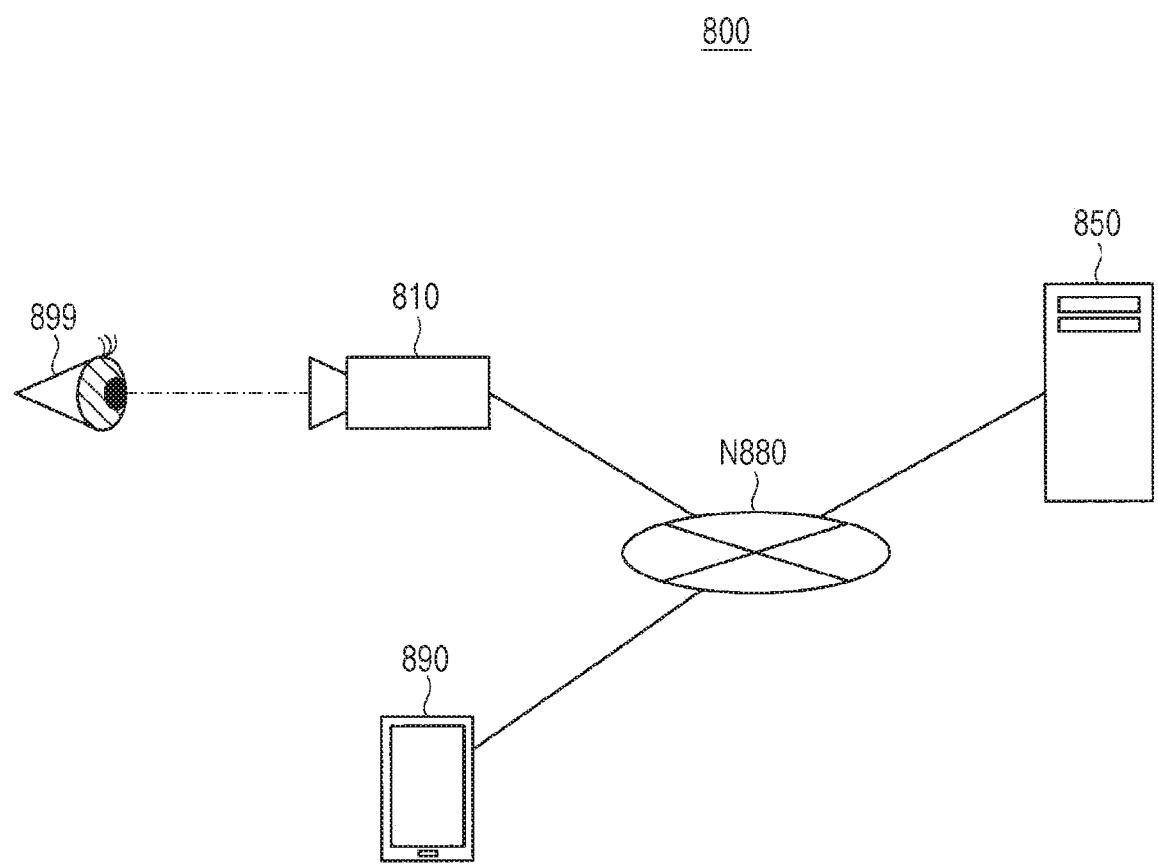
FIG. 32 is a block diagram illustrating an example of a schematic system configuration of a biometric authentication system.

First, with reference to FIG. 32, an example of a schematic system configuration of the biometric authentication system according to the present application example will be described. FIG. 32 is an explanatory diagram for describing an application example of the technology according to the present disclosure, and is a block diagram illustrating an example of a schematic system configuration of the biometric authentication system.

As illustrated in FIG. 32, the biometric authentication system 800 according to the present application example includes an imaging device 810 and a server 850. Furthermore, the biometric authentication system 800 may also include a terminal device 890. The imaging device 810, the server 850, and the terminal device 890 are configured to be capable of transmitting and receiving information to and from each other via a predetermined network N880. Note that the type of the network N880 that connects the imaging device 810, the server 850, and the terminal device 890 is not particularly limited. For example, the network N880 may be configured by the Internet, a dedicated line, a local area network (LAN), a wide area network (WAN), or the like. Further, the network N880 may be configured by a wireless network or may be configured by a wired network. Furthermore, the network N880 may include a plurality of networks, and at least a part of the network N880 may be configured as a wired network. Further, a network connecting the respective devices may be individually set. As a specific example, the network connecting the imaging device 810 and the server 850 and the network connecting the server 850 and the terminal device 890 may be configured as different networks.

On the basis of such a configuration, in the biometric authentication system 800 according to the present application example, for example, biometric information obtained by imaging a subject with the imaging device 810 is transmitted from the imaging device 810 to the server 850, and the server 850 executes biometric authentication based on the biometric information. Then, the server 850, for example, executes various processes according to a result of the biometric authentication, and transmits execution results of the processes to the terminal device 890 (for example, a smartphone or the like) of the user identified on the basis of the result of the biometric authentication. With such a configuration, the user can check the results of various processes executed according to the result of biometric authentication based on an imaging result by the imaging device 810, by the terminal device 890 held by the user.

Next, out of the respective devices included in the biometric authentication system 800 according to the present application example, particularly an example of functional configurations of the imaging device 810 and the server 850 will be described below.

(Functional Configuration of Imaging Device 810)

Figure 33:
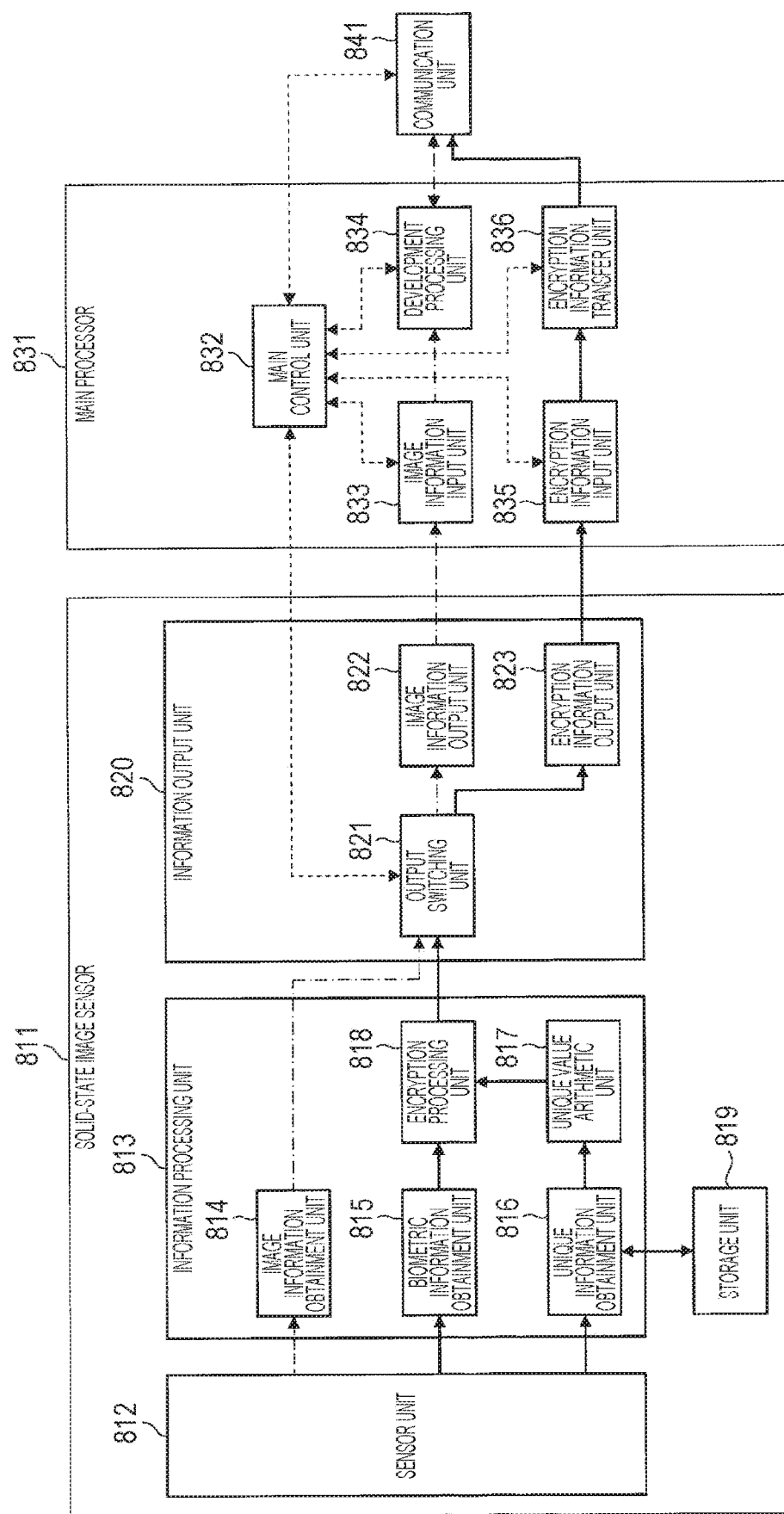
FIG. 33 is a block diagram illustrating an example of a schematic functional configuration of an imaging device constituting the biometric authentication system.

First, with reference to FIG. 33, an example of a functional configuration of the imaging device 810 according to the present application example will be described. FIG. 33 is an explanatory diagram for describing an application example of the technology according to the present disclosure, and is a block diagram illustrating an example of a schematic functional configuration of the imaging device 810 constituting the biometric authentication system.

As illustrated in FIG. 33, an imaging device 810 according to the present application example includes a solid-state image sensor 811, a main processor 831, and a communication unit 841.

The communication unit 841 is a component for the imaging device 810 to transmit and receive various information to and from another device via a predetermined network. The communication unit 841 may include, for example, a communication antenna, a radio frequency (RF) circuit, a baseband processor, and the like when transmitting and receiving various information to and from an external device via a wireless network. Note that in the following description, when each component of the imaging device 810 transmits and receives information to and from another device, unless otherwise specified, the information is transmitted and received via the communication unit 841.

The solid-state image sensor 811 corresponds to the solid-state imaging device 1 according to one embodiment of the present disclosure described above. As illustrated in FIG. 33, the solid-state image sensor 811 includes a sensor unit 812, an information processing unit 813, a storage unit 819, and an information output unit 820. Furthermore, although not illustrated in FIG. 33, the solid-state image sensor 811 may include a register interface for transmitting and receiving set values to and from the outside. Here, the "outside" means a recording medium that stores image information generated by the image sensor, a network for transmitting the image information, and a main processor that processes the image information or an imaging device main body such as a digital camera, a personal computer (PC), a mobile terminal, a game device, a non-contact type IC card such as FeliCa (registered trademark), a USB memory, and the like.

The sensor unit 812 corresponds to the pixel array 3 described with reference to FIG. 1, and photoelectrically converts light from a subject into an electrical signal.

The information processing unit 813 processes obtained information as needed. As illustrated in FIG. 33, the information processing unit 813 includes, for example, an image information obtainment unit 814, a biometric information obtainment unit 815, a unique information obtainment unit 816, a unique value arithmetic unit 817, and an encryption processing unit 818. Note that the image information obtainment unit 814, the biometric information obtainment unit 815, the unique information obtainment unit 816, and the unique value arithmetic unit 817 are substantially similar to the image information obtainment unit 714, the biometric information obtainment unit 715, the unique information obtainment unit 716, and the unique value arithmetic unit 717 illustrated with reference to FIG. 29, and thus detailed description thereof will be omitted.

The encryption processing unit 818 generates encryption information by performing encryption processing based on a predetermined condition on the biometric information of the user obtained by the biometric information obtainment unit 815, and transmits the encryption information to the information output unit 820. At this time, the encryption processing unit 818 may use, for example, a value (for example, a PUF value) unique to the solid-state image sensor 811 generated by the unique value arithmetic unit 817 as a key for encryption. Furthermore, the encryption processing unit 818 may use key information (for example, a common key or the like) used in an existing encryption method as the key for encryption. Note that in a case where the key information used in the existing encryption method is used, the components for generating a value unique to the solid-state image sensor 811 (for example, the unique information obtainment unit 816 and the unique value arithmetic unit 817) do not always need to be provided.

The storage unit 819 includes a non-volatile recording medium (for example, a memory or the like) capable of holding stored contents without supplying power, and temporarily or permanently store various information for the respective components in the solid-state image sensor 811 to execute various processes. For example, the storage unit 819 may previously hold information for the unique information obtainment unit 816 to specify a pixel (or a block including one or more pixels) for which unique information is to be obtained.

The information output unit 820 outputs various information output from the information processing unit 813 to the outside of the solid-state image sensor 811, and includes, for example, an output switching unit 821, an image information output unit 822, and an encryption information output unit 823.

The output switching unit 821 switches which information is output to the outside of the solid-state image sensor 811 according to the type of information input from the information processing unit 813. That is, it has a role of a switch for switching the output destination. By the solid-state image sensor 811 including the output switching unit 821, it is possible to selectively switch which of image information obtained by the image information obtainment unit 814 and encryption information in which biometric information obtained by the biometric information obtainment unit 815 is encrypted is to be output.

When the output switching unit 821 has selected to output the image information, the image information output unit 822 receives image information obtained by the image information obtainment unit 814, and outputs the image information to the outside of the solid-state image sensor 811.

Furthermore, when the output switching unit 821 has selected to output the encryption information, the encryption information output unit 823 receives encryption information generated by performing encryption processing on biometric information by the encryption processing unit 818, and outputs the encryption information to the outside of the solid-state image sensor 811.

The main processor 831 receives image information or encryption information from the solid-state image sensor 811 and executes various processes according to the type of the received information. As illustrated in FIG. 33, the main processor 831 includes a main control unit 832, an image information input unit 833, a development processing unit 834, an encryption information input unit 835, and an encryption information transfer unit 836.

The main control unit 832 controls operation of each component of the imaging device 810. For example, in order to cause the solid-state image sensor 811 to execute each function, the main control unit 832 transmits a control signal corresponding to the function to the solid-state image sensor 811. Furthermore, in order to implement each function of the main processor 831, the main control unit 832 transmits a control signal corresponding to the function to each unit in the main processor 831.

The image information input unit 833 obtains image information output from the solid-state image sensor 811 in response to the control signal from the main control unit 832.

The development processing unit 834 performs development processing of an output image on the basis of the image information obtained by the image information input unit 833 from the solid-state image sensor 811 in response to the control signal from the main control unit 832. Furthermore, the development processing unit 834 may transmit the output image obtained by the development processing to another device (for example, the server 850 or the terminal device 890 illustrated in FIG. 32) connected via a predetermined network.

The encryption information input unit 835 obtains encryption information output from the solid-state image sensor 811 in response to the control signal from the main control unit 832.

The encryption information transfer unit 836, in response to the control signal from the main control unit 832, transfers the encryption information obtained by the encryption information input unit 835 from the solid-state image sensor 811 to a predetermined device connected via a predetermined network (for example, the server 850 and the like).

Note that the configuration illustrated in FIG. 33 is merely an example, and the configuration of the imaging device 810 is not necessarily limited to the example illustrated in FIG. 33 as long as each function of the imaging device 810 described above can be implemented.

For example, in the example illustrated in FIG. 33, the image information output unit 822 and the encryption information output unit 823 are provided separately, but the image information output unit 822 and the encryption information output unit 823 may be integrally configured. That is, if the main processor 831 judges which type of information the information output from the solid-state image sensor 811 is, and if processing can be selectively switched according to the type of the information output, an output unit that outputs each of the image information and the encryption information may be shared. Furthermore, in this case, the image information input unit 833 and the encryption information input unit 835 may be integrally configured.

Furthermore, a part of the respective components of the imaging device 810 illustrated in FIG. 33 may be externally attached to the outside of the imaging device 810.

The example of the functional configuration of the imaging device 810 according to the present application example has been described above with reference to FIG. 33.

(Functional Configuration Example of Server 850)

Figure 34:
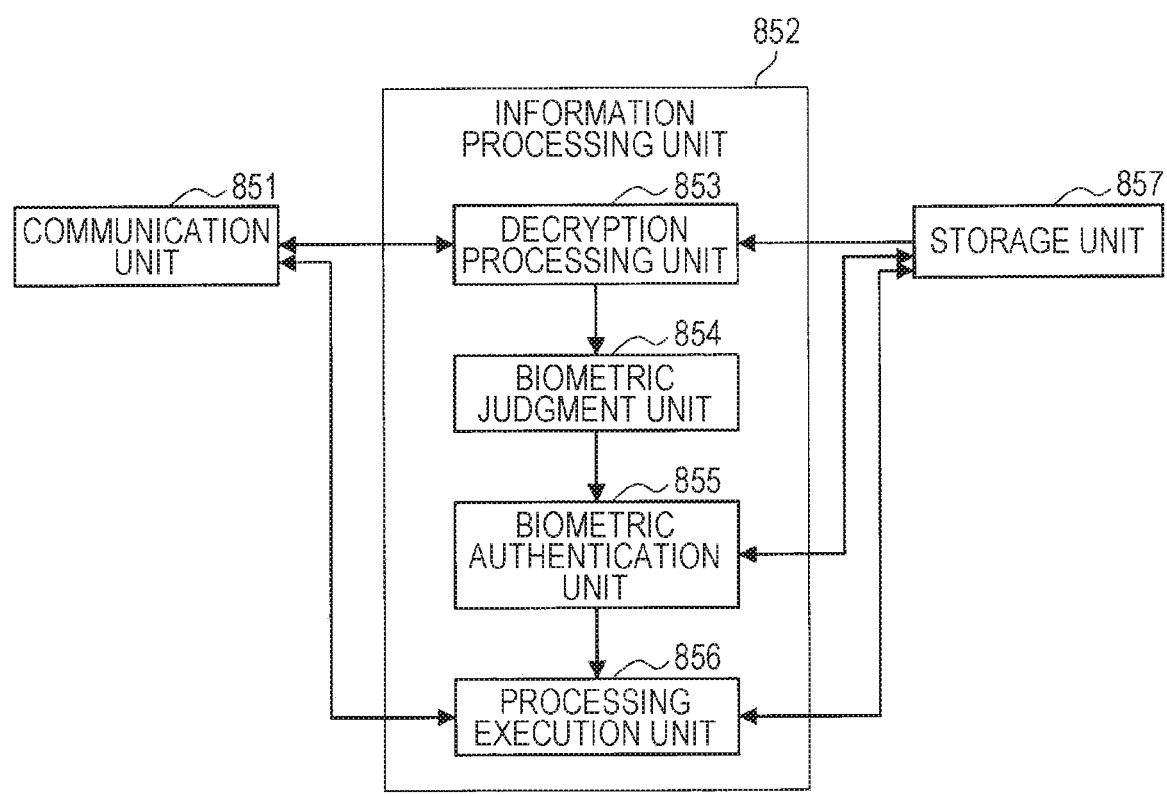
FIG. 34 is a block diagram illustrating an example of a schematic functional configuration of a server constituting the biometric authentication system.

Next, an example of a functional configuration of the server 850 according to the present application example will be described with reference to FIG. 34. FIG. 34 is an explanatory diagram for describing an application example of the technology according to the present disclosure, and is a block diagram illustrating an example of a schematic functional configuration of a server 850 constituting the biometric authentication system.

As illustrated in FIG. 34, the server 850 according to the present application example includes a communication unit 851, an information processing unit 852, and a storage unit 857.

The communication unit 851 is a component for the server 850 to transmit and receive various information to and from another device via a predetermined network. The communication unit 851 may include, for example, a communication antenna, an RF circuit, a baseband processor, and the like when transmitting and receiving various information to and from an external device via a wireless network. Note that in the following description, when each component of the server 850 transmits and receives information to and from another device, unless otherwise specified, the information is transmitted and received via the communication unit 851.

The information processing unit 852 decrypts encryption information transmitted from another device, and executes biometric authentication on the basis of biometric information obtained as a decryption result. Furthermore, the information processing unit 852 may execute various processes according to a result of the biometric authentication. As illustrated in FIG. 34, the information processing unit 852 includes, for example, a decryption processing unit 853, a biometric judgment unit 854, a biometric authentication unit 855, and a process execution unit 856.

The decryption processing unit 853 performs decryption processing on encryption information transmitted from another device (for example, the imaging device 810) on the basis of key information corresponding to the transmission source of the encryption information, thereby decrypting the original information encrypted (for example, the biometric information described above).

Note that as the key information used for decrypting the encryption information, for example, a value unique to every device of transmission source devices similarly to the PUF value described above (for example, the solid-state image sensor 811) may be used. Note that as the value unique to each device, it is just necessary that one that is generated in advance at a time when the device is manufactured, or the like is stored in a region readable by the decryption processing unit 853 (for example, a storage unit 857 described later).

Furthermore, as another example, key information (for example, a common key or the like) used in an existing encryption method may be used as the key information used for decrypting the encryption information.

The biometric judgment unit 854 judges whether or not the biometric information obtained is capable of authenticating the user.

The biometric authentication unit 855 compares the biometric information judged to be capable of authenticating the user with reference information stored in the predetermined storage area (for example, the storage unit 857 described later), and authenticates whether or not the user is eligible for use.

The process execution unit 856 executes various functions (for example, applications) provided by the server 850. For example, the process execution unit 856 may extract a predetermined application from a predetermined storage unit (for example, a storage unit 857 described later) according to a result of biometric authentication by the biometric authentication unit 855, and execute the extracted application. Furthermore, the process execution unit 856 may specify the user according to the result of the biometric authentication, and transmit information according to an execution result of the application to the terminal device 890 corresponding to the specified user.

The storage unit 857 temporarily or permanently holds various information for each component in the server 850 to execute various processes. The storage unit 857 can include, for example, a non-volatile recording medium (for example, a memory or the like) capable of holding stored contents without supplying power. Furthermore, the storage unit 857 may at least partially include a volatile recording medium.

As a specific example, the storage unit 857 may hold information that is a key for decrypting encryption information transmitted from the imaging device 810. An example of the information is information indicating a unique value (for example, PUF value) generated in advance for each of the imaging devices 810 (for example, the solid-state image sensor 811).

Further, as another example, the storage unit 857 may store reference information that is a comparison target of biometric information during biometric authentication. Furthermore, the storage unit 857 may store data (for example, a library) for executing various applications, management data for managing various settings or the like, and the like.

Note that the configuration illustrated in FIG. 34 is merely an example, and the configuration of the server 850 is not necessarily limited to the example illustrated in FIG. 34 as long as the respective functions of the server 850 described above can be implemented. As a specific example, a part of the respective components of the server 850 illustrated in FIG. 34 may be externally attached to the outside of the server 850. Furthermore, as another example, the respective functions of the server 850 described above may be implemented by distributed processing by a plurality of devices.

The example of the functional configuration of the server 850 according to the present application example has been described above with reference to FIG. 34.

(Evaluation)

As described above, in the biometric authentication system 800 according to the present application example, the biometric information obtained by the solid-state image sensor 811 of the imaging device 810 is output to the outside of the solid-state image sensor 811 as encryption information that has been encrypted. Therefore, regarding external components of the solid-state image sensor 811, if not holding the key information for decryption, it is difficult even for a device in the imaging device 810 to decrypt the encryption information output from the solid-state image sensor 811. That is, in the biometric authentication system 800 described above, the biometric information obtained by the solid-state image sensor 811 is propagated as encrypted information on a path from where it is output from the solid-state image sensor 811 until it is received by the server 850.

Furthermore, for encryption of biometric information, it is possible to use as key information a value unique to the individual solid-state image sensor 811 generated (or calculated) using physical characteristics that are difficult to copy, such as a PUF value.

With the configuration as described above, by the biometric authentication system 800 according to the present application example, it is possible to further improve security regarding protection of biometric information of a user obtained as an imaging result by the imaging device 810.

6.3. Application Example to Mobile Object

The technology according to the present disclosure (the present technology) can be applied to various products. For example, the technology according to the present disclosure may be achieved as a device (or a system) mounted on any type of mobile object such as an automobile, an electric vehicle, a hybrid electric vehicle, a motorcycle, a bicycle, a personal mobility, an airplane, a drone, a ship, a robot, and the like.

Figure 35:
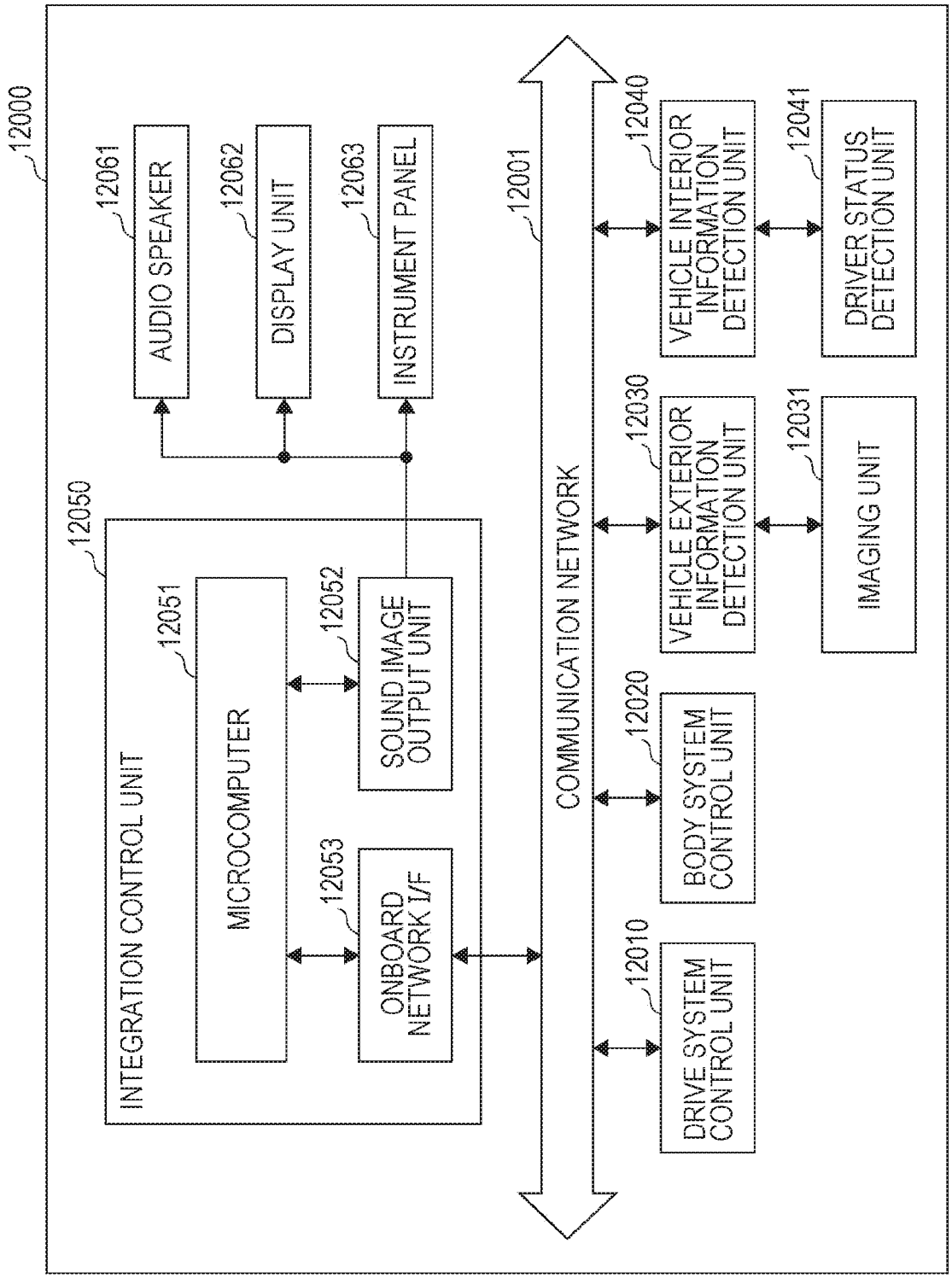
FIG. 35 is a block diagram illustrating an example of a schematic configuration of a vehicle control system.

FIG. 35 is a block diagram illustrating a schematic configuration example of a vehicle control system that is an example of a mobile object control system to which the technology according to the present disclosure can be applied.

A vehicle control system 12000 includes a plurality of electronic control units connected via a communication network 12001. In the example illustrated in FIG. 35, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, a sound image output unit 12052, and an onboard network interface (I/F) 12053 are illustrated.

The drive system control unit 12010 controls operation of devices related to the drive system of the vehicle according to various programs. For example, the drive system control unit 12010 functions as a control device for a driving force generation device for generating driving force of the vehicle such as an internal combustion engine or a driving motor, a driving force transmission mechanism for transmitting driving force to wheels, a steering mechanism for adjusting a steering angle of the vehicle, and a braking device for generating a braking force of the vehicle, and the like.

The body system control unit 12020 controls operation of various devices mounted on the vehicle body according to various programs. For example, the body system control unit 12020 functions as a control device for a keyless entry system, a smart key system, and a power window device, or various lamps such as a head lamp, a back lamp, a brake lamp, a blinker, or a fog lamp, and the like. In this case, radio waves transmitted from a portable device that substitutes for a key or signals from various switches can be input to the body system control unit 12020. The body system control unit 12020 receives input of these radio waves or signals, and controls a door lock device, a power window device, a lamp, and the like of the vehicle.

The vehicle exterior information detection unit 12030 detects information external to the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform an object detection process or a distance detection process of a person, a vehicle, an obstacle, a sign, or a character on a road surface, or the like on the basis of the received image.

The imaging unit 12031 is an optical sensor that receives light and outputs an electrical signal according to the amount of received light. The imaging unit 12031 can output the electrical signal as an image or as distance measurement information. Furthermore, the light received by the imaging unit 12031 may be visible light or non-visible light such as infrared light.

The vehicle interior information detection unit 12040 detects information in the vehicle. The vehicle interior information detection unit 12040 is connected to, for example, a driver status detection unit 12041 that detects the status of the driver. The driver status detection unit 12041 includes, for example, a camera that captures an image of the driver, and the vehicle interior information detection unit 12040 may calculate the degree of fatigue or the degree of concentration of the driver, or judge whether or not the driver has fallen asleep on the basis of detection information input from the driver status detection unit 12041.

The microcomputer 12051 can calculate a control target value of the driving force generation device, the steering mechanism, or the braking device on the basis of information of the inside and outside of the vehicle obtained by the vehicle exterior information detection unit 12030 or the vehicle interior information detection unit 12040, and outputs a control command to the drive system control unit 12010. For example, the microcomputer 12051 can perform cooperative control for the purpose of achieving functions of the advanced driver assistance system (ADAS) including vehicle collision avoidance or impact mitigation, following traveling based on an inter-vehicle distance, vehicle speed maintaining traveling, vehicle collision warning, or vehicle lane departure warning, and the like.

Furthermore, the microcomputer 12051 controls the driving force generation device, the steering mechanism, the braking device, or the like on the basis of information around the vehicle obtained by the vehicle exterior information detection unit 12030 or the vehicle interior information detection unit 12040, to thereby perform cooperative control for the purpose of autonomous driving or the like to travel autonomously without depending on operation by the driver.

Furthermore, the microcomputer 12051 can output a control command to the body system control unit 12020 on the basis of vehicle exterior information obtained by the vehicle exterior information detection unit 12030. For example, the microcomputer 12051 can perform cooperative control for the purpose of anti-glare, such as controlling headlamps according to the position of a preceding vehicle or oncoming vehicle detected by the vehicle exterior information detection unit 12030, and thereby switching a high beam to a low beam.

The sound image output unit 12052 transmits an output signal of at least one of sound or image to an output device capable of visually or audibly notifying a passenger of the vehicle or the outside of the vehicle of information. In the example of FIG. 35, an audio speaker 12061, a display unit 12062, and an instrument panel 12063 are illustrated as output devices. The display unit 12062 may include, for example, at least one of an on-board display or a head-up display.

Figure 36:
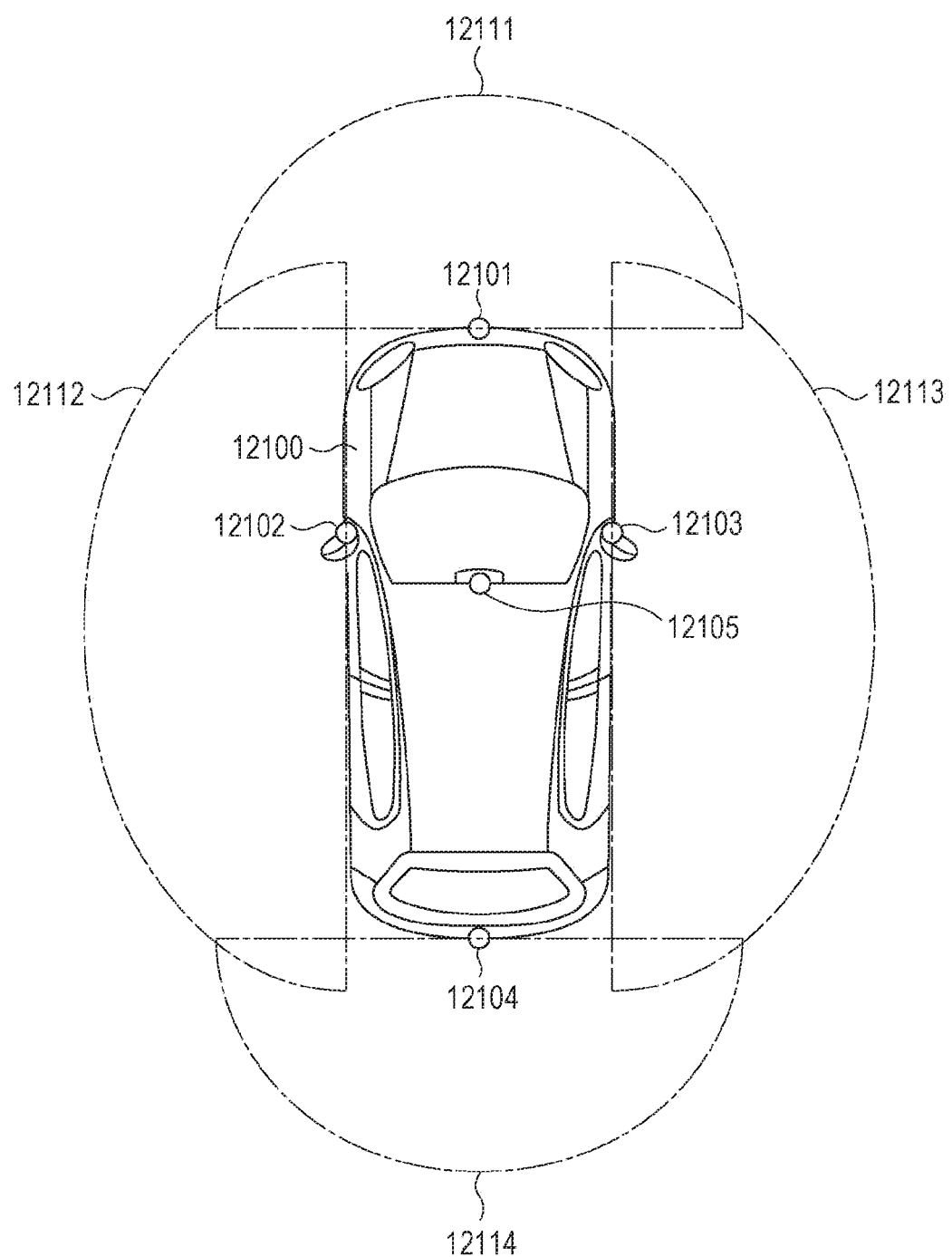
FIG. 36 is an explanatory diagram illustrating an example of installation positions of a vehicle exterior information detection unit and an imaging unit.

FIG. 36 is a diagram illustrating an example of installation positions of the imaging unit 12031.

In FIG. 36, the vehicle 12100 has imaging units 12101, 12102, 12103, 12104, and 12105 as the imaging unit 12031.

The imaging units 12101, 12102, 12103, 12104, and 12105 are provided, for example, at positions such as a front nose, a side mirror, a rear bumper, a back door, and an upper part of a windshield in the cabin of the vehicle 12100. The imaging unit 12101 provided on the front nose and the imaging unit 12105 provided above the windshield in the cabin mainly obtain a forward image of the vehicle 12100. The imaging units 12102 and 12103 provided in the side mirrors mainly obtain images of sides of the vehicle 12100. The imaging unit 12104 provided in a rear bumper or a back door mainly obtains an image behind the vehicle 12100. The forward image obtained by the imaging units 12101 and 12105 are mainly used for detecting a preceding vehicle, a pedestrian, an obstacle, a traffic light, a traffic sign, a lane, and the like.

Note that FIG. 36 illustrates an example of imaging ranges of the imaging units 12101 to 12104. An imaging range 12111 indicates the imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of an imaging unit 12104 provided in a rear bumper or a back door. For example, by overlaying image data captured by the imaging units 12101 to 12104, an overhead image of the vehicle 12100 viewed from above can be obtained.

At least one of the imaging units 12101 to 12104 may have a function of obtaining distance information. For example, at least one of the imaging units 12101 to 12104 may be a stereo camera including a plurality of image sensors or an image sensor having pixels for detecting a phase difference.

For example, on the basis of distance information obtained from the imaging units 12101 to 12104, the microcomputer 12051 can obtain a distance to each three-dimensional object in the imaging ranges 12111 to 12114, and a temporal change of this distance (relative speed to the vehicle 12100), to thereby extract as a preceding vehicle a three-dimensional object that is closest particularly on the traveling path of the vehicle 12100 and travels at a predetermined speed (for example, 0 km/h or more) in substantially the same direction as the vehicle 12100. Moreover, the microcomputer 12051 can set in advance an inter-vehicle distance to be secured before a preceding vehicle, and perform automatic brake control (including follow-up stop control), automatic acceleration control (including follow-up start control), and the like. In this way, it is possible to perform cooperative control for automatic driving or the like in which the vehicle travels autonomously without depending on operation of the driver.

For example, the microcomputer 12051 extracts, on the basis of distance information obtained from the imaging units 12101 to 12104, three-dimensional object data related to a three-dimensional object while categorizing into a two-wheeled vehicle, a normal vehicle, a large vehicle, a pedestrian, and other three-dimensional objects such as a telephone pole, and uses the extracted data for automatic avoidance of obstacles. For example, the microcomputer 12051 distinguishes an obstacle around the vehicle 12100 into an obstacle that is visible to the driver of the vehicle 12100 and an obstacle that is difficult to see. Then, the microcomputer 12051 determines a collision risk indicating the risk of collision with each obstacle, and when the collision risk is equal to or higher than a set value and there is a possibility of collision, the microcomputer 12051 can output a warning to the driver via the audio speaker 12061 and the display unit 12062, or perform forced deceleration or avoidance steering via the drive system control unit 12010, to thereby perform assistance for collision avoidance.

At least one of the imaging units 12101 to 12104 may be an infrared camera that detects infrared light. For example, the microcomputer 12051 can recognize a pedestrian by determining whether or not a pedestrian exists in captured images of the imaging units 12101 to 12104. Recognition of such a pedestrian is performed by, for example, a procedure of extracting feature points in an image captured by the imaging units 12101 to 12104 as an infrared camera, and performing a pattern matching process on a series of feature points indicating the outline of an object to judge whether or not the object is a pedestrian. When the microcomputer 12051 determines that a pedestrian is present in the images captured by the imaging units 12101 to 12104 and recognizes the pedestrian, the sound image output unit 12052 controls the display unit 12062 so as to overlay a rectangular contour line for emphasis on the recognized pedestrian. Furthermore, the sound image output unit 12052 may cause the display unit 12062 to display an icon or the like indicating a pedestrian at a desired position.

The example of the vehicle control system to which the technology according to the present disclosure can be applied has been described above. The technology according to the present disclosure can be applied to the imaging unit 12031 among the configurations described above. Specifically, the solid-state imaging device 1 illustrated in FIG. 1 can be applied to the imaging unit 12031. By applying the technology according to the present disclosure to the imaging unit 12031, for example, various information obtained by the imaging unit 12031 (for example, image information obtained as an imaging result, or the like) can be subjected to encryption on the basis of information unique to the device (solid-state imaging device) inside the imaging unit 12031. Therefore, for example, it is possible to further improve security regarding protection of information obtained by the imaging unit 12031.

7. Conclusion

According to the embodiment of the present disclosure as described above, there is provided a solid-state imaging device 1 that creates unique information used for encryption processing without being leaked to the outside and completes the encryption processing inside. By creating unique information used for encryption processing without being leaked to the outside and completing the encryption processing inside, the solid-state imaging device 1 according to the embodiment of the present disclosure can generate the unique information quite safely and can perform quite secure encryption processing.

The respective steps in processing executed by each of the devices of the present description do not necessarily need to be processed in time series in the order described as a sequence diagram or a flowchart. For example, the respective steps in processing executed by each of the devices may be processed in an order different from the order described in a flowchart, or may be processed in parallel.

Further, a computer program for causing hardware such as a CPU, a ROM, and a RAM built in each of the devices to exhibit functions equivalent to the configuration of each of the devices described above can also be created. Also, a storage medium storing the computer program can be provided. Furthermore, by configuring each functional block illustrated in a functional block diagram by hardware, a series of processes can be implemented by the hardware.

The preferred embodiments of the present disclosure have been described above in detail with reference to the accompanying drawings, but the technical scope of the present disclosure is not limited to such examples. It is apparent that a person having ordinary knowledge in the technical field of the present disclosure can devise various change examples or modification examples within the scope of the technical idea described in the claims, and it will be naturally understood that they also belong to the technical scope of the present disclosure.

Furthermore, the effects described in the present description are merely illustrative or exemplary and are not limited. That is, the technology according to the present disclosure can exhibit other effects that are apparent to those skilled in the art from the present description in addition to or instead of the effects described above.

Note that configurations as follows also belong to the technical scope of the present disclosure.

(1)

A solid-state imaging device including:

a unique information generation unit that generates predetermined analog information;

a unique value generation unit that generates a predetermined unique value based on the predetermined analog information; and an encryption processing unit that performs encryption processing using the predetermined unique value, in which the unique value generation unit includes:

a detection unit that converts the predetermined analog information into digital information; and a unique value calculation unit that calculates the predetermined unique value using the digital information, in which the solid-state imaging device further includes a high-pass filter that passes a high-frequency signal for at least one of the analog information or the digital information.

(2)

The solid-state imaging device according to above (1), in which the high-pass filter is a two-dimensional spatial filter.

(3)

The solid-state imaging device according to above (2), in which the two-dimensional spatial filter is a filter in an analog region in one direction and is a filter in a digital region in a direction orthogonal to the one direction.

(4)

The solid-state imaging device according to any one of above (1) to (3), in which the unique information generation unit has elements that generate the predetermined analog information and that are arranged two-dimensionally.

(5)

The solid-state imaging device according to above (4), in which the unique value generation unit executes a difference process on two pieces of predetermined analog information generated by the unique value generation unit.

(6)

The solid-state imaging device according to above (5), in which the two pieces of predetermined analog information are generated during one sampling period.

(7)

The solid-state imaging device according to any one of above (4) to (6), in which the two pieces of predetermined analog information are respectively generated from the elements that are adjacent to each other.

(8)

The solid-state imaging device according to any one of above (1) to (7), in which the solid-state imaging device operates by switching at least a first mode in which the encryption processing unit performs encryption processing using the predetermined unique value, and a second mode in which a test for an operation of generating the predetermined unique value is performed.

(9)

The solid-state imaging device according to above (8), further including a pseudo-signal generation unit that supplies a pseudo-signal to the unique value generation unit when operating in the second mode.

(10)

The solid-state imaging device according to above (8) or (9), in which encrypted data is output when operating in the first mode and a test result is output when operating in the second mode.

(11)

The solid-state imaging device according to any one of above (8) to (10), further including a determination unit that determines whether or not operation is normal when operating in the second mode.

(12)

The solid-state imaging device according to above (11), in which the determination unit makes a determination with respect to a value for every predetermined region of the unique information generation unit.

(13)

The solid-state imaging device according to any one of above (1) to (12), in which the predetermined analog information is information that is not a basis of image data.

(14)

A unique value generation method of a solid-state imaging device, including:

generating predetermined analog information from a unique information generation unit;

generating by a unique value generation unit a predetermined unique value based on the predetermined analog information; and performing by an encryption processing unit encryption processing using the predetermined unique value, in which the generating of the unique value includes:

converting the predetermined analog information into digital information; and calculating the predetermined unique value using the digital information, in which the unique value generation method further includes passing a high-frequency signal for at least one of the analog information or the digital information.

REFERENCE SIGNS LIST

1 Solid-state imaging device
2 Pixel
3 Pixel array
4 Vertical drive circuit
5 Column signal processing circuit
6 Horizontal drive circuit
7 Output circuit
8 Control circuit
9 Vertical signal line
10 Horizontal signal line
11 Semiconductor substrate
12 Input-output terminal
101 Control unit
111 Pixel array unit
112 Selection unit
114 Constant current circuit unit
121 Pixel
122 Pixel
131 Switch
132 Switch
133 Switch
141 Comparator
143 Counter
151 Comparator
153 Counter
161 MOS transistor
162 MOS transistor

The invention claimed is:

1. A solid-state imaging device, comprising:
a unique information generation unit configured to generate specific analog information;
a unique value generation unit configured to generate a specific unique value based on the specific analog information; and
an encryption processing unit configured to perform encryption processing based on the specific unique value,
wherein the unique value generation unit includes:
a detection unit configured to convert the specific analog information into digital information; and
a unique value calculation unit configured to calculate the specific unique value based on the digital information, wherein
the solid-state imaging device further comprises a high-pass filter configured to pass a high-frequency signal for at least one of the analog information or the digital information,
the high-pass filter is a two-dimensional spatial filter, and
the two-dimensional spatial filter is a filter in an analog region in one direction and is a filter in a digital region in a direction orthogonal to the one direction.

2. The solid-state imaging device according to claim 1, wherein
the unique information generation unit further comprises a plurality of elements in a two-dimensional arrangement, and
the plurality of elements configured to generate the specific analog information.

3. The solid-state imaging device according to claim 2, wherein the unique value generation unit is further configured to execute a difference process between two pieces of specific analog information generated by the unique value generation unit.

4. The solid-state imaging device according to claim 3, wherein the two pieces of specific analog information are generated during one sampling period.

5. The solid-state imaging device according to claim 2, wherein the plurality of elements is further configured to generate the two pieces of specific analog information respectively.

6. The solid-state imaging device according to claim 1, wherein the solid-state imaging device is configured to switch between a first mode in which the encryption processing unit performs encryption processing using the specific unique value, and a second mode in which a test for an operation of generation of the specific unique value is performed.

7. The solid-state imaging device according to claim 6, further comprising a pseudo-signal generation unit configured to supply, in the second mode, a pseudo-signal to the unique value generation unit.

8. The solid-state imaging device according to claim 6, wherein encrypted data is output in the first mode and a test result is output in the second mode.

9. The solid-state imaging device according to claim 6, further comprising a determination unit configured to determine whether or not operation is normal in the second mode.

10. The solid-state imaging device according to claim 9, wherein the determination unit is further configured to make a determination with respect to a value for every predetermined region of the unique information generation unit.

11. The solid-state imaging device according to claim 1, wherein the specific analog information is information that is not a basis of image data.

12. A unique value generation method, comprising:
in a solid-state imaging device:
generating specific analog information;
generating a specific unique value based on the specific analog information; and
performing, by an encryption processing unit, encryption processing using the specific unique value,
wherein the generating of the specific unique value includes:
converting the specific analog information into digital information; and
calculating the specific unique value based on the digital information, and
the unique value generation method further comprises passing, by a high-pass filter of the solid-state imaging device, a high-frequency signal for at least one of the analog information or the digital information, wherein
the high-pass filter is a two-dimensional spatial filter, and
the two-dimensional spatial filter is a filter in an analog region in one direction and is a filter in a digital region in a direction orthogonal to the one direction.

13. A solid-state imaging device, comprising:
a unique information generation unit configured to generate specific analog information;
a unique value generation unit configured to generate a specific unique value based on the specific analog information;
an encryption processing unit configured to perform encryption processing based on the specific unique value,
wherein the unique value generation unit includes:
a detection unit configured to convert the specific analog information into digital information; and
a unique value calculation unit configured to calculate the specific unique value based on the digital information;
a high-pass filter configured to pass a high-frequency signal for at least one of the analog information or the digital information, wherein
the solid-state imaging device is configured to switch between a first mode in which the encryption processing unit performs encryption processing using the specific unique value, and a second mode in which a test for an operation of generation of the specific unique value is performed; and
a pseudo-signal generation unit configured to supply, in the second mode, a pseudo-signal to the unique value generation unit.

\* \* \* \* \*